(12) United States Patent
Misawa et al.

(10) Patent No.: US 8,808,004 B2
(45) Date of Patent: Aug. 19, 2014

(54) BIOLOGICAL MODEL FOR TRAINING AND PRODUCTION METHOD OF BIOLOGICAL MODEL FOR TRAINING

(75) Inventors: Hiroshi Misawa, Atsugi (JP); Takashi Kuchiura, Aichi (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 302 days.

(21) Appl. No.: 13/201,930

(22) PCT Filed: Feb. 4, 2010

(86) PCT No.: PCT/JP2010/051626
§ 371 (c)(1),
(2), (4) Date: Oct. 19, 2011

(87) PCT Pub. No.: WO2010/095519
PCT Pub. Date: Aug. 26, 2010

(65) Prior Publication Data
US 2012/0028231 A1      Feb. 2, 2012

(30) Foreign Application Priority Data

Feb. 17, 2009  (JP) ................. 2009-034659
Jul. 21, 2009   (JP) ................. 2009-170563
Jul. 21, 2009   (JP) ................. 2009-170564
Sep. 16, 2009  (JP) ................. 2009-215058

(51) Int. Cl.
G09B 23/28         (2006.01)

(52) U.S. Cl.
USPC ........................................... 434/268

(58) Field of Classification Search
USPC ................ 434/262, 267, 268, 270, 272
See application file for complete search history.

(56) References Cited

U.S. PATENT DOCUMENTS 4,198,766 A * 4/1980 Camin ............... 434/272
6,511,325 B1 * 1/2003 Lalka et al. ........ 434/272
(Continued)

FOREIGN PATENT DOCUMENTS

CN    1596185    3/2005
CN    1653504    8/2005
(Continued)

OTHER PUBLICATIONS

International Search Report (PCT/ISA/210) issued on Mar. 16, 2010, by Japanese Patent Office as the International Searching Authority for International Application No. PCT/JP2010/051626.

(Continued)

*Primary Examiner* — Kurt Fernstrom
(74) *Attorney, Agent, or Firm* — Buchanan Ingersoll & Rooney PC

(57) ABSTRACT

Disclosed is a biological model for training which is in a tubular shape having an inner cavity, has a narrowing or closing portion at a mid portion of the tube, and is provided with a artificial lesion member simulating a lesion occurring in a tubular tissue. In this biological model for training, the artificial lesion member includes, at least in a portion thereof, a plastic and deformable material. The biological model for training is used in expansion training for implementing expansion. As the plastic and deformable material, a material including, as the main component, at least one member selected from among a silicone clay, a resin clay and an oil clay can be specifically used. Such a material is preferred because of ensuring the maintenance of a expanded state in the expansion training.

20 Claims, 46 Drawing Sheets

(56) References Cited

U.S. PATENT DOCUMENTS

| | | |
|---|---|---|
| 7,008,232 B2 * | 3/2006 | Brassel .................. 434/268 |
| 2003/0195411 A1 | 10/2003 | Sureda et al. |
| 2005/0016548 A1 | 1/2005 | Brassel |
| 2008/0136059 A1 * | 6/2008 | Yoshino et al. ............ 264/299 |
| 2011/0117531 A1 * | 5/2011 | Iwasaki et al. ............ 434/272 |

FOREIGN PATENT DOCUMENTS

| | | |
|---|---|---|
| JP | 5-50477 U | 7/1993 |
| JP | 2001-343891 A | 12/2001 |
| JP | 3613568 B2 | 1/2005 |
| JP | 2005-504350 A | 2/2005 |
| JP | 2008-237304 A | 10/2008 |
| WO | WO 03/028978 | 4/2003 |
| WO | WO 2008/027748 | 3/2008 |

OTHER PUBLICATIONS

Chinese Search Report issued on Jan. 11, 2012 by Chinese Patent Office in corresponding Chinese Patent Application Publication No. 2010800080487.

* cited by examiner

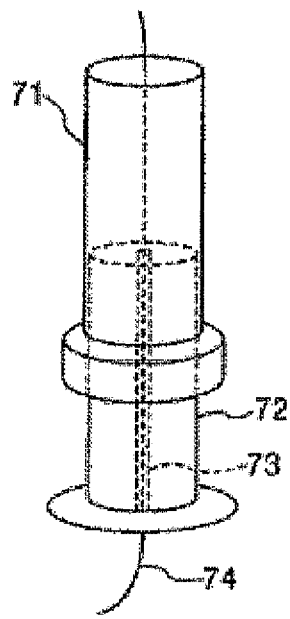
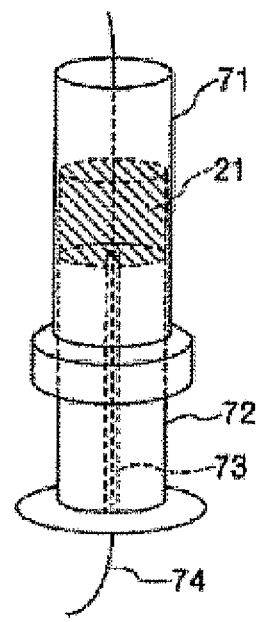
FIG. 10A        FIG. 10B
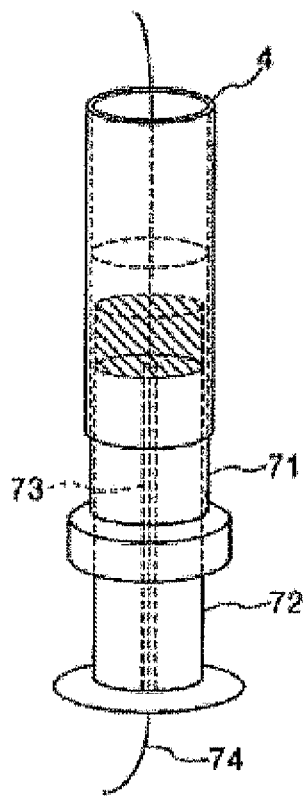
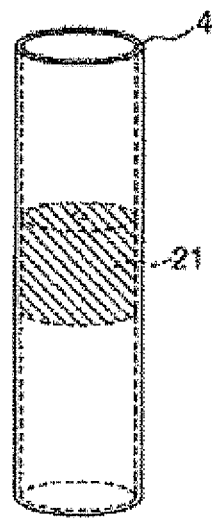
FIG. 10C        FIG. 10D

BIOLOGICAL MODEL FOR TRAINING AND PRODUCTION METHOD OF BIOLOGICAL MODEL FOR TRAINING

TECHNICAL FIELD

The present invention is an invention relating to a biological model for training and a production method of a biological model for training.

BACKGROUND ART

For one of percutaneous coronary angioplasties, there has been known, for example, a PTCA (Percutaneous Transluminal Coronary Angioplasty) operation.

In this PTCA operation, in case of applying a method via femoral artery, blood flow inside a blood vessel is restored by way of the following procedures. More specifically, <I> first, a sheath catheter is inserted into a femoral artery; subsequently, a guide wire for guide catheter is inserted thereinto; the guide catheter is advanced along the guide wire for guide catheter in a state of advancing the distal end thereof until the vicinity of a coronary artery entrance; and the distal end thereof is positioned at the coronary arterial orifice. <II> Next, the guide wire for guide catheter is pulled out; a guide wire for balloon catheter is inserted inside the guide catheter; and the guide wire for balloon catheter is projected from the distal end of the guide catheter, further is advanced until a position beyond a stricture region (lesioned region) which occurs at the coronary artery. <III> Next, the balloon catheter is advanced until the stricture region through the guide wire for balloon catheter; the balloon portion is positioned at the stricture region and thereafter; the stricture region, that is, the blood vessel wall is pushed and expanded by expanding the balloon; and blood flow is restored by re-establishing the blood pathway.

As described above, in order to position a balloon catheter at a stricture region, there is required an extremely advanced skill for an operator, which includes complicated processes.

Therefore, in recent years, other than operations with respect to patients, there has been required a development of a living body model which is used in a training for upgrading an operator's skill.

For such a living body model, there was proposed, for example, in Patent Document 1, a production method of a tube model which makes a tube such as a blood vessel and a lymphatic vessel as a model.

More specifically, in the Patent Document 1, first, based on tomogram data of a test body, which were obtained by a diagnostic imaging apparatus such as a CT scanner, an MRI scanner and the like, a cavity region of this test body is picked up and a corresponding lumen model is lamination-shaped at this cavity region. Next, a three-dimensional model molding material is hardened in a state that the surrounding area of this lumen model is surrounded by a three-dimensional model molding material and thereafter, a tube model (three-dimensional model) is formed by removing the lumen model.

In a three-dimensional model having such a constitution, there is used an elastic material such as a silicone rubber, a polyurethane elastomer and the like for the three-dimensional model molding material, and the tube model is formed by being approximated with a physical property of a blood vessel or a lymphatic vessel. Then, this three-dimensional model is formed so as to surround the lumen model, so that also the stricture region which is a lesioned region is formed integrally with aforesaid tube and it happens that a physical property similar to that of the tube will be presented therein. However, for example, the stricture region formed at the blood vessel is constituted mainly by a plaque (deposit) in which cholesterol is deposited, so that the physical property thereof is largely different from that of the blood vessel.

Therefore, with respect to the three-dimensional model described in the Patent Document 1, it is not possible to implement a training corresponding to the physical property of the actual plaque which occurred at the stricture region and it is not possible to confirm the plaque state after inflating the balloon at the stricture region, so that there is such a problem that it is not possible to know how the restructuring of the flow path of the blood is to be carried out.

Further, the three-dimensional model is produced based on tomogram data of a test body of one person, so that in a case in which this test body is a healthy person, it is not possible to implement a training targeting a patient, that is, a training of inflating a balloon with respect to a stricture region. Also, even if the test body is a patient, it is only possible to carry out a training with respect to the position of the stricture region or the shape which the patient thereof possesses and it is not possible to implement a training corresponding to the stricture region which occurs depending on various kinds of positions and shapes.

Patent Document 1: Japanese Registered Patent No. 3613568

DISCLOSURE OF THE INVENTION

An object of the present invention lies, when carrying out a training targeting skill upgrade of an operator by using a biological model for training, in providing a biological model for training in which it is possible with respect to a biological model for training to carry out a training by being approximated with the physical property of the actual lesioned portion and in providing a production method of a biological model for training, which produces such a biological model for training.

(1) In order to achieve the aforementioned object, the present invention discloses:

a biological model for training, characterized by being formed in a narrowing or closing shape at a mid portion of a tube shaped body having a lumen portion and comprising an artificial lesion member simulating a lesioned portion which occurs at a tube shaped tissue, wherein the artificial lesion member is constituted at least for a portion thereof by a plastically deformable material and is used for an expansion training in which an expansion is carried out.

Thus, when carrying out a training which is targeting skill upgrade of an operator by using a biological model for training, it is possible to carry out a training by approximating the biological model for training with the physical property of the actual lesioned portion.

(2) In order to achieve the aforementioned object, the present invention discloses:

a biological model for training, characterized by being arranged at a lumen portion in a tube having the lumen portion and comprising an artificial lesion member being formed in a shape for narrowing or closing the lumen portion when being arranged at the lumen portion, wherein the artificial lesion member is constituted by a plastically deformable material, and when arranging the artificial lesion member at the lumen portion and carrying out a training for an expansion in order to secure a flow path, the artificial lesion member is plastically deformed by the expansion to the extent such that it does not return to a shape before the expansion.

Thus, it is possible, in a three-dimensional model using a tube having a lumen portion of a blood vessel or the like, to arrange a biological model for training approximated with the physical property of the lesioned region in an arbitrary shape at an arbitrary position thereof. Therefore, owing to a fact that trainings corresponding to patient-conditions of various patients can be implemented by using a biological model for training provided with this artificial lesion member, it is possible for an operator to master more advanced skills in a situation other than applying operations to patients.

Also, with respect to the biological model for training described in the aforementioned (2), it is preferable that elastic modulus thereof is small compared with that of the tube.

Also, with respect to the biological model for training described in the aforementioned (2), it is preferable that compressive elastic modulus thereof is 0.001 MPa to 0.5 MPa.

Also, with respect to the biological model for training described in the aforementioned (2), it is preferable that the plastically deformable material is mainly constituted by at least one kind within a silicone clay, a resin clay and an oil clay.

Also, with respect to the biological model for training described in the aforementioned (2), it is preferable that there is included a through-hole axially passing through, and when being arranged at the lumen portion, the lumen portion is narrowed by the periphery portion of the through-hole.

Also, with respect to the biological model for training described in the aforementioned (2), it is preferable that the through-hole is provided at one end portion or both the end portions thereof with a taper portion in which the hole diameter of the through-hole gradually increases from the inner portion side toward the end portion side thereof.

Also, with respect to the biological model for training described in the aforementioned (2), it is preferable that there is included a notch or a hole which is continuous axially, and when being arranged at the lumen portion, the lumen portion is closed caused by a fact that the inner surfaces of the notch or the hole are firmly attached each other.

Also, with respect to the biological model for training described in the aforementioned (2), it is preferable that there is included a through-hole continuous from the notch or the hole at one end or both the ends of the notch or the hole, and the through-hole is provided with a taper portion in which the hole diameter thereof gradually increases from the inner portion side toward the end portion side thereof.

Also, with respect to the biological model for training described in the aforementioned (2), it is preferable that insertion into the lumen portion is carried out in a state of being compressed.

Also, with respect to the biological model for training described in the aforementioned (2), it is preferable that the structure thereof is obtained by being molded and by filling plastically deformable material into a sheath inserted with a wire and a pusher.

Also, with respect to the biological model for training described in the aforementioned (2), it is preferable that it is used for a training in which one kind, two kinds or more of medical apparatuses are made to reach the biological model for training by passing through the tube inside and thereafter, the biological model is expanded.

Also, with respect to the biological model for training described in the aforementioned (2), it is preferable that the medical apparatus is a balloon catheter and/or a stent, which is used for a percutaneous coronary angioplasty.

(3) In order to achieve the aforementioned object, the present invention discloses:

a biological model for training, characterized by comprising:

an artificial tube shaped tissue which is constituted by a tube shaped body having a lumen portion and which simulates a tube shaped tissue; and an artificial lesion member which is arranged at the lumen portion of the artificial tube shaped tissue, which forms a shape of narrowing or closing the lumen portion and which simulates a lesioned portion occurring at a tube shaped tissue, wherein the artificial tube shaped tissue and the artificial lesion member are respectively objects which are constituted by plastically deformable materials and which are deformed plastically, when carrying out an expansion training with respect to the artificial lesion member in order to secure a flow path in the artificial tube shaped tissue, caused by the expansion thereof to the extent so as not to return to the shape before the expansion.

Thus, it is possible to arrange an artificial lesion member approximated with the physical property of the lesioned portion occurring at a tube shaped tissue in an arbitrary shape at an arbitrary position of the artificial tube shaped tissue. Therefore, owing to a fact that trainings corresponding to patient-conditions of various patients can be implemented by using a biological model for training provided with this artificial lesion member, it is possible for an operator to master more advanced skills in a situation other than applying operations to patients.

Also, with respect to the biological model for training described in the aforementioned (3), it is preferable that the artificial lesion member is a member easy to be deformed compared with the artificial tube shaped tissue.

Also, with respect to the biological model for training described in the aforementioned (3), it is preferable that it is difficult for the artificial lesion member, with respect to the shape after the expansion thereof, to return to the shape before the expansion compared with the artificial tube shaped tissue.

Also, with respect to the biological model for training described in the aforementioned (3), it is preferable that the artificial tube shaped tissue is constituted by a thermoplastic resin.

Also, with respect to the biological model for training described in the aforementioned (3), it is preferable that the artificial tube shaped tissue is constituted by a material in which the stress relaxation rate becomes 20% to 60% if initial tensile stress is made to be $f_0$ when a body made by forming the tube shaped body which becomes the artificial tube shaped tissue to be a strip is pulled in a circumferential direction of the tube shaped body such that the elongation becomes 100% in one minute at normal temperature, if the tensile stress after 5 minutes by maintaining the 100% elongation without change is made to be $f_r$, and if stress relaxation rate is made to be $((f_0-f_r)/f_0) \times 100$.

Also, with respect to the biological model for training described in the aforementioned (3), it is preferable that tensile elastic modulus of the artificial tube shaped tissue is identical to or larger than compressive elastic modulus of the artificial lesion member.

Also, with respect to the biological model for training described in the aforementioned (3), it is preferable that tensile elastic modulus of the artificial tube shaped tissue is 0.5 MPa to 50 MPa.

Also, with respect to the biological model for training described in the aforementioned (3), it is preferable that with respect to the artificial tube shaped tissue, when assuming that the inner diameter thereof is $\phi d_1$ and the outer diameter is $\phi d_2$, $d_2/d_1$ satisfies the relation of 1.01 to 2.

Also, with respect to the biological model for training described in the aforementioned (3), it is preferable that the inner diameter $\phi d_1$ is 0.5 mm to 10 mm.

Also, with respect to the biological model for training described in the aforementioned (3), it is preferable that the artificial tube shaped tissue has a branch portion in which a mid portion thereof is branched.

Also, with respect to the biological model for training described in the aforementioned (3), it is preferable that the artificial lesion member is arranged at the branch portion.

Also, with respect to the biological model for training described in the aforementioned (3), it is preferable that the artificial lesion member includes a through-hole passing through in the longitudinal direction of the artificial tube shaped tissue, and with respective to the through-hole, the inner surfaces thereof are contacted or separated together.

Also, with respect to the biological model for training described in the aforementioned (3), it is preferable that the through-hole is formed, at one end portion or at both the end portions thereof, with a taper portion in which the hole diameter of the through-hole increases gradually from the inner portion side toward the end portion side thereof.

Also, with respect to the biological model for training described in the aforementioned (3), it is preferable that the artificial lesion member is inserted into the lumen portion in a state of being compressed.

Also, with respect to the biological model for training described in the aforementioned (3), it is preferable that the artificial lesion member is constituted by a material including at least one kind within a silicone clay, a rubber clay, a resin clay and an oil clay.

Also, with respect to the biological model for training described in the aforementioned (3), it is preferable that compressive elastic modulus of the artificial lesion member is 0.001 MPa to 0.5 MPa.

Also, with respect to the biological model for training described in the aforementioned (3), it is preferable that it is used for a training in which one kind, two kinds or more of medical apparatuses are made to reach the artificial lesion member by passing through the artificial tube shaped tissue inside and thereafter, the artificial lesion member is expanded.

Also, with respect to the biological model for training described in the aforementioned (3), it is preferable that the medical apparatus is a balloon catheter and/or a stent which is used for a percutaneous coronary angioplasty.

(4) In order to achieve the aforementioned object, the present invention discloses:

a biological model for training, characterized by being constituted by a tube shaped body having a lumen portion and comprising an artificial tube shaped tissue simulating a tube shaped tissue, wherein the artificial tube shaped tissue is constituted by a plastically deformable material and formed with a diameter-reduction portion caused by a fact that a mid portion of the longitudinal direction thereof is diameter-reduced and deformed plastically, and it is used in an expansion training in which an expansion is carried out with respect to the narrow portion by assuming the diameter-reduction portion as a narrow portion occurring at a tube shaped tissue.

Thus, it is possible to arrange a diameter-reduction portion approximated with the physical property of a narrow portion occurring at a tube shaped tissue by an arbitrary size (shape) at an arbitrary position of the artificial tube shaped tissue.

Therefore, owing to a fact that trainings corresponding to patient-conditions of various patients can be implemented by using a biological model for training provided with this diameter-reduction portion, it is possible for an operator to master more advanced skills in a situation other than applying operations to patients.

Also, with respect to the biological model for training described in the aforementioned (4), it is preferable that when carrying out the expansion training, the diameter-reduction portion is a portion which is deformed plastically by the expansion thereof to the extent so as not to return to the shape before the expansion.

Also, with respect to the biological model for training described in the aforementioned (4), it is preferable that the artificial tube shaped tissue has thermal shrinkability, and the diameter-reduction portion is a portion formed by heating the artificial tube shaped tissue.

Also, with respect to the biological model for training described in the aforementioned (4), it is preferable that the artificial tube shaped tissue is elongatable in the longitudinal direction thereof, and the diameter-reduction portion is a portion formed depending on a fact that the artificial tube shaped tissue is pulled along the longitudinal direction thereof to the opposite directions each other.

Also, with respect to the biological model for training described in the aforementioned (4), it is preferable that the artificial tube shaped tissue is constituted by a thermoplastic resin.

Also, with respect to the biological model for training described in the aforementioned (4), it is preferable that the artificial tube shaped tissue is constituted by a material in which the stress relaxation rate becomes 20% to 60% if initial tensile stress is made to be $f_0$ when a body made by forming the tube shaped body which becomes the artificial tube shaped tissue to be a strip is pulled in a circumferential direction of the tube shaped body such that the elongation becomes 100% in one minute at normal temperature, if the tensile stress after 5 minutes by maintaining the 100% elongation without change is made to be $f_r$, and if stress relaxation rate is made to be $((f_0-f_r)/f_0) \times 100$.

Also, with respect to the biological model for training described in the aforementioned (4), it is preferable that tensile elastic modulus of the artificial tube shaped tissue is 0.5 MPa to 50 MPa.

Also, with respect to the biological model for training described in the aforementioned (4), it is preferable that the diameter-reduction portion includes a portion in which the inner diameter thereof changes.

Also, with respect to the biological model for training described in the aforementioned (4), it is preferable that the diameter-reduction portion is formed with a groove.

Also, with respect to the biological model for training described in the aforementioned (4), it is preferable that the diameter-reduction portion is installed with a stopper member for blocking a phenomenon, when carrying out the expansion training, that a portion thereof will expand.

Also, with respect to the biological model for training described in the aforementioned (4), it is preferable that it is used for a training in which one kind, two kinds or more of medical apparatuses are made to reach the artificial lesion member by passing through the artificial tube shaped tissue inside and thereafter, the artificial lesion member is expanded.

Also, with respect to the biological model for training described in the aforementioned (4), it is preferable that the medical apparatus is a balloon catheter and/or a stent which is used for a percutaneous coronary angioplasty.

(5) In order to achieve the aforementioned object, the present invention discloses:

a production method of the biological model for training according to the aforementioned (4), characterized in that the artificial tube shaped tissue has thermal shrinkability; and the diameter-reduction portion is formed by heating a mid portion of the artificial tube shaped tissue.

Thus, there is obtained a biological model for training in which it is possible to arrange a diameter-reduction portion approximated with the physical property of a narrow portion occurring at a tube shaped tissue by an arbitrary size (shape) at an arbitrary position of the artificial tube shaped tissue. Then, owing to a fact that trainings corresponding to patient-conditions of various patients can be implemented by using a biological model for training provided with this diameter-reduction portion, it is possible for an operator to master more advanced skills in a situation other than applying operations to patients.

(6) In order to achieve the aforementioned object, the present invention discloses:

A production method of the biological model for training according to the aforementioned (4), wherein the artificial tube shaped tissue is elongatable toward the longitudinal direction thereof, and the diameter-reduction portion is formed by pulling the artificial tube shaped tissue to the opposite directions each other along the longitudinal direction thereof.

Thus, there is obtained a biological model for training in which it is possible to arrange a diameter-reduction portion approximated with the physical property of a narrow portion occurring at a tube shaped tissue by an arbitrary size (shape) at an arbitrary position of the artificial tube shaped tissue. Then, owing to a fact that trainings corresponding to patient-conditions of various patients can be implemented by using a biological model for training provided with this diameter-reduction portion, it is possible for an operator to master more advanced skills in a situation other than applying operations to patients.

Also, with respect to the biological model for training described in the aforementioned (5) or (6), it is preferable that a restriction member for restricting the degree of diameter-reduction of the diameter-reduction portion is used when forming the diameter-reduction portion.

Also, with respect to the biological model for training described in the aforementioned (5) or (6), it is preferable that the restriction member is a member produced by simulating narrow-shape of an actual tube shaped tissue.

(7) In order to achieve the aforementioned object, the present invention discloses:

a biological model for training, characterized by comprising an artificial tube shaped tissue which is constituted by a tube shaped body, which includes a diameter-reduction portion whose mid portion in the longitudinal direction thereof is diameter-reduced and which simulates a tube shaped tissue; and a reinforcement member provided on the outer circumference side of the diameter-reduction portion for reinforcing the diameter-reduction portion, wherein an artificial narrow portion is constituted by the diameter-reduction portion and the reinforcement member, which simulates a narrow portion occurring at a tube shaped tissue, and the artificial narrow portion is used in an expansion training for carrying out expansion with respect to the narrow portion.

Thus, it is possible to arrange an artificial narrow portion approximated with the physical property of a narrow portion occurring at a tube shaped tissue by an arbitrary size (shape) at an arbitrary position. Therefore, owing to a fact that trainings corresponding to patient-conditions of various patients can be implemented by using a biological model for training provided with this artificial narrow portion, it is possible for an operator to master more advanced skills in a situation other than applying operations to patients.

Also, with respect to the biological model for training described in the aforementioned (7), it is preferable that when carrying out the expansion training, the artificial narrow portion is a portion which is deformed plastically by the expansion thereof to the extent so as not to return to the shape before the expansion.

Also, with respect to the biological model for training described in the aforementioned (7), it is preferable that at least one of the diameter-reduction portion and the reinforcement member is constituted by a plastically deformable material.

Also, with respect to the biological model for training described in the aforementioned (7), it is preferable that one of the diameter-reduction portion and the reinforcement member is constituted by a plastically deformable material and the other one is constituted by an elastic material.

Also, with respect to the biological model for training described in the aforementioned (7), it is preferable that the artificial tube shaped tissue is constituted by a thermoplastic resin at least for the diameter-reduction portion thereof.

Also, with respect to the biological model for training described in the aforementioned (7), it is preferable that the artificial tube shaped tissue is constituted by a material in which the stress relaxation rate becomes 20% to 60% if initial tensile stress is made to be $f_0$ when a body made by forming the tube shaped body which becomes the artificial tube shaped tissue to be a strip is pulled in a circumferential direction of the tube shaped body such that the elongation becomes 100% in one minute at normal temperature, if the tensile stress after 5 minutes by maintaining the 100% elongation without change is made to be $f_r$, and if stress relaxation rate is made to be $((f_0-f_r)/f_0) \times 100$.

Also, with respect to the biological model for training described in the aforementioned (7), it is preferable that the reinforcement member is constituted by a plastically deformable material and the plastically deformable material is a material including at least one kind within a silicone clay, a rubber clay, a resin clay and an oil clay.

Also, with respect to the biological model for training described in the aforementioned (7), it is preferable that the diameter-reduction portion is formed, at one end portion or at both the end portions thereof, with a taper portion in which the inner diameter of the diameter-reduction portion increases gradually from the inner portion side toward the end portion side thereof.

Also, with respect to the biological model for training described in the aforementioned (7), it is preferable that the reinforcement member is a member forming a ring shape, for the shape thereof, along the circumferential direction of the diameter-reduction portion.

Also, with respect to the biological model for training described in the aforementioned (7), it is preferable that there is further provided with a restriction member which is installed on the outer circumference side of the reinforcement member and which restricts the deformation thereof when the reinforcement member is deformed.

Also, with respect to the biological model for training described in the aforementioned (7), it is preferable that the restriction member is a band body forming a ring shape, which is constituted by a plastically deformable material or an elastic material.

Also, with respect to the biological model for training described in the aforementioned (7), it is preferable that one kind, two kinds or more of medical apparatuses are made to reach the artificial narrow portion by passing through the artificial tube shaped tissue inside and thereafter, the expansion training is carried out.

Also, with respect to the biological model for training described in the aforementioned (7), it is preferable that the medical apparatus is a balloon catheter and/or a stent which is used for a percutaneous coronary angioplasty.

BRIEF DESCRIPTION OF DRAWINGS

FIGS. 10A to 10D are diagrams for explaining a method of producing an artificial lesion member which becomes a biological model for training of the present invention and a method of arranging the produced artificial lesion member at a lumen portion of a tube;

FIGS. 13A to 13B are drawings for explaining a constitution of a connector, in which FIG. 13A shows a perspective view and FIG. 13B shows a vertical cross-section diagram;

FIGS. 14A to 14B are drawings for explaining a constitution of a connection mechanism, in which FIG. 14A shows a perspective view and FIG. 14B shows a vertical cross-section diagram;

FIGS. 23A to 23B are drawings for explaining a constitution of a connector, in which FIG. 23A shows a perspective view and FIG. 23B shows a vertical cross-section diagram;

FIGS. 24A to 24B are drawings for explaining a constitution of a connection mechanism, in which FIG. 24A shows a perspective view and FIG. 24B shows a vertical cross-section diagram;

BEST MODE FOR CARRYING OUT THE INVENTION

Hereinafter, a biological model for training and a production method of a biological model for training of the present invention will be explained in detail based on preferred exemplified embodiments shown in attached drawings.

First Exemplified Embodiment

The artificial lesion member (lesioned model) which becomes a biological model for training of the present invention is arranged at aforesaid lumen portion of the tube provided with a lumen portion and is a member which forms a shape for narrowing or closing aforesaid lumen portion when being arranged at aforesaid lumen portion, and aforesaid artificial lesion member is constituted by a plastically deformable material and is a member which is deformed plastically to the extent so as not to return to the shape before the expansion caused by aforesaid expansion when arranging aforesaid artificial lesion member at aforesaid lumen portion and carrying out an expanding training in order to secure the flow path.

This artificial lesion member is arranged in a three-dimensional model (tube model) which is produced artificially by duplicating various kinds of tubes of a human living body provided, for example, with lumen portions such as a blood vessel (artery, vein), a lymphatic vessel, a bile duct, a ureter, oviduct and the like, a medical apparatus such as a balloon catheter and the like is made to reach the artificial lesion member by using such a three-dimensional model and thereafter, there is implemented a training or the like for securing a flow path by expanding the artificial lesion member, for indwelling a stent at the expanded artificial lesion member and the like. Hereinafter, it will be explained by taking a case in which an artificial lesion member is arranged in a three-dimensional model formed corresponding to a shape of an artery as one example.

Figure 1:
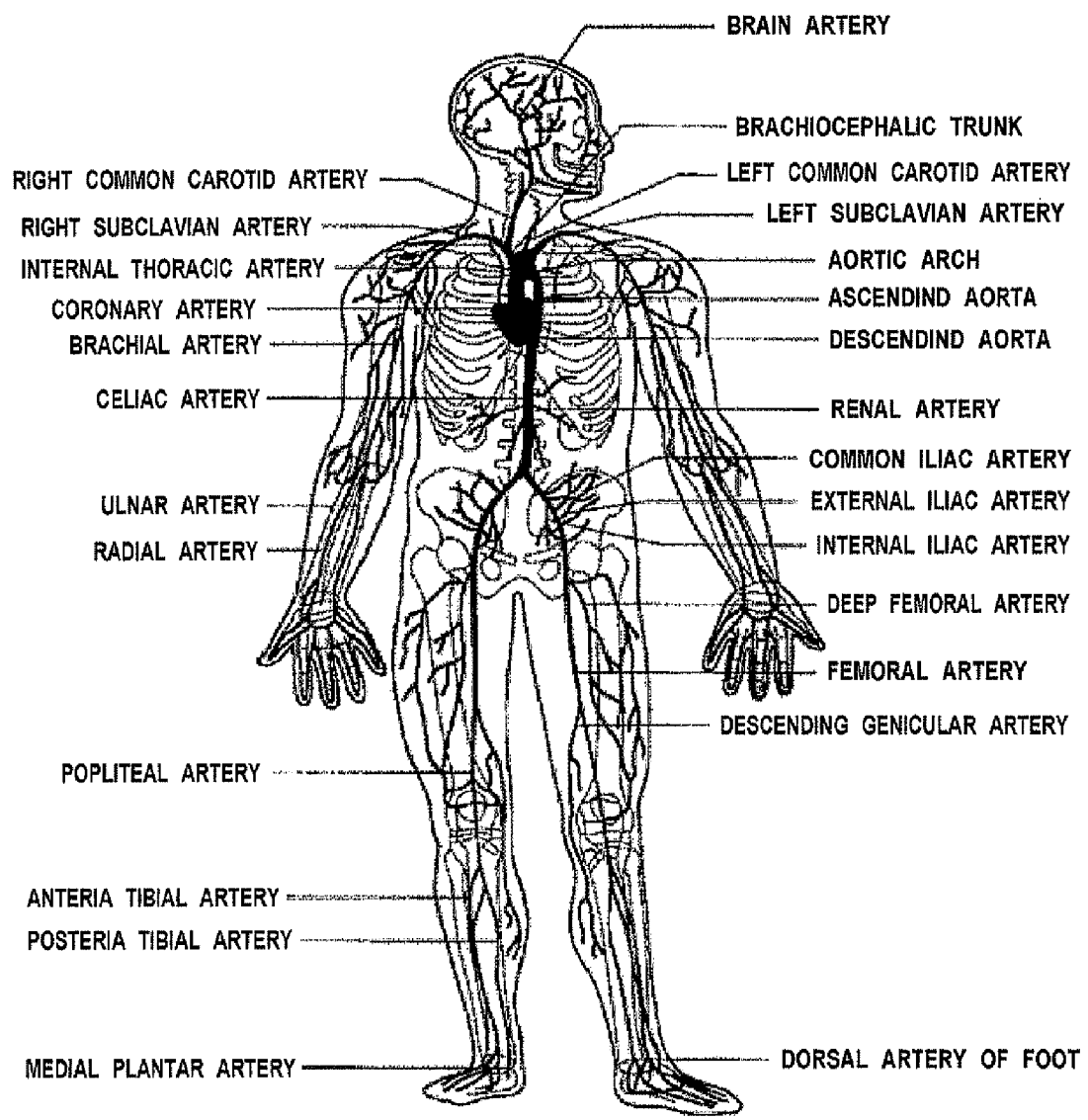
FIG. 1 is a schematic diagram showing arteries (including heart) in a whole human body.

Arteries (including heart) of a whole human body form a shape as shown in a schematic diagram of FIG. 1. A three-dimensional model corresponding to this artery shape is produced as follows based, for example, on the description of Japanese registered patent No. 3613568.

First, tomogram data of a cavity portion (blood flow path) provided in an artery are obtained by using a diagnostic imaging apparatus such as a CT scanner, an MRI scanner and the like and thereafter, there is lamination-shaped a lumen model which forms a shape of an artery lumen portion based on the tomogram data corresponding to this artery lumen portion.

Figure 2:
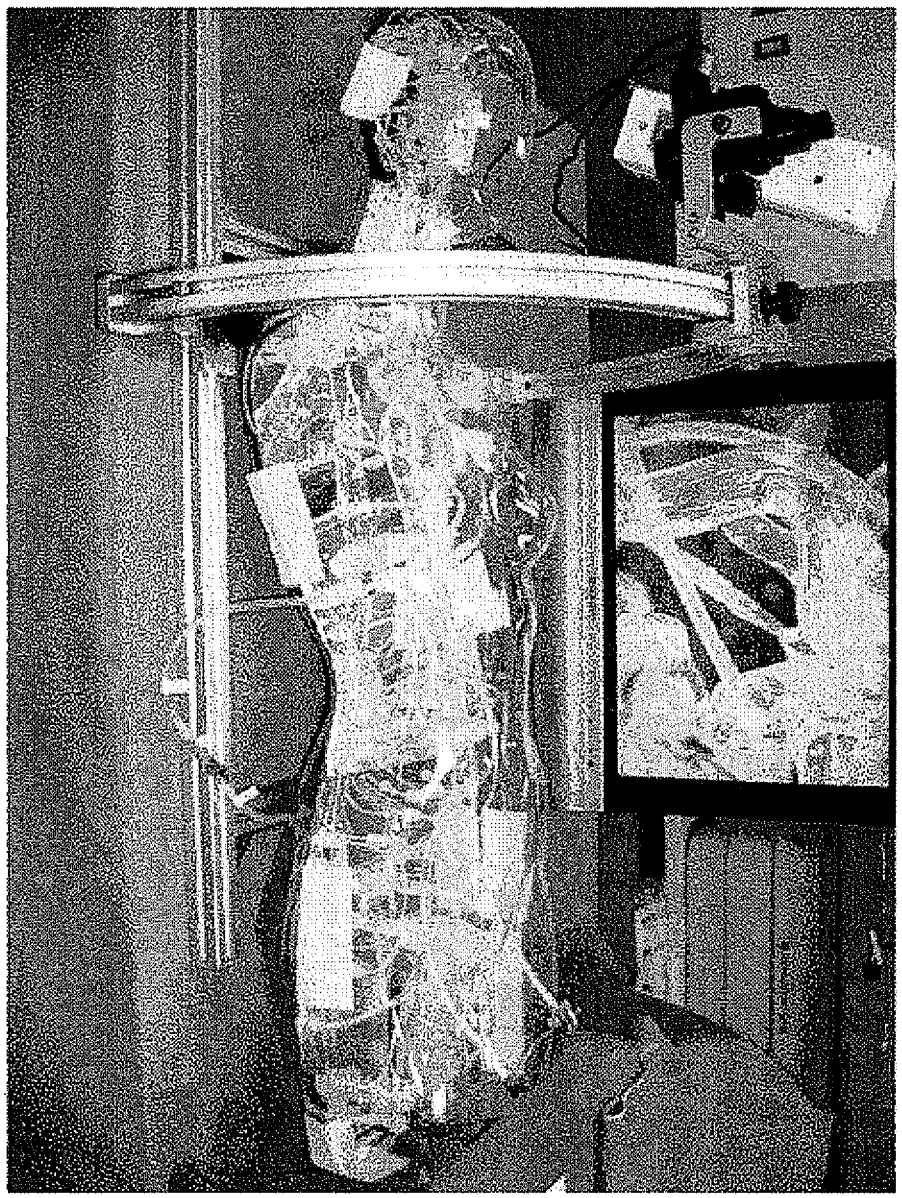
FIG. 2 is a whole photograph of a constitution in which the arteries shown in FIG. 1 is applied to a three-dimensional model.

Next, in a state of surrounding the surround of the lumen model by a three-dimensional model molding material, the three-dimensional model molding material is hardened and thereafter, by removing the lumen model, there is formed an artery model (three-dimensional model) corresponding to the artery shape as shown in the whole photograph of FIG. 2.

By arranging the artificial lesion member at an arbitrary position of an artery (model), for example, a coronary artery, a brain artery, a carotid artery, a renal artery, a brachial artery or the like at each portion, which is provided for the artery model such as mentioned above, a medical apparatus such as a balloon catheter and the like is positioned at the artificial lesion member (narrow model) and thereafter, it is possible, by expanding this artificial lesion member, to carry out a training for securing a flow path, and it will be explained in this exemplified embodiment by taking a case as a representative in which an artificial lesion member is arranged at a coronary artery provided in the arterial model.

Figure 3:
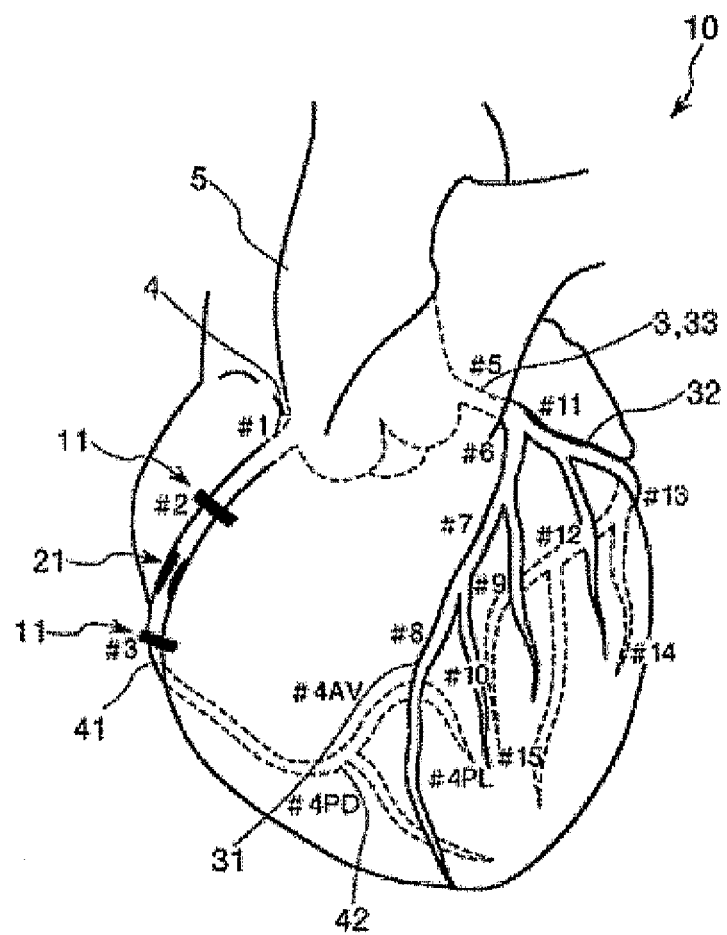
FIG. 3 is a schematic diagram showing a first exemplified embodiment in which an artificial lesion member which becomes a biological model for training of the present invention is arranged at a right coronary artery.
Figure 8A:
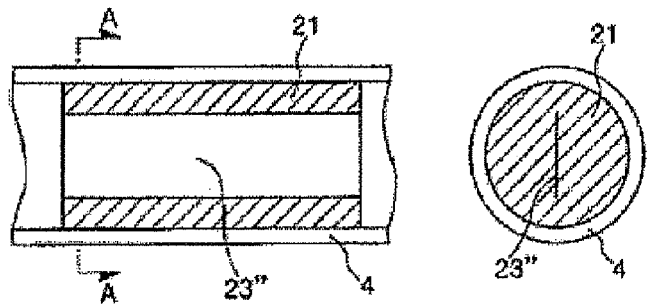
FIGS. 8A to 8D are drawings showing various kinds of constitutions of obstructive-type artificial lesion members, in which left drawings show vertical cross-section diagrams and right drawings show cross-section diagrams at A-A lines of the left drawings.
Figure 8B:
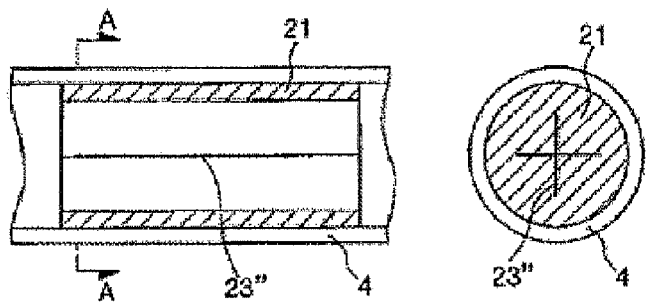
Figure 8C:
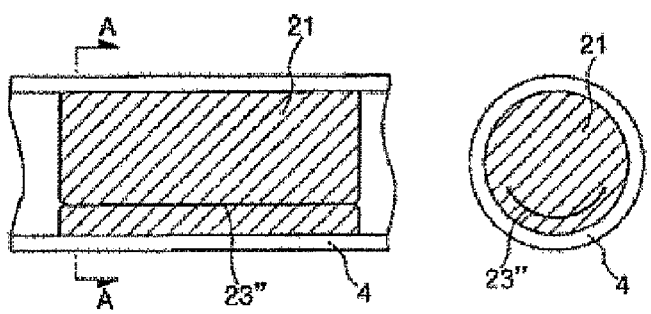
Figure 8D:
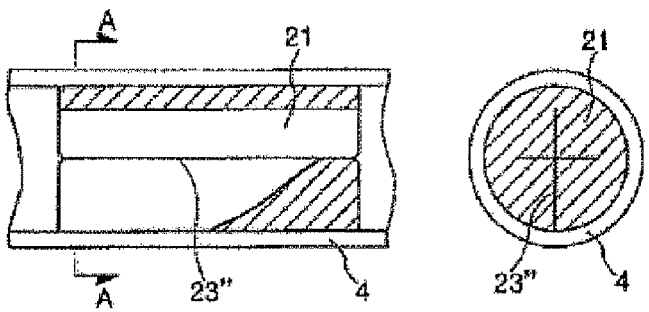
Figure 9A:
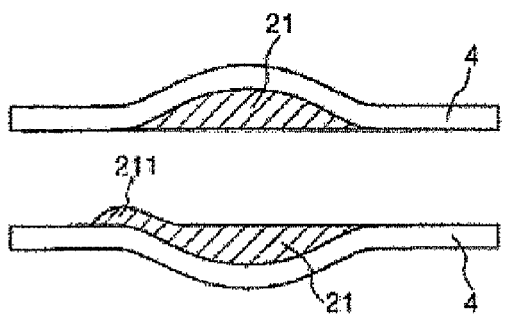
FIGS. 9A to 9C are vertical cross-section diagrams showing states of the artificial lesion members after the training.
Figure 9B:
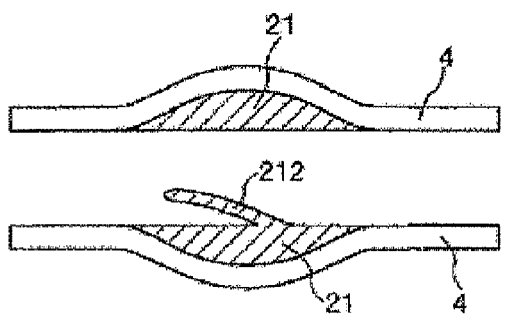
Figure 9C:
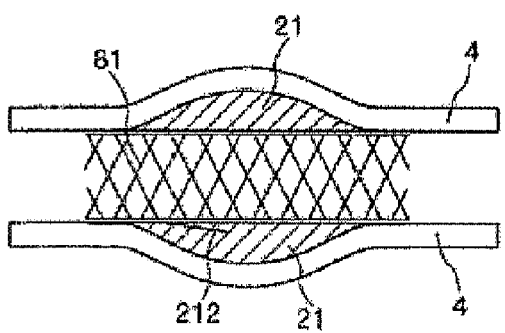
Figure 11A:
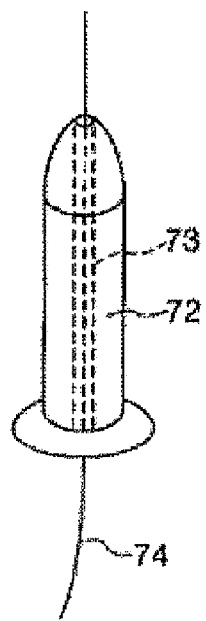
FIGS. 11A to 11B are diagrams for explaining another production method of producing an artificial lesion member which becomes a biological model for training of the present invention.
Figure 11B:
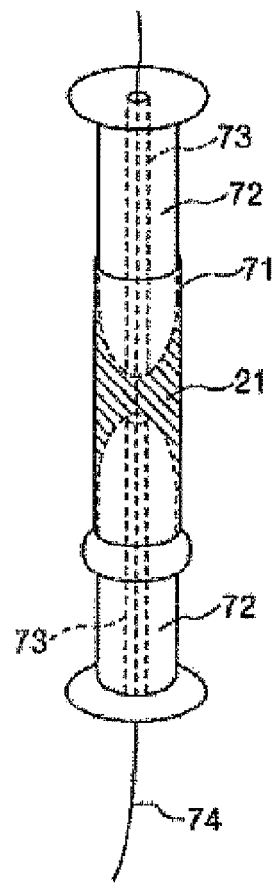
Figure 12:
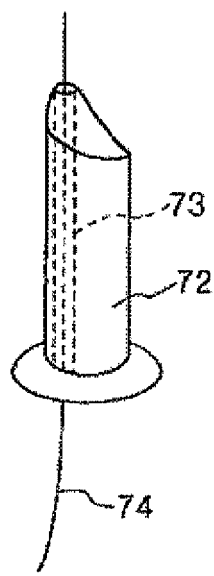
FIG. 12 is a diagram showing another constitution of a pusher used when producing an artificial lesion member which becomes a biological model for training of the present invention.
Figure 13A:
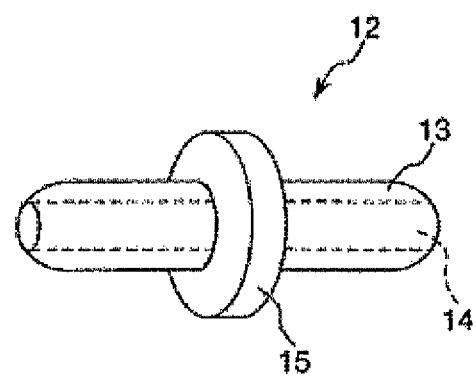
Figure 13B:
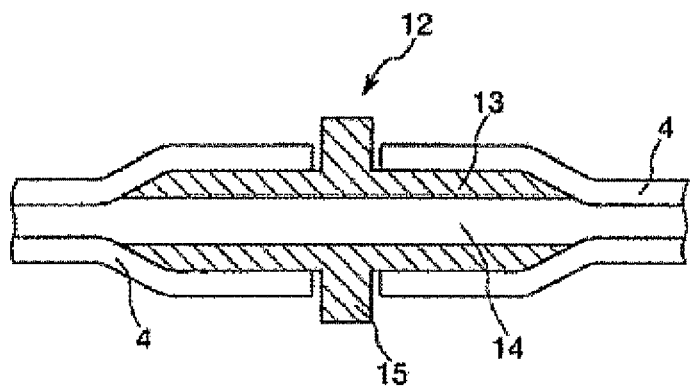
Figure 14A:
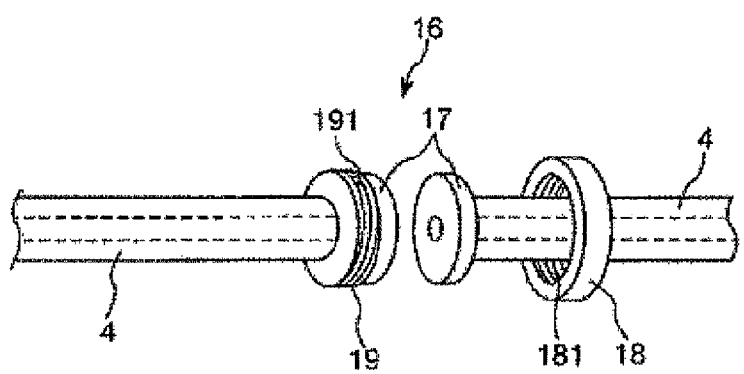
Figure 14B:
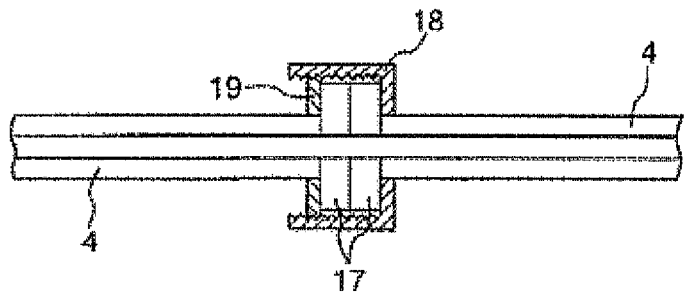
Figure 15:
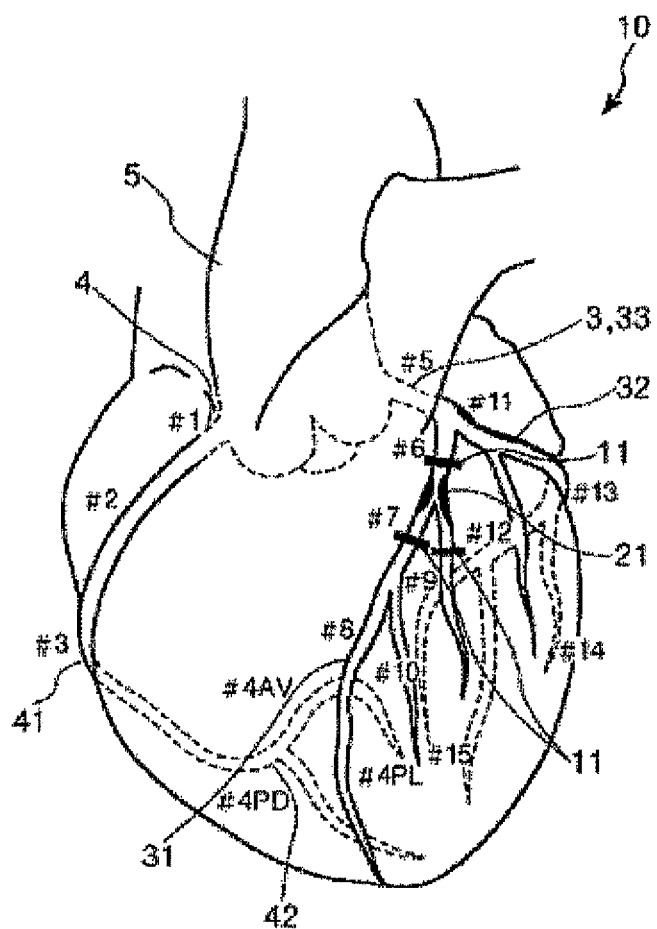
FIG. 15 is a schematic diagram showing a second exemplified embodiment in which an artificial lesion member which becomes a biological model for training of the present invention is arranged at a branch portion of a left coronary artery.
Figure 16A:
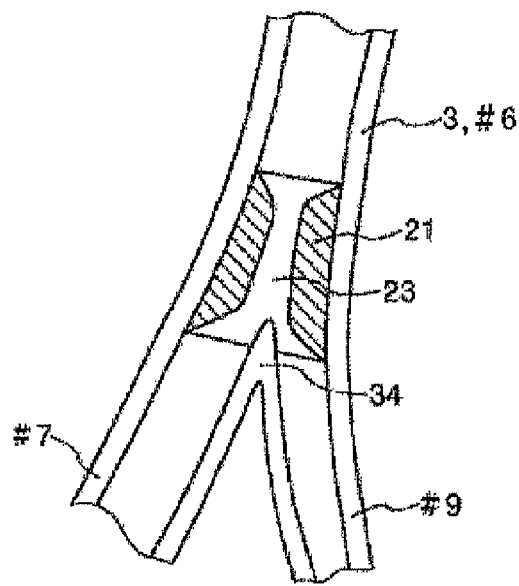
FIGS. 16A to 16B are vertical cross-section diagrams showing various kinds of constitutions of artificial lesion members which become biological models for training arranged at the branch portion.
Figure 16B:
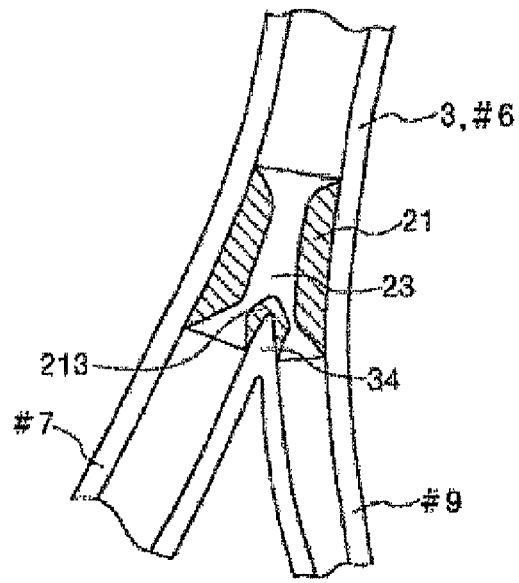
Figure 17:
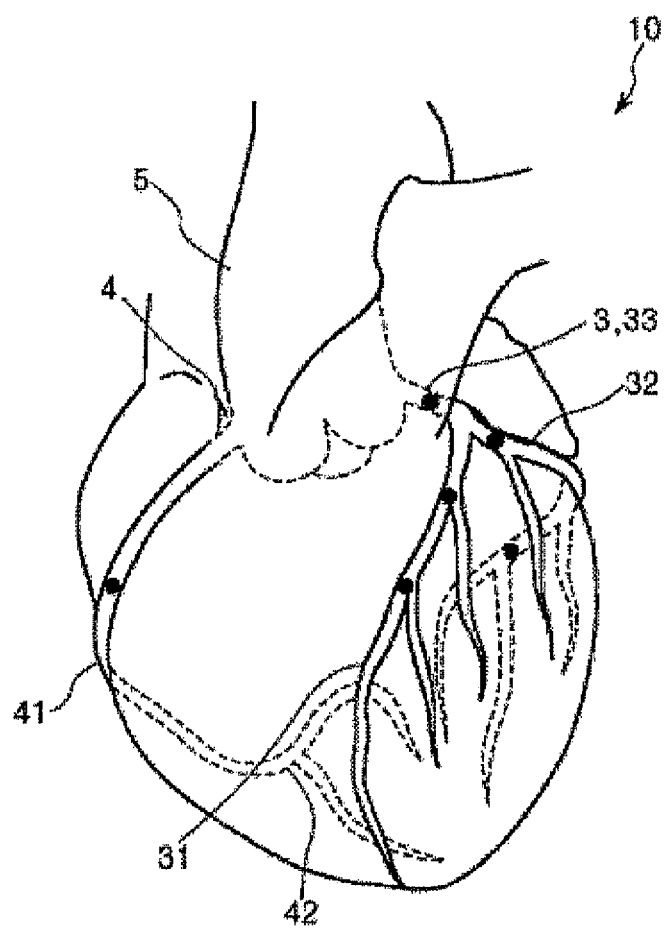
FIG. 17 is a diagram for showing a favorite site of a lesion in which an artificial lesion member which becomes a biological model for training of the present invention is arranged.

FIG. 3 is a schematic diagram showing a first exemplified embodiment in which an artificial lesion member which becomes a biological model for training of the present invention is arranged at a right coronary artery; FIGS. 4A to 4D are diagrams showing procedures by which a training of a PTCA operation is carried out with respect to an artificial lesion member arranged at the right coronary artery; FIGS. 5A to 5B and FIGS. 6A to 6D are drawings showing various kinds of constitutions narrow-type artificial lesion members, in which left drawings show vertical cross-section diagrams and right drawings show cross-section diagrams at A-A lines of the left drawings; FIGS. 7A to 7B and FIGS. 8A to 8D are drawings showing various kinds of constitutions of obstructive-type artificial lesion members, in which left drawings show vertical cross-section diagrams and right drawings show cross-section diagrams at A-A lines of the left drawings; FIGS. 9A to 9C are vertical cross-section diagrams showing states of the artificial lesion members after the training; FIGS. 10A to 10D are diagrams for explaining a method of producing an artificial lesion member which becomes a biological model for training of the present invention and a method of arranging the produced artificial lesion member at a lumen portion of a tube; FIGS. 11A to 11B are diagrams for explaining another production method of producing an artificial lesion member which becomes a biological model for training of the present invention; FIG. 12 is a diagram showing another constitution of a pusher used when producing an artificial lesion member which becomes a biological model for training of the present invention; FIGS. 13A to 13B are drawings for explaining a constitution of a connector, in which FIG. 13A shows a perspective view and FIG. 13B shows a vertical cross-section diagram; FIGS. 14A to 14B are drawings for explaining a constitution of a connection mechanism, in which FIG. 14A shows a perspective view and FIG. 14B shows a vertical cross-section diagram; FIG. 15 is a schematic diagram showing a second exemplified embodiment in which an artificial lesion member which becomes a biological model for training of the present invention is arranged at a branch portion of a left coronary artery; FIGS. 16A to 16B are vertical cross-section diagrams showing various kinds of constitutions of artificial lesion members arranged at the branch portion; and FIG. 17 is a diagram for showing a favorite site of a lesion in which an artificial lesion member which becomes a biological model for training of the present invention is arranged. It should be noted in the explanation hereinafter that the upper side in FIGS. 3 to 17 is referred to as "UP" and the down side thereof is referred to as "DOWN". Also, in FIG. 3, FIG. 15 and FIG. 17, in order to make it easy to understand the shape, the position and the like of the coronary artery, there are diagrammatically illustrated in addition with respect to the shape of the heart.

In a sinus of Valsalva of an aorta 5, a coronary artery 10 is composed of a left coronary artery 3 and a right coronary artery 4 which are branched to right and left.

This coronary artery 10 is constituted by a hardened material of the three-dimensional model molding material mentioned above.

Also, for the three-dimensional model molding material, it is not limited in particular, but there can be cited, for example, a silicone elastomer, a silicone rubber such as silicone gel, a polyurethane elastomer, a silicone resin, an epoxy resin, a thermosetting resin such as a phenol resin, poly methyl methacrylate, polyvinyl chloride, a thermoplastic resin such as polyethylen or the like, and it is possible to use one kind within those or to use two kinds or more by combination. It is preferable within these materials in particular to use the silicone rubber. By constituting the coronary artery 10 by a hardened material of this material, the coronary artery 10 becomes an artery which is excellent in transparency and also which exerts elasticity and flexibility approximating those of the actual coronary artery.

Specifically, it is preferable for the breaking strength of the coronary artery 10 constituted by silicone rubber to be around 0.5 MPa to 3.0 Mpa and more preferably to be around 1.0 MPa to 2.0 MPa.

Also, it is preferable for the breaking elongation of the coronary artery 10 to be around 50% to 300% and more preferably to be around 100% to 200%.

Further, it is preferable for the Shore A hardness (defined in ASTMD2240) of the coronary artery 10 to be around 10 to 40 and more preferably to be around 25 to 35.

Further, it is preferable for the tensile elastic modulus of the coronary artery 10 to be around 0.01 MPa to 5.0 Mpa and more preferably to be around 0.1 MPa to 3.0 MPa.

Also, although it is not limited in particular, it is preferable for the inner diameter $\phi$ of the coronary artery 10 to be set around 0.5 mm to 10 mm and more preferably to be set around 1.0 mm to 5.0 mm. By setting the inner diameter $\phi$ of the coronary artery 10 within such a range, it is possible to implement a training corresponding to an actual human coronary artery reliably and skill upgrade of an operator can be attempted accurately.

The right coronary artery 4 goes out anteriorward from the superior portion of the right sinus of coronary artery, which is one of the sinuses of Valsalva and thereafter, runs between a right atrium and a pulmonary artery by being covered with a right auricle, goes around a superior border 41 along a right atrioventricular groove, goes toward a posterior descending branch 42, and derives a blood vessel for feeding the down side of a posterior wall of left ventricle and a septum by a posterior interventricular groove.

It should be noted in this right coronary artery 4 that an upper half portion which is formed by halving a portion from the entrance of the right coronary artery 4 to the superior border 41 is referred to as Segment 1 (#1: Proximal), the lower half thereof is referred to as Segment 2 (#2: Middle), and a portion from the superior border 41 to a point branched at the posterior descending branch 42 is referred to as Segment 3 (#3: Distal). Also, a portion after the branch of the posterior descending branch 42 is referred to as Segment 4, and this Segment 4 is divided into three portions of #4AV, #4PD and #4PL.

Also, the left coronary artery 3 goes out to left front from the superior portion of the sinus of left coronary artery, which is one of sinuses of Valsalva, and is branched into a left anterior descending branch 31 which enters into the anterior interventricular groove and a left circumflex branch 32.

It should be noted that a region from the aorta 5 to a point branched into the left anterior descending branch 31 and the left circumflex branch 32 is referred to as a left main trunk 33 (Segment 5). Also, the left anterior descending branch 31 is subdivided into Segments 6 to 10 and within these, the main trunk of the left anterior descending branch 31 is classified into three portions of Segment 6 (#6: Proximal), Segment 7 (#7: Middle) and Segment 8 (#8: Distal), the Segment 9 (#9: first diagonal branch) is branched from a portion between Segment 6 and Segment 7, and Segment 10 (#10: second diagonal branch) is branched from a portion between Segment 7 and Segment 8. Further, the left circumflex branch 32 is subdivided into Segments 11 to 15 and within these, the main trunk of the left circumflex branch 32 is classified into two portions of Segment 11 (#11: Proximal) and Segment 13 (#13: distal), and Segment 12 (#12: obtuse marginal branch: OM) is branched from a connection portion between Segment 11 and Segment 13.

First, with respect to this exemplified embodiment (first exemplified embodiment), in the coronary artery 10 having such a constitution, there is arranged an artificial lesion member 21 at the Segment 2 (#2: Middle) of the right coronary artery 4 and there are provided connection portions 11 at both the end portions of this Segment 2 through the artificial lesion member 21.

With respect to the artificial lesion member 21 arranged at such a position, a training of PTCA operation is to be carried out, and such a training is implemented according to procedures as shown as follows.

Figure 4A:
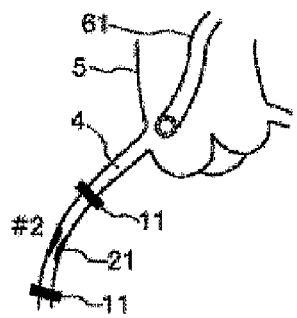
FIGS. 4A to 4D are diagrams showing procedures by which a training of a PTCA operation is carried out with respect to an artificial lesion member arranged at the right coronary artery.

[1] First, a sheath catheter (not shown) is inserted into a femoral artery and subsequently, a guide wire for guide catheter (not shown) is inserted thereinto, and in a state of advancing the distal end thereof until the vicinity of the entrance of the right coronary artery 4, a guide catheter 61 is advanced along the guide wire for guide catheter, the distal end thereof is positioned at the entrance of the right coronary artery 4 (see FIG. 4A).

Figure 4B:
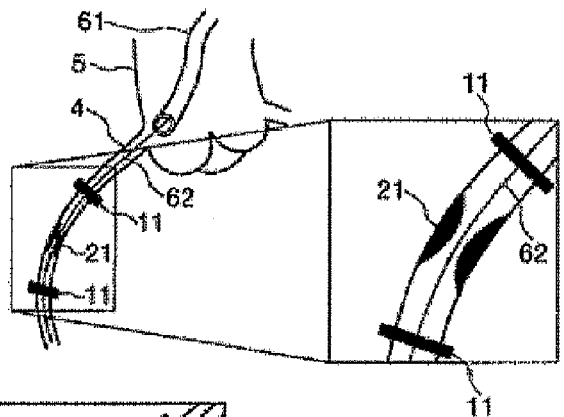

[2] Next, the guide wire for guide catheter is pulled out, a guide wire for balloon catheter 62 inserted into the inside of the guide catheter 61 and the guide wire for balloon catheter 62 is projected from the distal end of the guide catheter 61 and further, the guide wire for balloon catheter 62 is advanced until a position beyond the artificial lesion member 21 arranged at the right coronary artery 4 (see FIG. 4B).

Figure 4C:
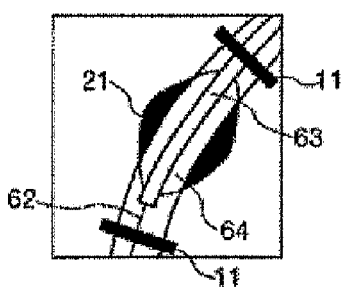

[3] Next, a distal portion of a balloon catheter 63 which is passed through from the proximal (femoral artery) side of the guide wire for balloon catheter 62 is projected from the distal end of the guide catheter 61 and further, is advanced along the guide wire for balloon catheter 62, a balloon 64 of the balloon catheter 63 is positioned at the artificial lesion member 21, and thereafter, the balloon 64 is expanded by injecting fluid for balloon expansion to the balloon 64 from the proximal side of the balloon catheter 63 (see FIG. 4C). Thus, the artificial lesion member 21 is pushed and expanded.

Figure 4D:
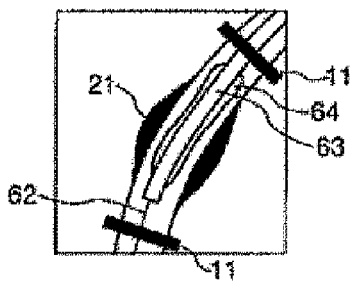

[4] Next, the fluid for balloon expansion is discharged from the proximal side of the balloon catheter 63 and the balloon 64 is contracted as shown in FIG. 4D. Thereafter, the guide wire for balloon catheter 62, the balloon catheter 63, the guide catheter 61 and the sheath catheter are pulled out from the femoral artery side. Thus, a blood flow path is formed at the artificial lesion member 21.

The shapes of the lure lesion member 21 used for such a training mentioned above are classified into shapes of narrow-types or obstructive-type shapes corresponding to the degree of stricture thereof.

Hereinafter, it will be explained with respect to the shapes of the artificial lesion member 21 in sequence by making the classification according to the kinds of these types.

<Narrow-Type>

Figure 5A:
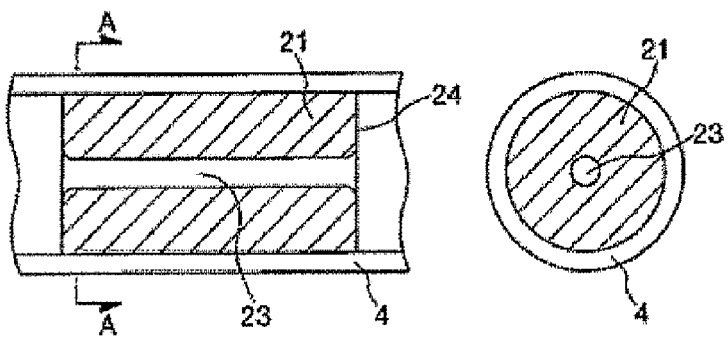
FIGS. 5A to 5B are drawings showing various kinds of constitutions narrow-type artificial lesion members, in which left drawings show vertical cross-section diagrams and right drawings show cross-section diagrams at A-A lines of the left drawings.

Within narrow-type artificial lesion members 21, an artificial lesion member 21 of a first constitution shown in FIG. 5A includes a through-hole 23 passing through approximately at the center portion thereof in the axis direction (longitudinal direction) and the whole shape thereof is a cylindrical shaped body forming approximately a cylindrical shape.

With respect to the artificial lesion member 21 having such a constitution, when arranging this artificial lesion member 21 at the right coronary artery (lumen portion) 4, the right coronary artery 4 is narrowed by the cylindrical shaped body constituting the periphery portion of the through-hole 23.

With respect to the artificial lesion member 21 of this first constitution, it is preferable, in aforesaid process [3], to carry out a training in which the balloon catheter 63 is advanced inside the right coronary artery 4 along the guide wire for balloon catheter 62, the balloon 64 is made to reach the artificial lesion member 21 narrowing the right coronary artery 4, that is, the through-hole 23 inside and thereafter, the artificial lesion member 21 (through-hole 23) is expanded by inflating the balloon 64.

The length of the artificial lesion member 21 is not limited in particular, but it is preferable to be around 1 mm to 100 mm and more preferably to be around 5 mm to 50 mm. By setting the length of the artificial lesion member 21 within such a range, it is possible to implement a training suitable for the size of a more actual lesioned region (stricture region).

Also, the outer diameter φ of the artificial lesion member 21 is set properly corresponding to the size of the inner diameter φ of the right coronary artery 4 arranged and although it is not to be limited in particular, it is preferable to be around 0.5 mm to 5.0 mm and more preferably to be around 1.0 mm to 3.0 mm.

It should be noted that it is preferable for the outer diameter φ of the artificial lesion member 21, which is set within such a range, to be set more largely than the inner diameter φ of the right coronary artery 4. Thus, the artificial lesion member 21 is inserted into the right coronary artery (lumen portion) 4 in a state of being compressed and as a result thereof, it happens that the artificial lesion member 21 is to be fixed inside the right coronary artery 4 reliably, so that it is possible at the time of training to reliably prevent a phenomenon in which it happens that the artificial lesion member 21 is displaced unwillingly caused by a contact of the guide wire for balloon catheter 62 or the balloon catheter 63.

Further, although it is not limited in particular, it is preferable for the inner diameter φ of the through-hole 23 of the artificial lesion member 21 to be around 0.1 mm to 2.0 mm and more preferably to be around 0.3 mm to 1.0 mm. By setting the inner diameter φ of the through-hole 23 within such a range, it is possible to reliably implement a training suitable for the degree of stricture of the actual stricture region and it is possible to attempt skill upgrade of an operator accurately.

Figure 5B:
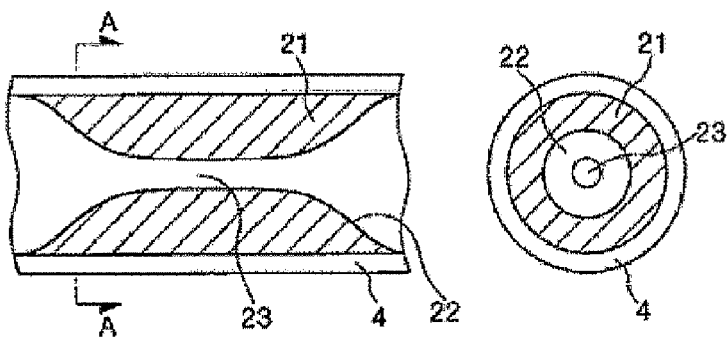

Next, an artificial lesion member 21 of a second constitution shown in FIG. 5B, similarly as the artificial lesion member 21 of the first constitution, includes a through-hole 23 passing through at the center portion thereof in the axis direction and the whole shape thereof forms approximately a cylindrical shape, but there are provided, at both the end portions thereof, with taper portions in which the hole diameters (outer diameters) of the through-hole 23 increase gradually from the inner portion sides toward the external sides thereof, and the widths thereof become "0" substantively at both the ends of the artificial lesion member 21.

In other words, the through-hole 23 forms funnel shapes at both the end portions thereof and includes inclined surfaces 22 respectively in which both the inner circumferential surfaces of the end portions of the artificial lesion member 21 are inclined from the insides of the artificial lesion member 21 toward the sides of both the end portions.

With respect to the artificial lesion member 21 of this second constitution, it is preferable, in aforesaid process [3], to carry out a training in which when the balloon 64 is made to reach the through-hole 23, the balloon 64 is made to reach the through-hole 23 inside while making the balloon catheter 63 so as to go along the inclined surface 22 of the artificial lesion member 21 and thereafter, the artificial lesion member 21 (through-hole 23) is expanded by inflating the balloon 64.

It should be noted that the inclined surface 22 is not limited in particular, but it is preferable to be inclined by an angle of around 15° to 65° with respect to the center axis of the through-hole 23 and more preferably to be inclined by an angle of around 22° to 55°. Thus, it is possible to reliably implement a more suitable training with respect to the shape of the actual stricture region.

Further, there are provided in this exemplified embodiment with taper portions at both the end portions of the artificial lesion member 21, but it is not limited by such a case and it is enough if a taper portion is provided at either one of the two end portions.

Figure 6A:
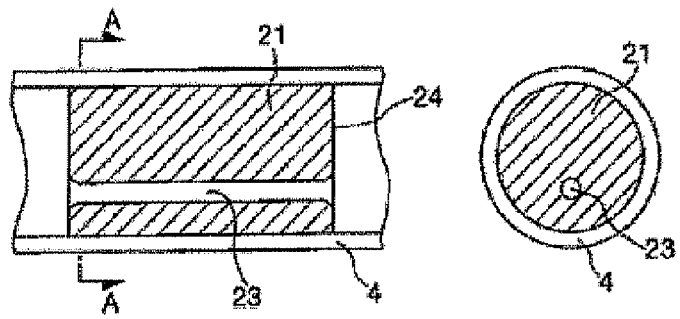
FIGS. 6A to 6D are drawings showing various kinds of constitutions narrow-type artificial lesion members, in which left drawings show vertical cross-section diagrams and right drawings show cross-section diagrams at A-A lines of the left drawings.
Figure 6B:
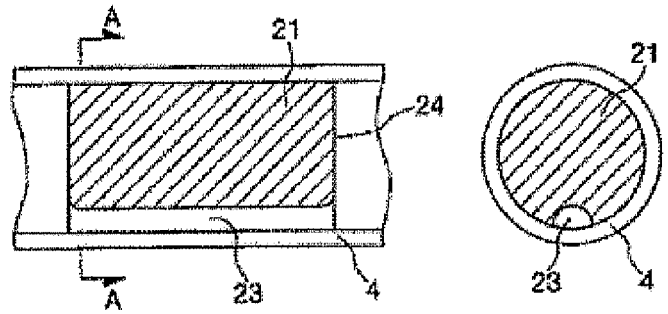
Figure 6C:
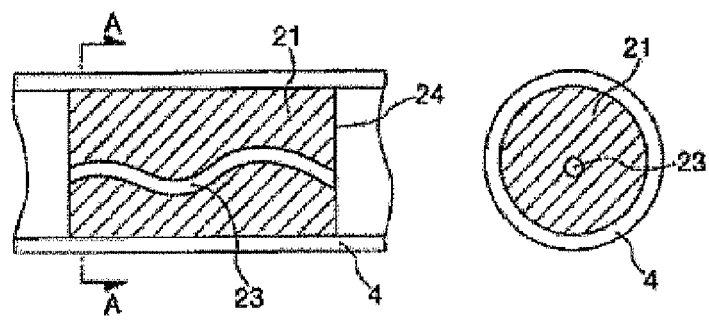
Figure 6D:
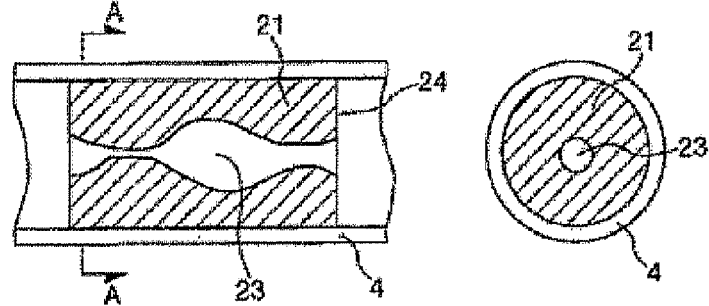

Also, it was explained in the artificial lesion members 21 of the first constitution and the second constitution with respect to a case in which the through-hole 23 passes through by going approximately straight in an axis direction (longitudinal direction) at approximately the center portion thereof, but it is not limited by such a constitution, and it is allowed for the through-hole 23 to be formed at a whatever position in a whatever shape and, for example, it is allowed for the through-hole 23 to be located eccentrically on the edge portion side (FIG. 6A), it is allowed for a portion thereof to be opened at the edge portion (FIG. 6B), it is allowed to meander (be curved) (FIG. 6C) and it is allowed to be diameter-expanded and diameter-reduced at mid portions thereof (FIG. 6D).

<Obstructive-Type>

Figure 7A:
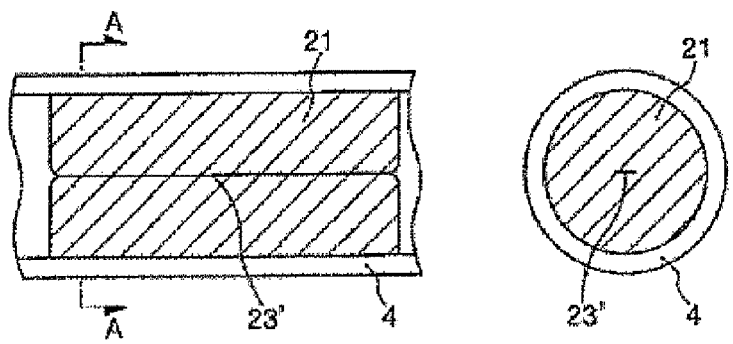
FIGS. 7A to 7B are drawings showing various kinds of constitutions of obstructive-type artificial lesion members, in which left drawings show vertical cross-section diagrams and right drawings show cross-section diagrams at A-A lines of the left drawings.

Within obstructive-type artificial lesion members 21, an artificial lesion member 21 of a third constitution shown in FIG. 7A includes a continuous hole 23' at the center portion thereof in the axis direction (longitudinal direction) and is a member having a constitution similar to the artificial lesion member 21 having the first constitution mentioned above other than a constitution that the inner surfaces of this hole 23' are firmly attached together when arranging this artificial lesion member 21 inside the right coronary artery 4.

With respect to the artificial lesion member 21 having this third constitution, the right coronary artery 4 is occluded at a position at which this artificial lesion member 21 is arranged by a fact that the inner surfaces of the hole 23' are firmly attached together as mentioned above.

With respect to the artificial lesion member 21 of this third constitution, it is preferable, in aforesaid process [3], to carry out a training in which when the balloon catheter 63 is advanced inside the right coronary artery 4 along the guide wire for balloon catheter 62, the balloon 64 is made to reach the this hole 23' inside while pushing and expanding the hole 23' and thereafter, the artificial lesion member 21 (the hole 23') is expanded by inflating the balloon 64.

Figure 7B:
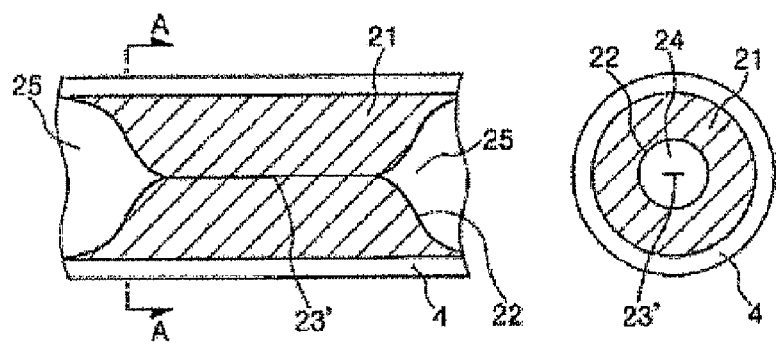

Next, an artificial lesion member 21 of a fourth constitution shown in FIG. 7B includes a through-holes 25 at the both ends of a hole 23', which is continuous from the hole 23' and is a member having a constitution similar to the artificial lesion member 21 having the third constitution mentioned above other than a constitution that the hole diameters of these through-holes 25 increase gradually from the inner portion sides thereof toward the end portion sides thereof.

More specifically, the artificial lesion member 21 having the fourth constitution is a member having a constitution formed by combining the artificial lesion member 21 having the second constitution and the artificial lesion member 21 having the third constitution, and is a member in which the inner surfaces of the hole 23' are firmly attached together and also, in which both the end portions thereof are constituted by taper portions provided with inclined surfaces 22.

With respect to the artificial lesion member 21 of this fourth constitution, it is preferable, in aforesaid process [3], to carry out a training in which when the balloon 64 is made to reach the hole 23', the distal end thereof is introduced until the entrance of the hole 23' while making balloon catheter 63 so as to go along the inclined surface 22 of the artificial lesion member 21 and thereafter, the artificial lesion member 21 (through-hole 23) is expanded by inflating the balloon 64.

It should be noted in the artificial lesion members 21 of the third constitution and the fourth constitutions that it was explained with respect to a case in which the holes 23' are continuously formed approximately in straight toward the axis direction (longitudinal direction) at approximately the center portion thereof, but it is not to be limited by such a constitution. Specifically, it is allowed to employ an axially continuous notch 23" instead of the axially continuous hole 23. Also, it is allowed for the this notch 23" to be formed at a whatever position in a whatever shape and, for example, it is allowed for the notch 23" to be formed in a horizontal line shape (FIG. 8A) or in a cross shape (FIG. 8B), it is allowed to be formed in an U-shape and to be located eccentrically on the edge portion side (FIG. 8C) and it is allowed to form a shape in which one end of the notch is opened at a portion of the outer circumference thereof (FIG. 8D).

The artificial lesion member 21 having each constitution which forms such a shape mentioned above is constituted by a plastically deformable material in the present invention and is a member which is deformed plastically caused by aforesaid expansion to the extent so as not to return to the shape before the expansion.

Here, it is required technologically for the PTCA operation, when expanding the artificial lesion member 21 by the balloon 64, to generate a movement portion 211 (plaque shift, see FIG. 9A) caused by a fact that the end portion of the artificial lesion member 21 moves outside and to secure a flow path (restore a blood flow) without rendering generation of a dissociation portion 212 (see FIG. 9B) caused by a fact that a portion of the artificial lesion member 21 is ruptured or the like.

Consequently, if the artificial lesion member 21 is used for the training of PTCA operation, the artificial lesion member 21 is deformed plastically, so that even after removing the guide wire for balloon catheter 62 and the balloon catheter 63 from the artificial lesion member 21 in aforesaid process [4], it happens that the artificial lesion member 21 is to maintain the shape pushed and expanded by the balloon 64. Therefore, it is possible, after the training of PTCA operation, to carry out an evaluation whether or not a movement portion 211, a dissociation portion 212 or the like occurs at the artificial lesion member 21 more reliably, so that it is possible to implement a higher-quality training.

Also, it is possible to implement a training while observing the expansion of the balloon 64 in aforesaid process [3] depending on a visual contact or an X-ray contrast image and it is possible to carry out the judgment of the degree of expansion of the artificial lesion member 21 and whether or not the movement portion 211, the dissociation portion 212 or the like occurs at that actual place, so that also from such a view point, it is possible to implement a higher-quality training.

It should be noted that it is possible to prevent re-narrow of the artificial lesion member 21 and dissociation of the dissociation portion 212 by indwelling a stent 81, as shown in FIG. 9C, with respect to the artificial lesion member 21 after restoring blood flow depending on aforesaid process [4], that is, with respect to the artificial lesion member 21 after the PTCA operation is treated medically. It is possible to use the artificial lesion member 21 also in a training of treatment for indwelling such a stent 81 and if the artificial lesion member 21 is used in such a training, it is possible to implement more reliably about the evaluation whether or not the re-narrow and the dissociation of the dissociation portion 212 are prevented preferably.

Also, it is preferable for the artificial lesion member 21 which is deformed plastically that the elastic modulus thereof is selected to be smaller than that of the right coronary artery 4 at which this member is arranged. The actual lesioned region (stricture region) formed inside a human body is constituted mainly by a deposit of cholesterol which is deposited on a blood vessel and generally, the elastic modulus thereof is smaller than the elastic modulus of the blood vessel. Therefore, by making the elastic modulus of the artificial lesion member 21 smaller than the elastic modulus of the right coronary artery 4, it is possible to implement a training approximated with the physical property of the actual lesioned region reliably.

Consequently, it is preferable for the compressive elastic modulus of the artificial lesion member 21 to be around 0.001 MPa to 0.5 Mpa and more preferably to be around 0.01 MPa to 0.3 MPa.

By setting the physicality value of the artificial lesion member 21 to be within such a range, the physical property of the artificial lesion member 21 becomes a property in which plastic deformation is carried out in a state of being more approximated with the actual lesioned region and it is possible to implement a higher-quality training.

It is preferable for the constituent material of the artificial lesion member 21 to be a material which can exert the physical property as mentioned above onto the artificial lesion member 21, and also, to be a material which maintains plasticity over long hours and whose physical property does not change easily even after being molded as the artificial lesion member 21.

Specifically, there can be cited such as a silicone clay, a rubber clay, a resin clay and an oil clay and the like, and it is possible to use one kind within those or to use two kinds or more by combination.

Within aforementioned clays, there can be cited, for example, for the silicone clay a material which includes: 100 pts.wt component, as a silicone rubber, formed by mixing polyorganosiloxane whose coefficient of viscosity is around 5000 cSt to 200000 cSt (25° C.) and polyorganosiloxane whose coefficient of viscosity is 1000000 cSt (25° C.) or more by the weight ratio of 80:20 to 40:60; 20 pts.wt to 100 pts.wt component, as an inorganic filler material, formed by one kind of such as quartz powder, diatomaceous earth, magnesium silicate, calcium carbonate, talc and mica powder and the like or formed by two kinds or more thereof by combination; and 10 pts.wt component as a liquid paraffin if required. Also, it is possible for the silicone clay having such a constitution to be obtained by preparing aforementioned silicone rubber, an inorganic filler material and if required, a liquid paraffin respectively, and by kneading those above uniformly by using a kneading machine such as a roll and a kneader, which is used for usual rubber kneading.

It should be noted that although it is not limited in particular, it is preferable for the average particle diameter of the inorganic filler material to be around 0.1 μm to 50 μm and more preferably to be around 0.5 μm to 30 μm. When the average particle diameter is smaller than 0.1 μm, there is a fear depending on the kind of the inorganic filler material that the silicone clay becomes too hard or viscosity thereof becomes poor. Also, when the average particle diameter exceeds 50 μm, there is a fear depending on the kind of the inorganic filler material that it becomes difficult to obtain an elongatable physicality. There is a fear that it is difficult for the blending quantity of the inorganic filler material to obtain a preferable clay shaped substance if the quantity is too few and to become too hard if the quantity is too many.

Also, the liquid paraffin has a function for improving viscous property of the viscosity, but when this contained amount is made to be too many, bleeding occurs and it sometimes happens that it is attached to a hand or the like.

For the rubber clay, there can be cited a clay containing a natural rubber or a butyl rubber instead of the aforementioned silicone rubber.

For the resin clay, there can be generally cited a clay constituted by making a starch and/or flour and a vinyl acetate emulsion-based bonding agent as main materials. For the starch and flour, there can be respectively cited, for example, such as a corn starch, a potato starch, a wheat starch, a rice starch, a tapioca starch, a sweet potato starch and the like, and such as a wheat flour, a corn flour, a rice flour, a buckwheat flour and the like. For the vinyl acetate emulsion-based bonding agent, there can be cited, for example, a vinyl acetate resin emulsion, an ethylene-vinyl acetate copolymer emulsion, an acryl-vinyl acetate copolymer emulsion and the like.

It should be noted that it is preferable for these blending quantities that the vinyl acetate emulsion-based bonding agent is around 100 pts.wt to 150 pts.wt with respect to 100 pts.wt of starch or flour. Also, it is allowed for the resin clay to contain such as an inorganic substance powder, a wax, a soap and the like other than those materials. For the inorganic substance powder, there can be cited, for example, such as a quartz, a kaolin, a zeolite, a diatomaceous earth, a talc, a bentonite, a borax, a stone dust and the like, and it is possible to use one kind within those or to use two kinds or more by combination. Also, for the wax, there can be cited such as a beeswax and the like. For the soap, there can be cited such as a fatty acid salt soap and the like. However, it is preferable for any one of those that the blending quantity thereof is set to become less than 10 pts.wt.

For the oil clay, usually, there is used a clay formed by kneading an inorganic filler agent such as a clay, a calcium carbonate and a sericite-based clay, and a soap and oil component together. In more detail, it is preferable to use a clay in which for the oil component, there is contained a liquid paraffin and/or microcrystalline wax as much as around 15 pts.wt to 45 pts.wt with respect to 100 pts.wt of the inorganic filler agent, for the soap, there is contained one kind within an alkaline metal soap, an alkaline earth metal soap and an aluminum soap or two kinds or more thereof by combination as much as around 0.2 pts.wt to 15 pts.wt, and further, there is contained glycerin as much as around 0.2 pts.wt to 10 pts.wt.

It should be noted that for an illustrative embodiment of the silicone clay mentioned above, there can be cited a transparent clay (manufactured by Nisshin Associates Inc.) and for an illustrative embodiment of the resin clay, there can be cited "Excellent" (manufactured by Nisshin Associates Inc.).

It is possible for such an artificial lesion member 21 mentioned above to be produced, for example, as follows.

[I] First, there are prepared a sheath (SHEATH) 71, a pusher 72 which is slidable inside the sheath 71 and which is provided with a through-hole 73 in the axial direction, and a wire 74 to be passed through into the through-hole 73 inside, and as shown in FIG. 10A, the wire 74 is passed through into the through-hole 73 and the sheath 71 inside in a state in which the pusher 72 is inserted inside the sheath 71.

[II] Next, a plastically deformable material which is a constituent material of the artificial lesion member 21 is molded by being filled inside the sheath 71 in a state in which the wire 74 and the pusher 72 are inserted, and the artificial lesion member 21 is obtained inside the sheath 71 (see FIG. 10B).

Here, in this exemplified embodiment, the pusher 72 is constituted for the distal end thereof by a flat surface as shown in FIGS. 10A to 10D, so that the artificial lesion member 21 is produced as a member of a first constitution.

Also, when the plastically deformable material is molded, it is possible to make the through-hole 23 meander by making the wire 74 meander inside the sheath 71 and also, it is possible for the through-hole 23 to be diameter-expanded & diameter-reduced by using a diameter-expanded & diameter-reduced wire as the wire 74.

[III] Next, Segment 2 of the right coronary artery 4 is removed at a connection portion 11 and the sheath 71 is inserted inside this removed Segment 2 (see FIG. 10C).

[IV] Next, the wire 74 is pulled out from the inside of the sheath 71 and through-hole 73 and thereafter, the pusher 72 is slid to the distal direction inside the sheath 71 by being press-operated. Thus, the artificial lesion member 21 is pushed out from the sheath 71 inside and arranged inside the Segment 2 (see FIG. 10D).

It should be noted that it is preferable for the inner surface of the sheath 71 to be applied with a coating process using a release agent beforehand. Thus, it is possible for the artificial lesion member 21 to be pushed out from the sheath 71 inside easily by the press operation of the pusher 72 without a phenomenon in which deformation or the like occurs at the artificial lesion member 21. Also, for the release agent, although it is not limited in particular, it is possible to use, for example, a silicone oil or the like.

By way of such a process mentioned above, the produced artificial lesion member 21 is arranged inside the Segment 2 of the right coronary artery 4, that is, at the lumen portion of the tube.

Also, in case of producing an artificial lesion member 21 of a second constitution, as shown in FIG. 11A, there are prepared for the pusher 72 with two pieces of pushers whose distal portions are diameter-reduced toward the distal sides thereof and it is possible to produce the artificial lesion member 21 of the second constitution by changing aforesaid process [II] to a process [II'] as follows.

[II'] A plastically deformable material which is a constituent material of the artificial lesion member 21 is filled inside the sheath 71 in a state in which the pusher 72 whose distal portion is diameter-reduced toward the distal side and the wire 74 are inserted and thereafter, further, another pusher 72 is inserted from the opposite side with respect to the side from which the previous pusher 72 is inserted. Thereafter, by molding aforesaid fluid material in this state, it is possible to obtain the artificial lesion member 21 of the second constitution inside the sheath 71 (see FIG. 11B).

Further, in case of producing an artificial lesion member 21 of a second constitution in which the through-hole 23 is located to the edge portion side eccentrically, as shown in FIG. 12, it is possible to produce the artificial lesion member 21 of such a constitution easily if using a member in which also the through-hole 73 is located to the edge portion side eccentrically inside the pusher 72.

Also, the connection portions 11 are provided at both the end portions of the Segment 2 respectively (see FIG. 3), as explained in the production method of the artificial lesion member 21 mentioned above, so as to be able to arrange the artificial lesion member 21 at the position of the Segment 2 (#2: Middle) of the right coronary artery 4 and in order to be made detachable at the Segment 2 portion. More specifically, the Segment 2 are connected to the end portion of the Segment 1 for one end thereof and to the end portion of the Segment 3 for the other end thereof by the connection portions 11 respectively, and thus, there can be obtained a constitution detachable from the right coronary artery 4.

If there is employed a constitution in which such connection portions 11 are detachable at the Segment 2 portion and also, respective end portions to be connected each other can be connected liquid-tightly, it is allowed to employ any kind of constituent portions and it is possible to connect liquid-tightly, for example, by employing a constitution which uses a connector or a connection mechanism as shown as follows.

<Connector>

A connector 12 is a connector including a main body 13 which has a through-hole 14 passing through the center portion thereof in the axis direction (longitudinal direction) and whose whole shape forms approximately a cylindrical shape, and a flange 15 provided approximately at the center of the main body 13.

The main body 13 includes diameter-reduction portions which are diameter-reduced at both the end portions thereof, the outer diameters of these diameter-reduction portions are set to be smaller than the inner diameter of the right coronary artery 4, and on the flange 15 sides from the diameter-reduction portions, the outer diameters thereof are set largely compared with the inner diameter of the right coronary artery 4.

When inserting the right coronary artery 4 from the distal end (cut surface) of the right coronary artery 4 with respect to the connector 12 having such a constitution toward the flange 15 side from aforesaid distal portion, the inner diameter of the right coronary artery 4 is diameter-expanded. Thus, it happens that the outer circumferential surface of the main body 13 and the inner circumferential surface of the right coronary artery 4 will be firmly attached each other, so that the end portions of the right coronary artery 4 are connected each other liquid-tightly by the connector 12.

For the constituent material of the connector 12, although it is not limited in particular, various kinds of resin materials are used preferably and specifically, there can be cited various kinds of resin materials such as polyethylen, polypropylene, ethylene-propylene copolymer, polyolefin such as ethylene-vinyl acetate copolymer (EVA), polyvinyl chloride, polyvinylidene chloride, polystyrene, polyamide, polyimide, polyamideimide, polycarbonate, poly-(4-methylpentene-1), ionomer, acryl-based resin, polymethylmethacrylate, acrylonitrile-butadiene-styrene copolymer (ABS resin), acrylonitrile-styrene copolymer (AS resin), butadiene-styrene copolymer, polyethylenterephtalete (PET), polybutylene-terephtalete (PBT), polyester such as polycyclohexane-terephtalete (PCT), polyether, polyetherketon (PEK), polyetheretherketon (PEEK), polyetherimide, polyacetal (POM), polyphenyleneoxide, modified polyphenyleneoxide, polysulphone, polyethersulphone, polyphenylene sulfide, polyalylate, aromatic polyester (liquid crystal polymer), Polytetrafluoroethylene, polyvinylidene difluoride and the like, and it is possible to use one kind within those or to use two kinds or more by combination.

<Connection Mechanism>

A connection mechanism 16 is a mechanism which includes flanges 17 provided at respective distal ends (cut surfaces) of the cut right coronary artery 4, a ring shaped member (first ring shaped member) 18 supported by one of the right coronary arteries 4 rotatably and a ring shaped member (second ring shaped member) 19 firmly fixed to the other right coronary artery 4 so as to contact with the flange 17.

The ring shaped member 18 is formed with an open portion opening to the flange 17 side and the inner surface of this open portion is formed with a female screw 181.

Also, the ring shaped member 19 is formed with a male screw 191 on the outer circumferential surface thereof and further, it is constituted such that it is possible for the ring shaped member 19 to be inserted (screwed) to the open portion of the ring shaped member 18 by a mechanism in which this ring shaped member 19 is set to have a size insertable to the open portion formed for the ring shaped member 18.

In the mechanism 16 having such a connection constitution, by screwing the female screw 181 and the male screw 191 together, which are formed at the ring shaped members 18, 19 respectively in a state of contacting the end surfaces of the two flanges 17 each other, it happens that the end surfaces of the two flanges 17 will be firmly attached together each other, so that the end portions of the right coronary arteries 4 are connected liquid-tightly by the connection mechanism 16.

For constituent materials of various kinds of constitution members of the connection mechanism 16, materials similar to those of the constituent materials of the connector 12 mentioned above are used preferably.

Second Exemplified Embodiment

Next, it will be explained with respect to a second exemplified embodiment in which differently from the Segment 2 (#2: Middle) of the right coronary artery 4, there is arranged an artificial lesion member 21 on the left coronary artery 3.

Hereinafter, with respect to the second exemplified embodiment in which the artificial lesion member 21 is arranged in the left coronary artery 3, it will be explained centering around different aspects with respect to aforesaid first exemplified embodiment and with respect to similar matters, the explanation thereof will be omitted.

More specifically, in this exemplified embodiment (second exemplified embodiment), as shown in FIG. 15, it happens that there is employed a constitution similar to that of aforesaid first exemplified embodiment other than a fact that an artificial lesion member 21 is arranged at a branch portion (bifurcation) 34 in which Segment 6 of the left coronary artery 3 is branched into Segment 7 and Segment 9, and connection portions 11 are provided at mid portions of Segment 6, Segment 7 and Segment 9 respectively through this artificial lesion member 21.

For the artificial lesion member 21 arranged at such a branch portion 34, there can be cited, for example, a member having a fifth constitution as shown in FIG. 16A and a member having a sixth constitution as shown in FIG. 16B.

The artificial lesion member 21 of the fifth constitution is a member having a constitution similar to that of the artificial lesion member 21 of the second constitution mentioned above other than a fact that there is formed a cylindrical shaped body diameter-expanded from one end toward the other end and also a through-hole 23 formed inside thereof is diameter-expanded similarly. The artificial lesion member 21 of the fifth constitution having such a constitution is arranged in such a manner that the distal end of the branch portion 34 is to be inserted into the other end side whose diameter is diameter-expanded.

Also, the artificial lesion member 21 of the sixth constitution is a member having a constitution similar to that of the artificial lesion member 21 of the fifth constitution mentioned above other than a fact that it is branched into a Y-shape on the other end side whose diameter is diameter-expanded and also the through-hole 23 formed in the inside thereof has such a constitution of being similarly branched into a Y-shape. The artificial lesion member 21 of sixth constitution having such a constitution is arranged in such a manner that the branch portion 34 of the left coronary artery 3 and the branch portion forming the Y-shape of the artificial lesion member 21 will abut each other.

In the artificial lesion members 21 of these fifth and sixth constitutions, usually, the guide wire for balloon catheter 62 is, first, passed through from the Segment 6 to the Segment 7 side, the balloon 64 is made to reach the position of the artificial lesion member 21 by advancing the balloon catheter 63 along this guide wire for balloon catheter 62, further, the balloon 64 is inflated at this position, and the Segment 7 side of the artificial lesion member 21 is expanded. Subsequently, the guide wire for balloon catheter 62 is passed through from the Segment 6 to the Segment 9 side, the balloon 64 is made to reach the position of the artificial lesion member 21 similarly as mentioned above and thereafter, by inflating the balloon and by expanding the Segment 9 side of the artificial lesion member 21, there is implemented a training of securing a flow path.

With respect to such a training, an advanced skill is required in order to avoid a phenomenon in which when expanding the Segment 7 side of the artificial lesion member 21, it happens that the balloon 64 crushes also the Segment 9 side of the artificial lesion member 21; caused by this, the end portion of the Segment 9 side of the artificial lesion member 21 is moved (plaque shifted); and finally, the Segment 9 is to be occluded. When applying the artificial lesion member 21 to such a training, the artificial lesion member 21 is a member deformed plastically by the expansion to the extent such that it does not return to the shape before the expansion, so that when expanding the Segment 7 side of the artificial lesion member 21, it is possible to carry out the evaluation whether or not occlusion occurs at the Segment 9 more reliably. Consequently, if applying the artificial lesion member 21 to such a training, it is possible to implement a higher-quality training reliably.

It should be noted in this exemplified embodiment that the connection portions 11 are provided at mid portions of Segment 6, Segment 7 and Segment 9 respectively so as to be able to arrange the artificial lesion member 21 at the branch portion 34 as mentioned above and thus, with respect to the connection portions 11, there is employed a constitution in which a portion of the Segment 6, the Segment 7 and the Segment 9 including the branch portion 34 is detachable from the left coronary artery 3 (see FIG. 15).

In addition, it is possible also for the artificial lesion members 21 of the fifth constitution and the sixth constitution which were explained in this exemplified embodiment to be produced similarly as the artificial lesion member 21 explained in aforesaid first exemplified embodiments. For example, it is possible to be formed by preparing a sheath diameter-expanded in a taper shape, a pusher which has an outer diameter in conformity with the taper shaped inner diameter of the sheath and whose distal end is diameter-reduced, and a wire passing through a through-hole; and by filling a plastically deformable material which is a constituent material of the artificial lesion member 21 into the sheath. Also, it is possible for an artificial lesion member 213 which is installed at the branch portion 34 in FIG. 16B to be formed separately by coating a plastically deformable material on the branch portion 34.

It should be noted that it was explained, in aforesaid first exemplified embodiment, with respect to a case in which the artificial lesion member 21 is arranged at the Segment 2 (#2: Middle) of the right coronary artery 4 and it was explained, in aforesaid second exemplified embodiment, with respect to a case in which the artificial lesion member 21 is arranged at the branch portion 34 at which the Segment 6 (#6) of the left coronary artery 3 is branched into Segment 7 (#7) and Segment 9 (#9), but the position arranged with the artificial lesion member 21 is not limited by such a position and it is enough if arranging the artificial lesion member 21 at a favorite site in which a narrow or an occlusion of the coronary artery occurs by high probability and if implementing a training corresponding to the favorite site. It should be noted, for the favorite site at which such an artificial lesion member 21 is arranged, that there can be cited, for example, positions marked with "●" shown in FIG. 17.

As described above, if the artificial lesion member 21 is used, it is possible, in a three-dimensional model using a tube which has a lumen portion of a coronary artery (blood vessel) or the like, to arrange an artificial lesion member 21 approximated with a physical property of a lesioned region at an arbitrary position thereof in an arbitrary shape. Therefore, owing to a fact that it is possible to implement trainings corresponding to patient's conditions of various patients by using the three-dimensional model provided with this artificial lesion member 21, it is possible for an operator to master more advanced skills in a situation other than applying operations to patients.

Figure 18A:
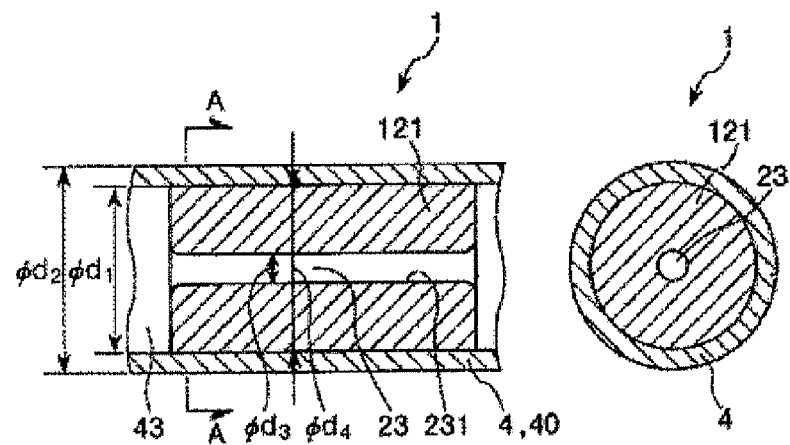
FIGS. 18A to 18B are drawings showing various kinds of constitutions of narrow-type biological models for training, in which left drawings show vertical cross-section diagrams and right drawings show cross-section diagrams at A-A lines of the left drawings.
Figure 18B:
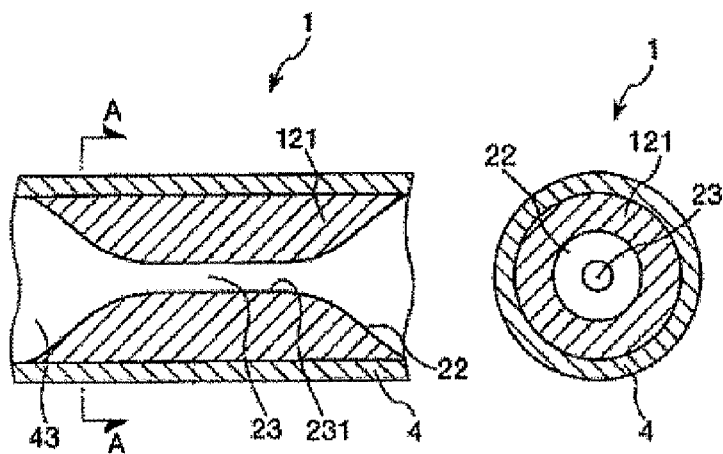
Figure 20A:
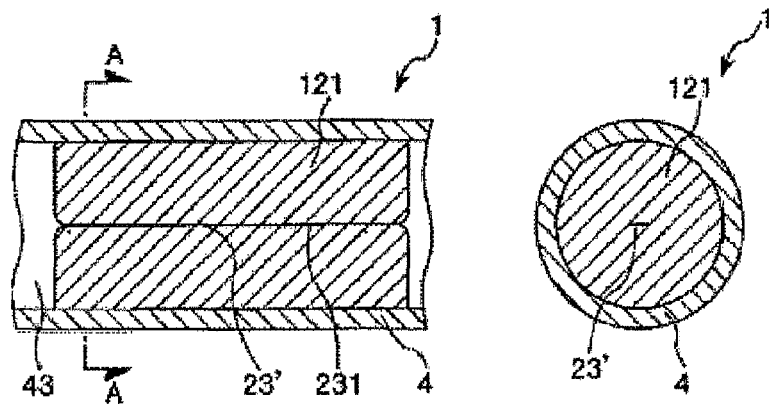
FIGS. 20A to 20B are drawings showing various kinds of constitutions of obstructive-type biological models for training, in which left drawings show vertical cross-section diagrams and right drawings show cross-section diagrams at A-A lines of the left drawings.
Figure 20B:
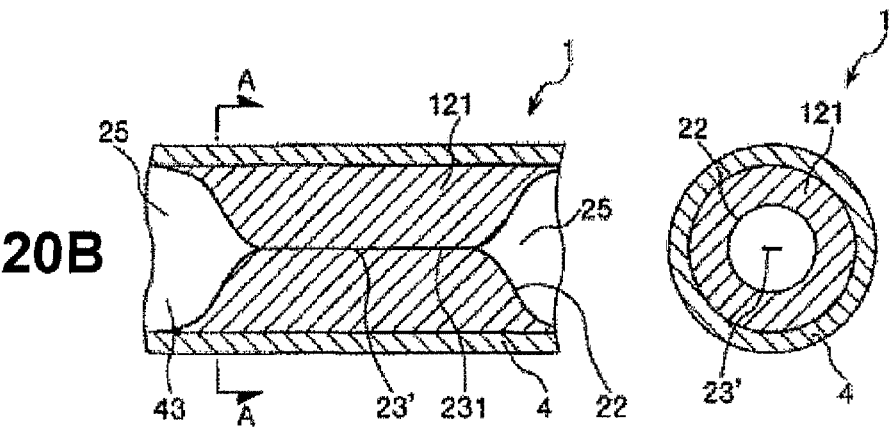
Figure 21A:
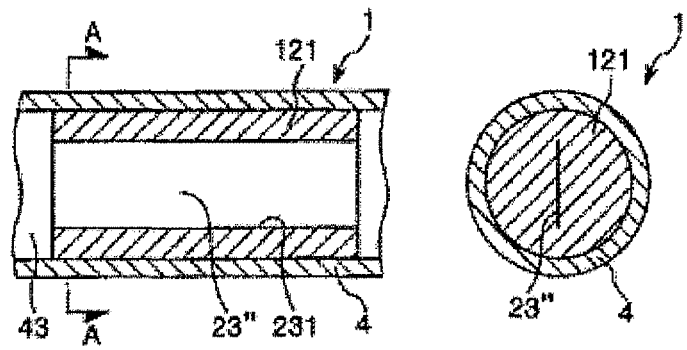
FIGS. 21A to 21D are drawings showing various kinds of constitutions of obstructive-type biological models for training, in which left drawings show vertical cross-section diagrams and right drawings show cross-section diagrams at A-A lines of the left drawings.
Figure 21B:
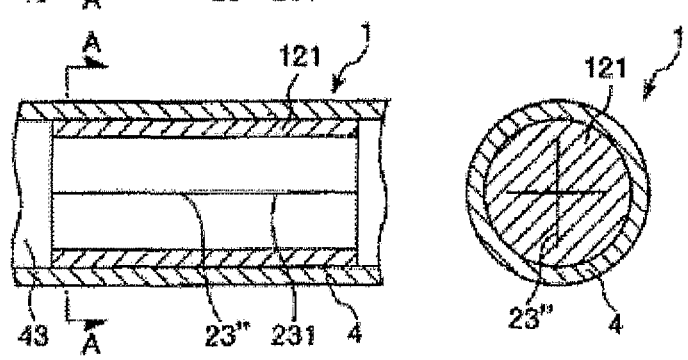
Figure 21C:
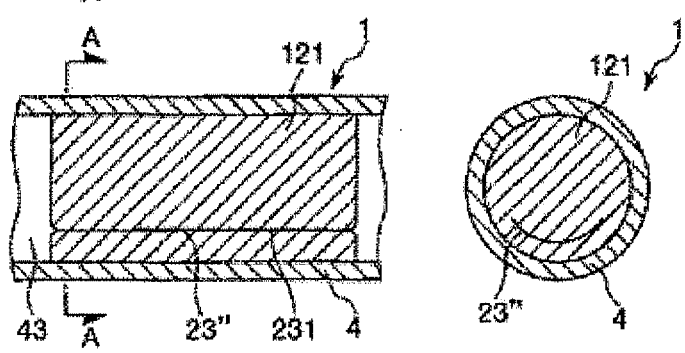
Figure 21D:
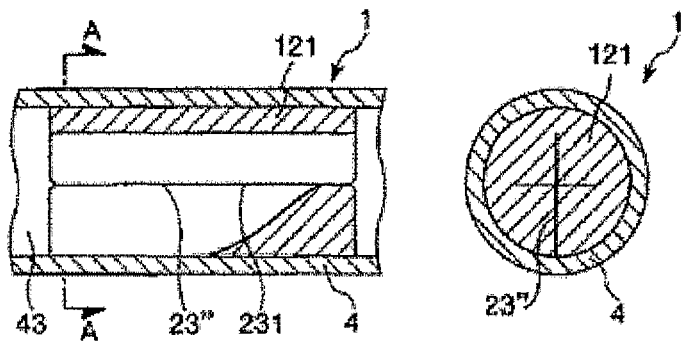
Figure 22A:
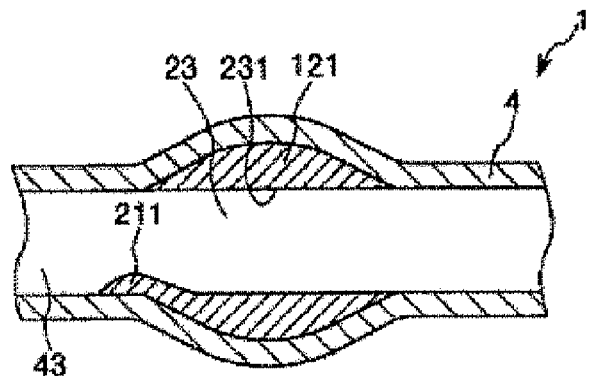
FIGS. 22A to 22C are vertical cross-section diagrams showing states of biological models for training after the training.
Figure 22B:
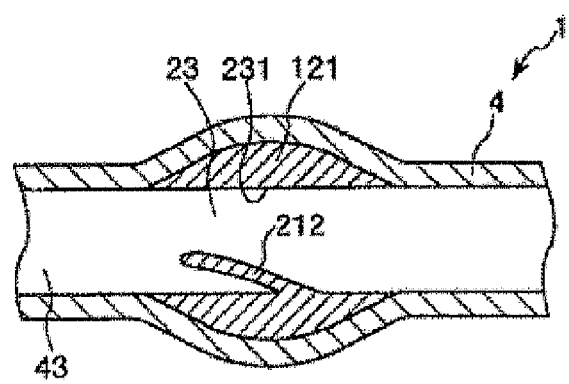
Figure 22C:
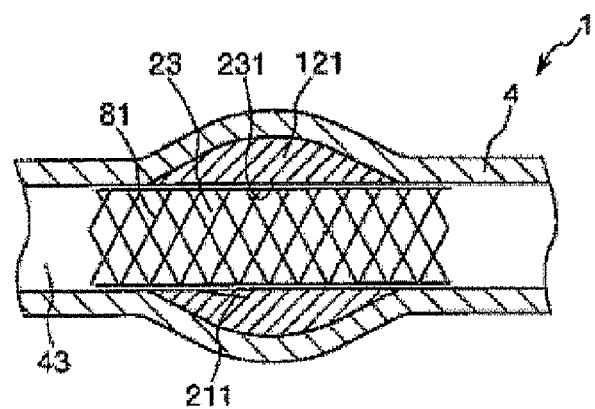
Figure 23A:
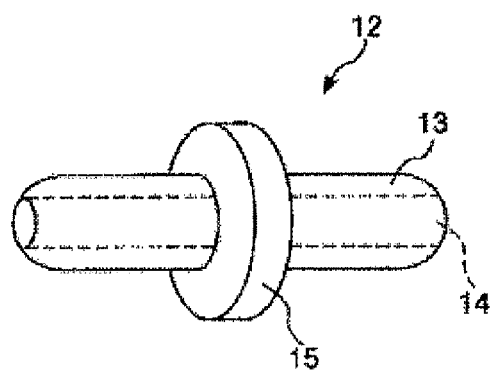
Figure 23B:
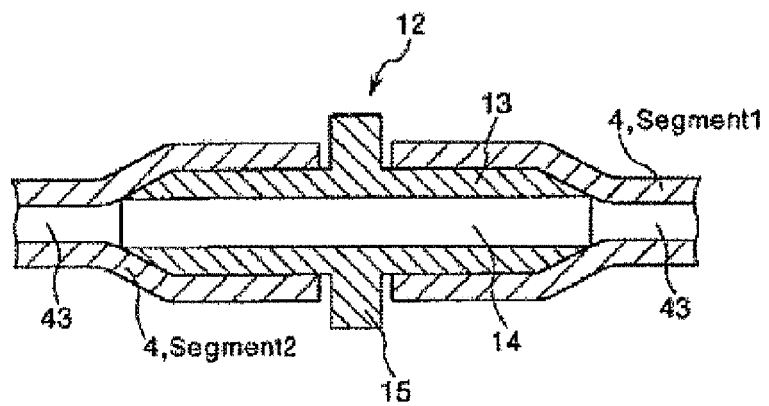
Figure 24A:
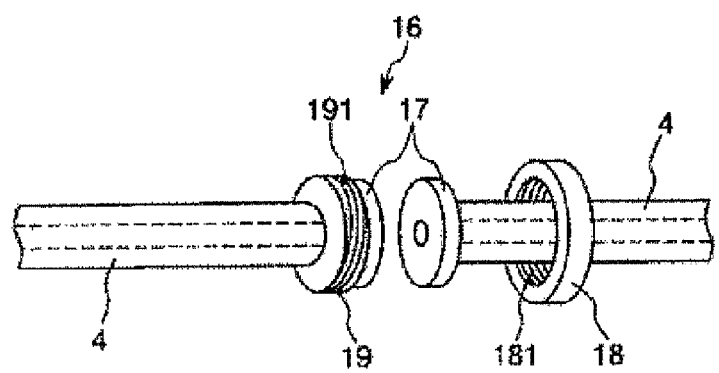
Figure 24B:
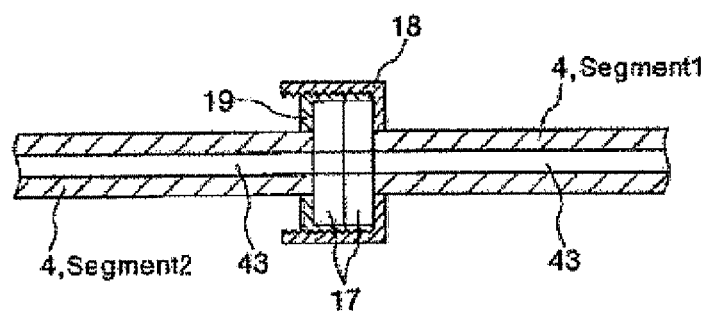
Figure 25A:
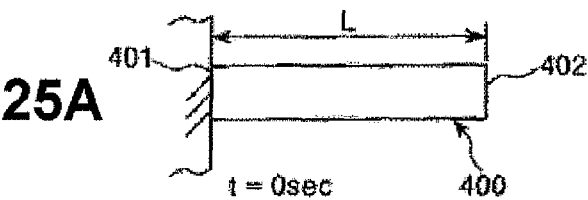
FIGS. 25A to 25C are diagrams showing a test method of testing a material characteristic of an artificial tubular member.
Figure 25B:
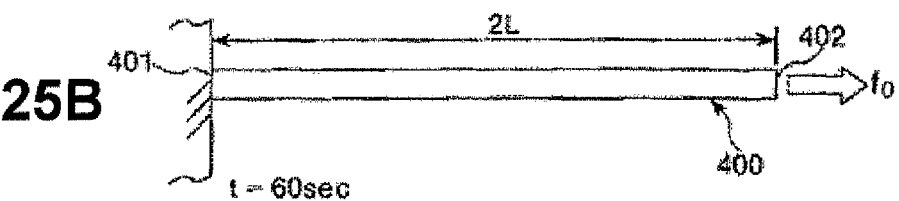
Figure 25C:
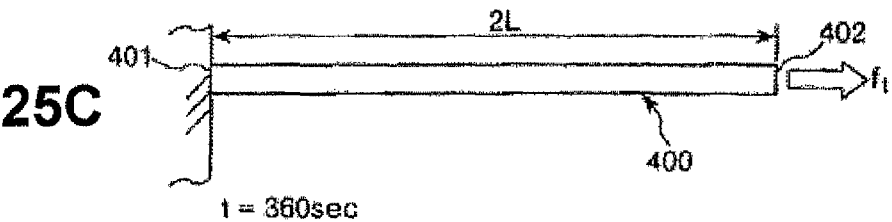
Figure 26:
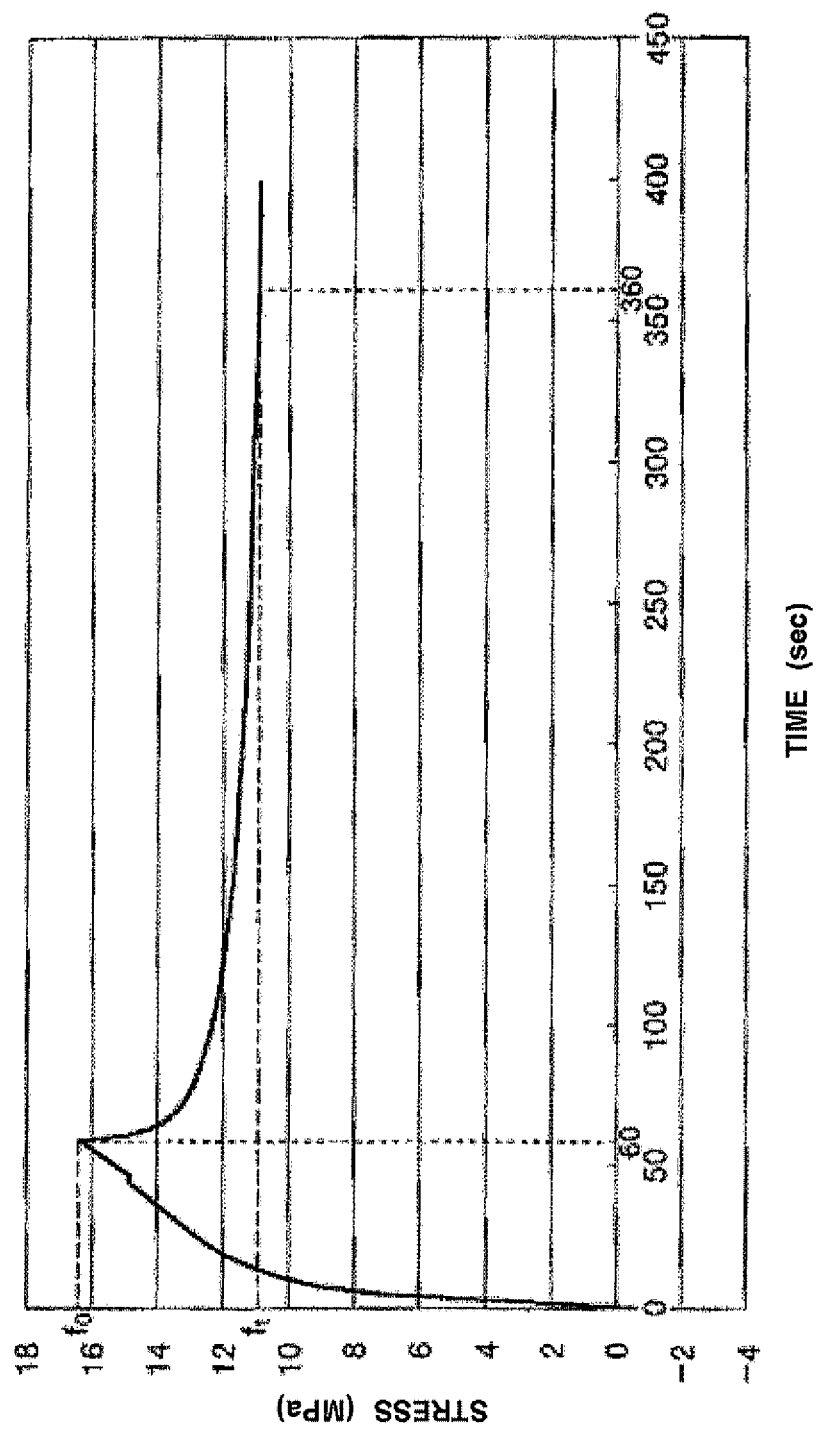
FIG. 26 is a graph showing a material characteristic (change of stress over time) of the artificial tubular member tested by the test method shown in FIG. 25.

FIGS. 18A to 18B are drawings showing various kinds of constitutions of narrow-type biological models for training, in which left drawings show vertical cross-section diagrams and right drawings show cross-section diagrams at A-A lines of the left drawings; FIGS. 19A to 19D are drawings showing various kinds of constitutions of narrow-type biological models for training, in which left drawings show vertical cross-section diagrams and right drawings show cross-section diagrams at A-A lines of the left drawings; FIGS. 20A to 20B are drawings showing various kinds of constitutions of obstructive-type biological models for training, in which left drawings show vertical cross-section diagrams and right drawings show cross-section diagrams at A-A lines of the left drawings; FIGS. 21A to 21D are drawings showing various kinds of constitutions of obstructive-type biological models for training, in which left drawings show vertical cross-section diagrams and right drawings show cross-section diagrams at A-A lines of the left drawings; FIGS. 22A to 22C are vertical cross-section diagrams showing states of biological models for training after the training; FIGS. 23A to 23B are drawings for explaining a constitution of a connector, in which FIG. 23A shows a perspective view and FIG. 23B shows a vertical cross-section diagram; FIGS. 24A to 24B are drawings for explaining a constitution of a connection mechanism, in which FIG. 24A shows a perspective view and FIG. 24B shows a vertical cross-section diagram; FIGS. 25A to 25C are diagrams showing a test method of testing a material characteristic of an artificial tubular member; and FIG. 26 is a graph showing a material characteristic (change of stress over time) of the artificial tubular member tested by the test method shown in FIGS. 25A to 25C. It should be noted in the explanation hereinafter that the upper side in FIGS. 18A to 18B to FIGS. 24A to 24B is referred to as "UP" and the down side thereof is referred to as "DOWN".

Hereinafter, it will be explained with respect to another exemplified embodiment of a biological model for training and a production method of the biological model for training according to the present invention with reference to those drawings, but it will be explained centering around different aspects with respect to the exemplified embodiments mentioned above and with respect to similar matters, the explanation thereof will be omitted.

Third Exemplified Embodiment

A biological model for training 1 of this exemplified embodiment includes the right coronary artery 4 (Segment 2) of the coronary artery 10, an artificial lesion member 121 arranged at the right coronary artery 4, and connection portions 11 provided respectively at both the end portions of the right coronary artery 4. For the right coronary artery 4, end portions of Segment 2 are respectively connected to Segment 1 and Segment 3 through the respective connection portions 11. In this case, it is preferable that the connection portions 11 are constituted so as to be freely detachably with respect to the Segment 1 and the Segment 3 respectively.

First, it will be explained with respect to the right coronary artery 4 which becomes Segment 2.

As shown in FIGS. 18A to 18B (similarly with respect to FIGS. 19A to 19D to FIGS. 22A to 22C), the right coronary artery 4 is an artery constituted by a tube shaped body 40 having a lumen portion 43. For the right coronary artery 4, inner diameter $\phi d_1$ and outer diameter $\phi d_2$ thereof are formed to be constant respectively along the longitudinal direction.

The right coronary artery 4 is constituted by a plastically deformable material and for the material thereof, it is not limited in particular, but there can be cited a thermoplastic resin such as polyethylen, polypropylene, ethylene-vinyl acetate copolymer, nylon elastomer, soft polyvinyl chloride or ethylene-propylene copolymer and the like, and it is possible to use one kind within those or to use two kinds or more by combination. Also, even within these thermoplastic resins, it is preferable, in particular, to use polyethylen. In this case, it is possible to use also a resin formed by mixing resins together in which densities, that is, degrees of crystallinity are different from each other such as low density polyethylen and high density polyethylen. Also, with respect to the hardness of the right coronary artery 4 constituted by polyethylen, it is preferable for a Shore A (defined in JIS K6253) thereof to be 20 to 80 and more preferably to be 25 to 35. It is preferable for the breaking strength to be 5 MPa to 30 Mpa and more preferably to be 8 MPa to 12 MPa. It is preferable for the breaking elongation to be around 100% to 600% and more preferably to be around 100% to 200%.

By using such a polyethylen, aforesaid right coronary artery 4 becomes in a reliably plastically deformable structure. Thus, correlatively with the artificial lesion member 121 mentioned later, when carrying out an expansion training, the right coronary artery 4 and the artificial lesion member 121 are deformed collectively, and the deformation state (expansion state) thereof is reliably maintained (see FIGS. 22A to 22C). Also, when producing the right coronary artery 4, it is possible to mold a tube shaped body (tube) 40 which becomes a raw material of the right coronary artery 4 by an extrusion molding. Then, after molding a tube shaped body, by applying a process (for example, process of heating, compression or the like) to aforesaid tube shaped body, it is possible to produce the right coronary artery 4 of a desired size.

Also, with respect to the plastically deformable material constituting the right coronary artery 4, that is, a thermoplastic resin, it is preferable for the stress relaxation rate thereof to be 20% to 60% and more preferably to be 20% to 30%.

Here, the "stress relaxation rate" is a rate obtained (defined) depending on a test method for the tube shaped body 40 at a normal temperature as shown in FIGS. 25A to 25C.

First, as shown in FIG. 25A, the tube shaped body 40 is made to be a small rectangle 400, and with respect to aforesaid small rectangle 400, one end thereof (left side in the drawing) is fixed to form a fixed end 401 and the other end (right side in the drawing) is made to be a free end 402. Also, with respect to the small rectangle 400 at that time, the full length thereof is made to be L.

Next, from the state shown in FIG. 25A, the free end 402 of the small rectangle 400 is pulled by a predetermined speed (tensile speed) toward the right side (longitudinal direction)

in the drawing (see FIG. 25B). The condition at that time lies in that it is pulled such that the full length thereof becomes 2L in one minute. The initial tensile stress when the full length becomes 2L is made to be $f_0$ (see FIG. 26).

Next, aforesaid speed (tensile speed) is made to be zero from the state shown in FIG. 25B and the full length 2L is maintained (see FIG. 25C). Then, the tensile stress after five minutes from the time when aforesaid speed is made to be zero is made to be $f_t$ (see FIG. 26).

Here, it is assumed that it is possible for the "stress relaxation rate" to be expressed by $((f_0-f_t)/f_0) \times 100$.

Depending on a fact that the stress relaxation rate lies within such a numerical value range, when carrying out an expansion training, the right coronary artery 4 is more reliably deformed and therefore, it becomes an object approximated with an actual human artery. Thus, when carrying out an expansion training, there is obtained a similar feeling as if the training thereof were carried out along the actual procedure (PTCA operation). It should be noted that it is possible for the adjustment of the size of the stress relaxation rate to be carried out, for example, by selecting the constituent material properly or the like.

Also, it is preferable for the tensile elastic modulus in the circumferential direction of the right coronary artery 4 to be identical with the compressive elastic modulus of the artificial lesion member 121 or to be larger than that. Specifically, in a case in which the compressive elastic modulus of the artificial lesion member 121 is 0.001 MPa to 0.5 MPa, it is preferable for the tensile elastic modulus in the circumferential direction of the right coronary artery 4 to be 0.5 MPa to 50 Mpa and more preferably to be 0.5 MPa to 5 MPa.

Also, it is preferable for the right coronary artery 4 to be an artery which satisfies the relation in which the ratio $d_2/d_1$ becomes 1.01 to 2 and more preferably to be an artery which satisfies the relation in which the ratio $d_2/d_1$ becomes 1.01 to 1.2. It is preferable for the inner diameter $\phi d_1$ of the right coronary artery 4 (Segment 2) to be set around 2 mm to 5 mm.

When carrying out a expansion training depending on such various conditions (numerical value range), the right coronary artery 4 can be deformed reliably by being pressed through the artificial lesion member 121 (see FIGS. 4A to 4D, FIGS. 22A to 22C). Also, it is possible to reliably implement a training corresponding to an actual human coronary artery and skill upgrade of an operator is accurately attempted.

Next, it will be explained with respect to an artificial lesion member 121 arranged at a lumen portion 43 of the right coronary artery 4.

The shapes of the artificial lesion member 121 are classified into shapes of narrow-types or obstructive-types corresponding to the degree of stricture with respect to the lumen portion 43.

<Narrow-Type>

Within narrow-type artificial lesion members 121, an artificial lesion member 121 of a first constitution shown in FIG. 18A includes a through-hole 23 passing through approximately at the center portion thereof in the axis direction (longitudinal direction) and the inner surfaces 231 thereof are separated from each other, that is, the whole shape thereof is a cylindrical shaped body forming approximately a cylindrical shape.

With respect to the artificial lesion member 121 having such a constitution, when arranging this artificial lesion member 121 at the lumen portion 43 of the right coronary artery 4, aforesaid lumen portion 43 is narrowed.

With respect to the artificial lesion member 121 of this first constitution, it is preferable, in aforesaid process [3], to carry out a training in which the balloon catheter 63 is advanced inside the right coronary artery 4 along the guide wire for balloon catheter 62, the balloon 64 is made to reach the artificial lesion member 121 narrowing the right coronary artery 4, that is, the through-hole 23 inside and thereafter, the artificial lesion member 121 (through-hole 23) is expanded by inflating the balloon 64.

The length of the artificial lesion member 121 is not limited in particular, but it is preferable to be around 1 mm to 100 mm and more preferably to be around 5 mm to 50 mm. By setting the length of the artificial lesion member 121 within such a range, it is possible to implement a training suitable for the size of a more actual lesioned region (stricture region).

Also, the outer diameter $\phi d_4$ of the artificial lesion member 121 is properly set corresponding to the size of the inner diameter $\phi d_1$ of the right coronary artery 4 which is arranged and it is not to be limited in particular, but in a natural state in which an external force is not applied, it is preferable to be set more largely than the inner diameter $\phi d_1$ of the right coronary artery 4. Thus, the artificial lesion member 121 is inserted into the right coronary artery (lumen portion) 4 in a compressed state and as a result thereof, it happens that the artificial lesion member 121 is to be fixed reliably inside the right coronary artery 4, so that it is possible, on an occasion of training, to reliably prevent a fact that the artificial lesion member 121 is to be unwillingly displaced caused by a contact of the guide wire for balloon catheter 62 or the balloon catheter 63.

Also with respect to the inner diameter $\phi d_3$ of the through-hole 23 of the artificial lesion member 121, it is not limited in particular, but it is preferable for the $\phi d_3$ to be set such that $(\phi d_1 - \phi d_3)/\phi d_1$ becomes 50% to 100%. By setting the inner diameter $\phi d_3$ of the through-hole 23 within such a range, it is possible to implement a training suitable for the degree of stricture of the actual stricture region and skill upgrade of an operator can be attempted accurately.

Specifically, when the $\phi d_1$ is set to be 2 mm to 5 mm, $\phi d_3$ becomes 0 mm to 2.5 mm and the thickness of the artificial lesion member 121 becomes around 0.5 mm to 2.5 mm. It should be noted in a case in which the $\phi d_3$ is 0 mm that it becomes a case of perfect occlusion.

Next, an artificial lesion member 121 of a second constitution shown in FIG. 18B, similarly as the artificial lesion member 121 of the first constitution, includes a through-hole 23 passing through at the center portion thereof in the axis direction and the whole shape thereof forms approximately a cylindrical shape, but there are provided, at both the end portions thereof, with taper portions in which the hole diameters (outer diameters) of the through-hole 23 increase gradually from the inner portion sides toward the external sides thereof, and the widths thereof become "0" substantively at both the ends of the artificial lesion member 121.

In other words, the through-hole 23 forms funnel shapes at both the end portions thereof and includes inclined surfaces 22 respectively in which both the inner circumferential surfaces of the end portions of the artificial lesion member 121 are inclined from the insides of the artificial lesion member 121 toward the sides of both the end portions.

With respect to the artificial lesion member 121 of this second constitution, it is preferable, in aforesaid process [3], to carry out a training in which when the balloon 64 is made to reach the through-hole 23, the balloon 64 is made to reach the through-hole 23 inside while making the balloon catheter 63 so as to go along the inclined surface 22 of the artificial lesion member 121 and thereafter, the artificial lesion member 121 (through-hole 23) is expanded by inflating the balloon 64.

It should be noted that the inclined surface 22 is not limited in particular, but it is preferable to be inclined by an angle of around 15° to 65° with respect to the center axis of the through-hole 23 and more preferably to be inclined by an angle of around 22° to 55°. Thus, it is possible to reliably implement a more suitable training with respect to the shape of the actual stricture region.

Further, there are provided in this exemplified embodiment with taper portions at both the end portions of the artificial lesion member 121, but it is not limited by such a case and it is enough if a taper portion is provided at either one of the two end portions.

Figure 19A:
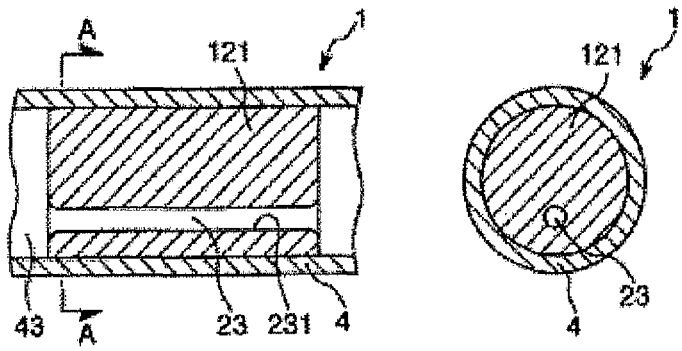
FIGS. 19A to 19D are drawings showing various kinds of constitutions of narrow-type biological models for training, in which left drawings show vertical cross-section diagrams and right drawings show cross-section diagrams at A-A lines of the left drawings.
Figure 19B:
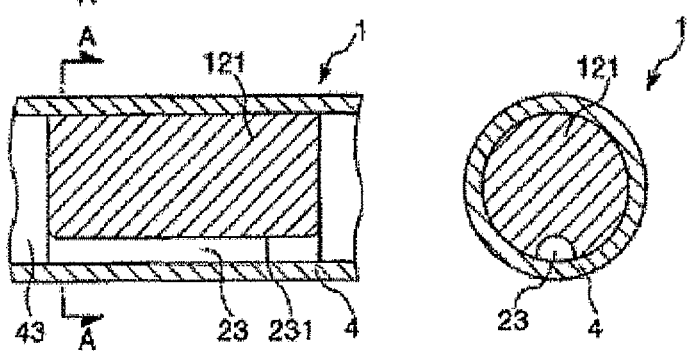
Figure 19C:
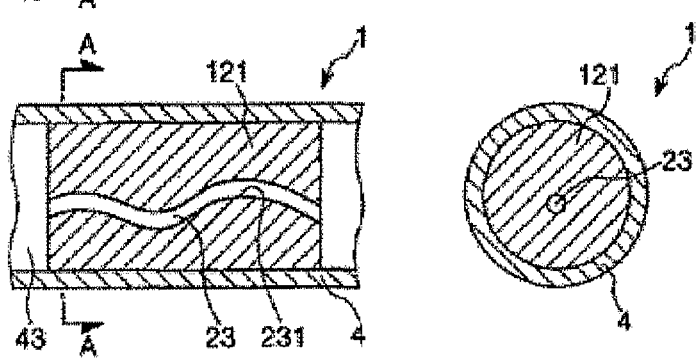
Figure 19D:
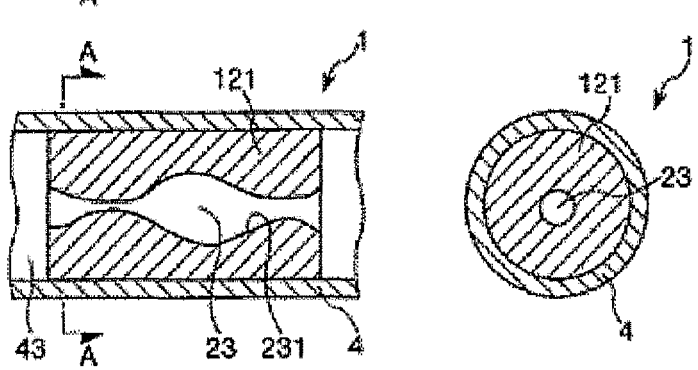

Also, it was explained in the artificial lesion members 121 of the first constitution and the second constitution with respect to a case in which the through-hole 23 passes through by going approximately straight in an axis direction (longitudinal direction) at approximately the center portion thereof, but it is not limited by such a constitution, and it is allowed for the through-hole 23 to be formed at a whatever position in a whatever shape and, for example, it is allowed for the through-hole 23 to be located eccentrically on the edge portion side (periphery portion side) (FIG. 19A), it is allowed for a portion thereof to be opened at the edge portion (periphery portion) (FIG. 19B), it is allowed to meander (be curved) (FIG. 19C) and it is allowed to be diameter-expanded and diameter-reduced at mid portions thereof (FIG. 19D).

<Obstructive-Type>

Within obstructive-type artificial lesion members 121, an artificial lesion member 121 of a third constitution shown in FIG. 20A includes a continuous hole (through-hole) 23' at the center portion thereof in the axis direction (longitudinal direction) and is a member having a constitution similar to the artificial lesion member 121 having the first constitution mentioned above other than a constitution that the inner surfaces of this hole 23' are firmly attached (contacted) together when arranging this artificial lesion member 121 inside the right coronary artery 4.

With respect to the artificial lesion member 121 having this third constitution, the lumen portion 43 of the right coronary artery 4 is occluded at a position at which this artificial lesion member 121 is arranged by a fact that the inner surfaces 231 of the hole 23' are firmly attached together as mentioned above.

With respect to the artificial lesion member 121 of this third constitution, it is preferable, in aforesaid process [3], to carry out a training in which when the balloon catheter 63 is advanced inside the right coronary artery 4 along the guide wire for balloon catheter 62, the balloon 64 is made to reach the this hole 23' inside while pushing and expanding the hole 23' and thereafter, the artificial lesion member 121 (hole 23') is expanded by inflating the balloon 64.

Next, an artificial lesion member 121 of a fourth constitution shown in FIG. 20B includes a through-holes 25 at the both ends of a hole 23', which is continuous from the hole 23' and is a member having a constitution similar to the artificial lesion member 121 having the third constitution mentioned above other than a constitution that the hole diameters of these through-holes 25 increase gradually from the inner portion sides thereof toward the end portion sides thereof.

More specifically, the artificial lesion member 121 having the fourth constitution is a member having a constitution formed by combining the artificial lesion member 121 having the second constitution and the artificial lesion member 121 having the third constitution, and is a member in which the inner surfaces 231 of the hole 23' are firmly attached together and also, in which both the end portions thereof are constituted by taper portions provided with inclined surfaces 22.

With respect to the artificial lesion member 121 of this fourth constitution, it is preferable, in aforesaid process [3], to carry out a training in which when the balloon 64 is made to reach the hole 23', the distal end thereof is introduced until the entrance of the hole 23' while making balloon catheter 63 so as to go along the inclined surface 22 of the artificial lesion member 121 and thereafter, the artificial lesion member 121 (through-hole 23) is expanded by inflating the balloon 64.

It should be noted in the artificial lesion members 121 of the third constitution and the fourth constitutions that it was explained with respect to a case in which the holes 23' are continuously formed approximately in straight toward the axis direction (longitudinal direction) at approximately the center portion thereof, but it is not to be limited by such a constitution. Specifically, it is allowed to employ an axially continuous notch 23" instead of the axially continuous hole 23'. Also, it is allowed for the this notch 23" to be formed at a whatever position in a whatever shape and, for example, it is allowed for the notch 23" to be formed in a horizontal line shape (FIG. 21A) or in a cross shape (FIG. 21B), it is allowed to be formed in an U-shape and to be located eccentrically on the edge portion side (FIG. 21C) and it is allowed to form a shape in which one end of the notch 23" is opened at a portion of the outer circumference thereof (FIG. 21D).

The artificial lesion member 121 of each constitution forming such a shape mentioned above is, in the present invention, constituted by a plastically deformable material and for the material thereof, it is preferable to be a material which is different from the constituent material of the right coronary artery 4. Specifically, there can be cited a silicone clay, a rubber clay, a resin clay, an oil clay and the like such as mentioned above, and it is possible to use one kind within those or to use two kinds or more by combination.

By constituting the artificial lesion member 121 by aforesaid plastically deformable material such as mentioned above, aforesaid artificial lesion member 121 becomes a member which is deformed more easily than the right coronary artery 4. Thus, when carrying out the expansion training, it happens that the artificial lesion member 121 is deformed preferentially compared with the expansion of the right coronary artery 4. This becomes approximately in an identical phenomenon in which a narrow substance is deformed preferentially compared with the right coronary artery in case of applying the PTCA operation actually with respect to a stricture portion occurring in a human right coronary artery. Therefore, it is possible for a training person to carry out a training close to the actual procedure. It should be noted that it is preferable for the compressive elastic modulus of the artificial lesion member 121 to be around 0.001 MPa to 0.5 MPa and more preferably to be around 0.01 MPa to 0.3 MPa. By setting the physicality value of the artificial lesion member 121 to be within such a range, the physical property of the artificial lesion member 121 becomes a property in which the plastic deformation is carried out in a state of being more approximated with the actual lesioned region and it is possible to implement a higher-quality training.

Also, the right coronary artery 4 and the artificial lesion member 121 are the objects which are deformed respectively by the expansion training and with respect to difficulty in return after the deformation thereof, it becomes more difficult for the side of the artificial lesion member 121 to return compared with the right coronary artery 4, that is, the degree of plastic deformation for the side of the right coronary artery 4 is smaller than that of the artificial lesion member 121.

The constituent material of the artificial lesion member 121 is a material which can exert the physical property as mentioned above to the artificial lesion member 121 and which maintains plasticity over long hours. Therefore, the artificial lesion member 121 becomes a member which is deformed plastically in a state of being more approximated with the actual lesioned region and therefore, it is possible for a training person to implement a higher-quality training.

It will be explained in detail with respect to a state of aforesaid biological model for training 1 when carrying out the training of PTCA operation by using the biological model for training 1 (three-dimensional model).

It is required technologically for the PTCA operation, when expanding the artificial lesion member 121 by the balloon 64, to generate a movement portion 211 (plaque shift, see FIG. 22A) caused by a fact that the end portion of the artificial lesion member 121 moves outside and to secure a flow path (restore a blood flow) in the right coronary artery 4 without rendering generation of a dissociation portion 212 (see FIG. 22B) caused by a fact that a portion of the artificial lesion member 121 is ruptured or the like.

Consequently, if the biological model for training 1 is used for the training of PTCA operation, it is possible to carry out the training such that occurrence of the movement portion 211 or occurrence of the dissociation portion 212 is prevented to occur.

When carrying out the training of PTCA operation by using the biological model for training 1, in aforesaid process [3], the artificial lesion member 121 is pressed toward the outside by the expanded balloon 64. In addition, the right coronary artery 4 is also pressed toward the outside through the artificial lesion member 121. Thus, the artificial lesion member 121 and the right coronary artery 4 are expanded and deformed collectively.

Then, in aforesaid process [4], after removing the guide wire for balloon catheter 62 and the balloon catheter 63 from the artificial lesion member 121, the artificial lesion member 121 and the right coronary artery 4 are objects which are respectively deformed plastically as mentioned above, so that they do not return to the shape before expansion, and it happens that they will maintain aforesaid expanded and deformed state, that is, the shape pushed and expanded by the balloon 64. This becomes approximately in an identical phenomenon in which the right coronary artery and the narrow portion become in an expanded state in case of applying the PTCA operation actually to a narrow portion which occurred in a human right coronary artery.

In this manner, by using the biological model for training 1, when carrying out a training targeting skill upgrade of an operator, the biological model for training 1 becomes a model approximated with the physical property of the actual lesioned portion, so that it is possible to carry out a training reliably in accordance with a practical procedure.

Also, after the training of PTCA operation, it is possible to carry out more reliably about the evaluation of whether or not the movement portion 211, the dissociation portion 212 or the like occurs in the artificial lesion member 121, so that it is possible to implement a higher-quality training.

Also, it is possible to implement a training while observing the expansion of the balloon 64 in aforesaid process [3] depending on a visual contact or an X-ray contrast image, and it is possible to carry out the judgment of the degree of expansion of the artificial lesion member 121 and the right coronary artery 4 and whether or not the movement portion 211, the dissociation portion 212 or the like occurs on that actual spot, so that it is possible, also from such a view point, to implement a higher-quality training.

It should be noted that it is possible to inhibit re-narrow of the artificial lesioned member 121 and dissociation of the dissociation portion 212 by indwelling a stent 81, as shown in FIG. 22C, with respect to the artificial lesioned member 121 after restoring blood flow depending on aforesaid process [4], that is, with respect to the artificial lesioned member 121 after the PTCA operation is treated medically. It is possible to use the biological model for training 1 also in a training of treatment for indwelling such a stent 81 and if the biological model for training 1 is used in such a training, it is possible to implement more reliably about the evaluation of whether or not the re-narrow and the dissociation of the dissociation portion 212 are inhibited preferably.

In addition, also in this exemplified embodiment, the respective connection portions 11 are provided at aforesaid both of the end portions respectively such that the right coronary artery 4 which is the Segment 2 will be detachable at both the end portions thereof respectively (see FIG. 3). More specifically, with respect to the Segment 2, one end thereof is connected with the end portion of the Segment 1 and the other end thereof is connected with the end portion of the Segment 3 respectively by the connection portions 11 and thus, it becomes a constitution which is detachable from the right coronary artery 4 (see FIGS. 23A to 23B, FIGS. 24A to 24B).

Figure 28:
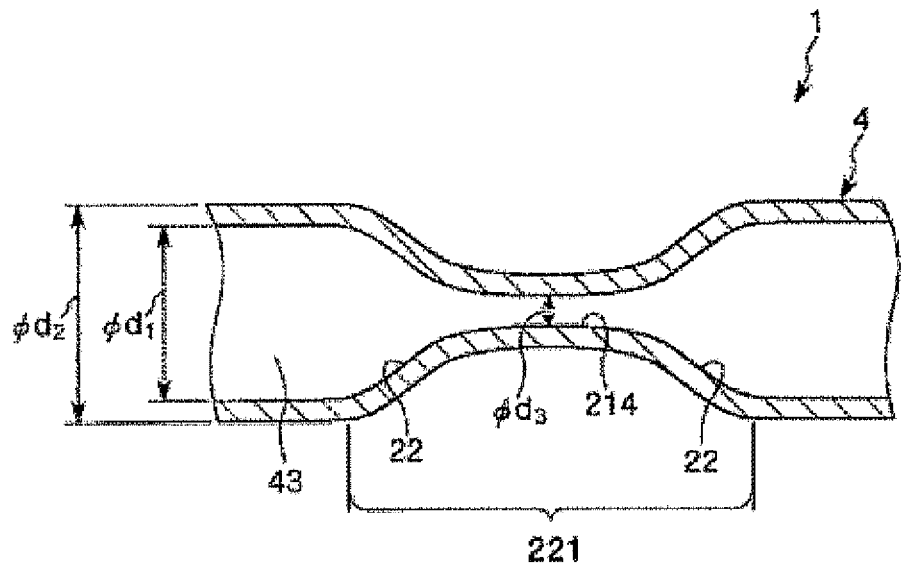
FIG. 28 is a vertical cross-section showing a biological model for training of the present invention.
Figure 29:
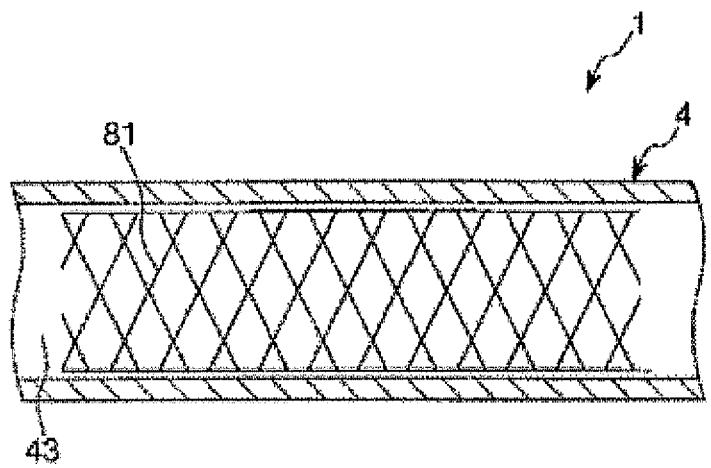
FIG. 29 is a vertical cross-section diagram showing a state of the biological model for training after a training.
Figure 38A:
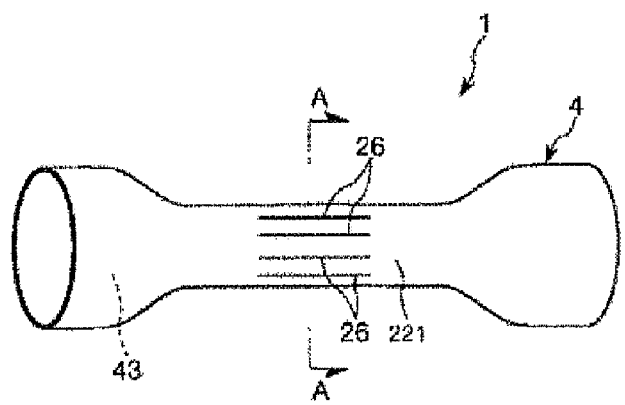
FIGS. 38A to 38B are perspective views showing a fifth exemplified embodiment of a biological model for training of the present invention.
Figure 38B:
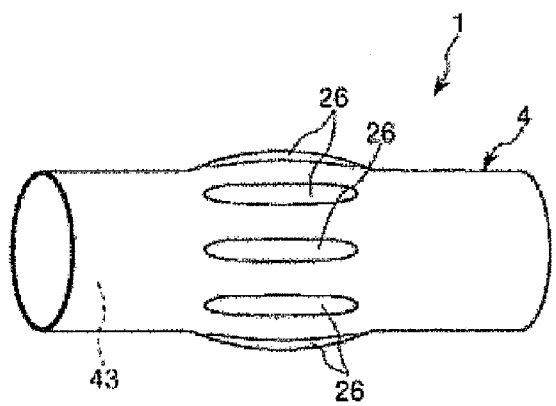
Figure 39:
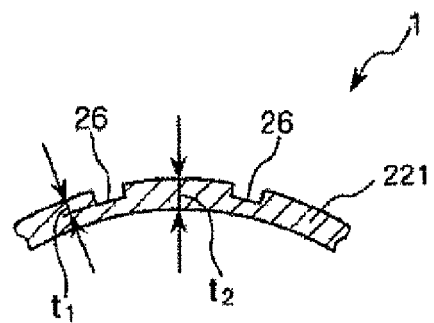
FIG. 39 is a cross-section diagram at A-A line in FIG. 38A.
Figure 40:
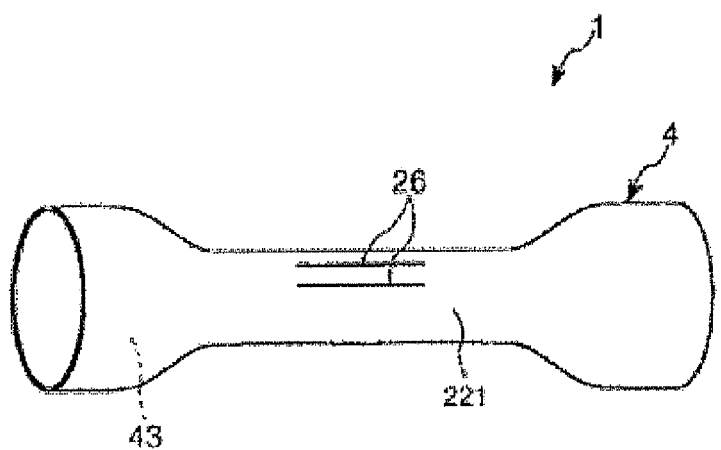
FIG. 40 is a perspective view showing a sixth exemplified embodiment of a biological model for training of the present invention.
Figure 41:
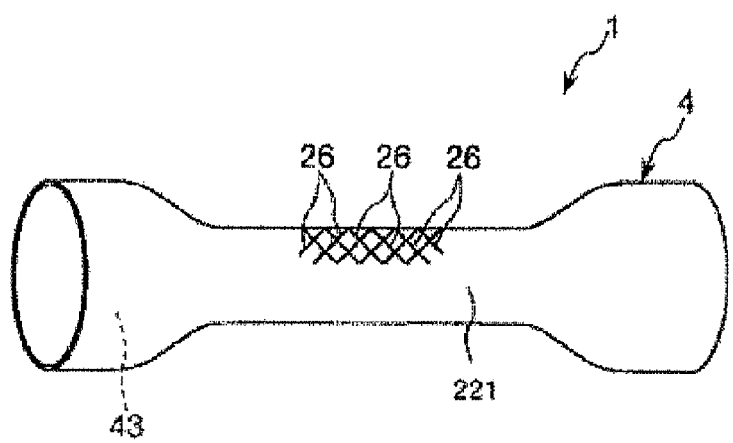
FIG. 41 is a perspective view showing a seventh exemplified embodiment of a biological model for training of the present invention.
Figure 42:
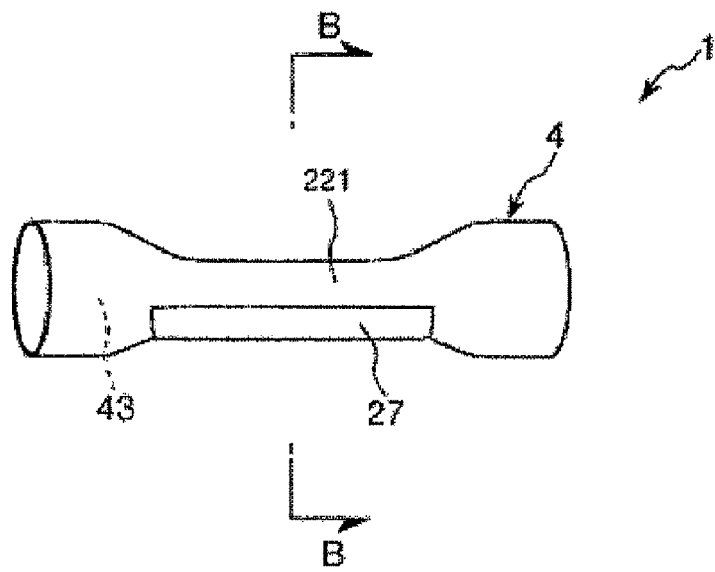
FIG. 42 is a perspective view showing an eighth exemplified embodiment of a biological model for training of the present invention.
Figures 43A, 43B:
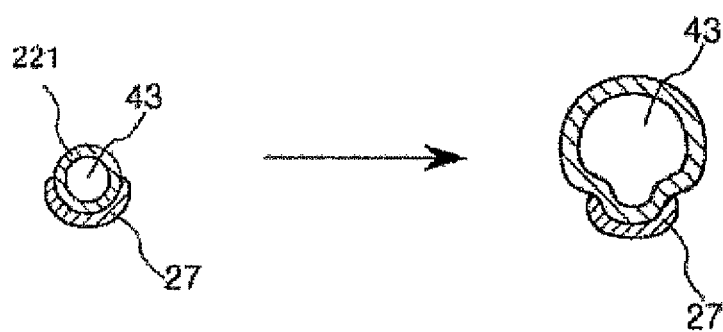
FIGS. 43A to 43B are cross-section diagrams at B-B line in FIG. 42.
Figure 44:
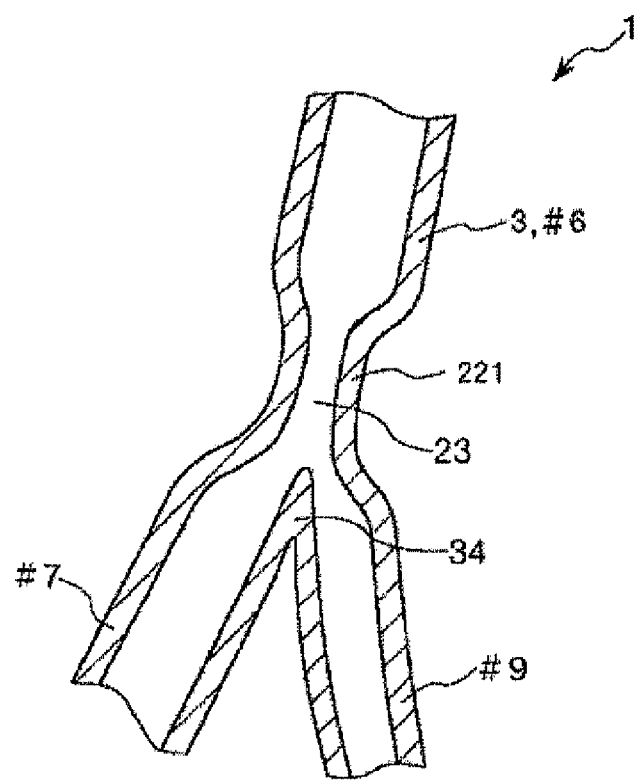
FIG. 44 is a vertical cross-section diagram showing a ninth exemplified embodiment of a biological model for training of the present invention.

FIGS. 27A to 27D are diagrams showing procedures for carrying out a PTCA operation training with respect to a biological model for training which is arranged at a right coronary artery; FIG. 28 is a vertical cross-section showing a biological model for training of the present invention; FIG. 29 is a vertical cross-section diagram showing a state of the biological model for training after a training; FIGS. 30A to 30B to FIGS. 35A to 35D are diagrams for explaining a method of producing a biological model for training of the present invention; FIGS. 36A to 36C and FIG. 37 are diagrams for explaining a connection method with respect to a biological model for training of the present invention; FIGS. 38A to 38B are perspective views showing a fifth exemplified embodiment of a biological model for training of the present invention; FIG. 39 is a cross-section diagram at A-A line in FIG. 38A; FIG. 40 is a perspective view showing a sixth exemplified embodiment of a biological model for training of the present invention; FIG. 41 is a perspective view showing an eighth exemplified embodiment of a biological model for training of the present; FIG. 42 is a perspective view showing an eighth exemplified embodiment of a biological model for training of the present invention; FIGS. 43A to 43B are cross-section diagrams at B-B line in FIG. 42; and FIG. 44 is a vertical cross-section diagram showing a ninth exemplified embodiment of a biological model for training of the present invention.

Hereinafter, it will be explained with respect to another exemplified embodiment of a biological model for training and a production method of the biological model for training according to the present invention with reference to those drawings, but it will be explained centering around difference aspects with respect to the exemplified embodiments mentioned above and with respect to similar matters, the explanation thereof will be omitted.

Fourth Exemplified Embodiment

A biological model for training 1 of the first exemplified embodiment shown in FIGS. 27A to 27D and FIG. 28 includes the right coronary artery 4 (Segment 2) of the coronary artery 10, an artificial lesioned portion 221 arranged at the right coronary artery 4 and connection portions 11 provided respectively at both the end portions of the right coronary artery 4. For the right coronary artery 4, end portions of Segment 2 are respectively connected to Segment 1 and Segment 3 through the respective connection portions 11. In this case, it is preferable that the connection portions 11 are constituted so as to be freely detachably with respect to the Segment 1 and the Segment 3 respectively.

As shown in FIG. 28 (similar with respect to FIG. 29), the right coronary artery 4 is an artery constituted by a tube shaped body having a lumen portion 43. Then, at a mid portion of the longitudinal direction of the right coronary artery 4, there is formed a diameter-reduction portion whose inner diameter and outer diameter are diameter-reduced. It is possible for this diameter-reduction portion to be assumed as a stricture portion occurred in an artery (blood vessel) and therefore, aforesaid diameter-reduction portion becomes an artificial lesioned portion 221 which is used in an expansion training for carrying out expansion with respect to a narrow portion.

The right coronary artery 4 is constituted by a plastically deformable material and for the material thereof, it is not limited in particular, but there can be cited a thermoplastic resin such as polyethylen, polypropylene, ethylene-vinyl acetate copolymer, nylon elastomer, soft polyvinyl chloride or ethylene-propylene copolymer and the like, and it is possible to use one kind within those or to use two kinds or more by combination. Also, even within these thermoplastic resins, it is preferable, in particular, to use polyethylen. In this case, it is possible to use also a resin formed by mixing resins together in which densities, that is, degrees of crystallinity are different from each other such as low density polyethylen and high density polyethylen. Also, with respect to the hardness of the right coronary artery 4 constituted by polyethylen, it is preferable for Shore A (defined in JIS K6253) to be 20 to 80 and more preferably to be 25 to 35. It is preferable for the breaking strength to be 5 MPa to 30 Mpa and more preferably to be 8 MPa to 12 MPa. It is preferable for the breaking elongation to be around 100% to 600% and more preferably to be around 100% to 200%.

By using such a polyethylen, the tube shaped body 40 which becomes a raw material of the right coronary artery 4 is molded so as to have thermal shrinkability. As shown in FIGS. 30A to 30B to FIGS. 35A to 35D, when forming the artificial lesioned portion 221 at the right coronary artery 4, the artificial lesioned portion 221 is formed reliably depending on a fact that the lesioned portion formation area 20 is diameter-reduced by applying heat or tension with respect to the lesioned portion formation area 20 at which the artificial lesioned portion 221 of the tube shaped body 40 is desired to be formed. Also, when carrying out an expansion training with respect to the artificial lesioned portion 221 constituted by such a diameter-reduction portion, thereby the artificial lesioned portion 221 is expansion-deformed (diameter-expanded). Then, the expansion-deformed artificial lesioned portion 221 becomes a portion which is plastically deformed to the extent so as not to return to the shape before the expansion (substantively, artificial lesioned portion 221 disappears) and therefore, the deformation state (expansion state) thereof is maintained reliably (see FIGS. 27A to 27D). Also, depending on a fact that the tube shaped body 40 is constituted by polyethylen, it is possible for aforesaid tube shaped body 40 to be molded easily, for example, by an extrusion molding.

Also, it is possible for the plastically deformable material constituting the right coronary artery 4, that is, the thermoplastic resin to use a resin exhibiting the stress relaxation rate or the tensile elastic modulus such as mentioned above.

Also, in the right coronary artery 4, with respect to the portion other than the portion at which the artificial lesioned portion 221 is formed, it is constituted such that the inner diameter $\phi d_1$ and the outer diameter $\phi d_2$ thereof are constant along the longitudinal direction respectively. It is preferable for such a right coronary artery 4 to be an artery which satisfies the relation in which the ratio $d_2/d_1$ becomes 1.01 to 2 and more preferably to be an artery which satisfies the relation in which the ratio $d_2/d_1$ becomes 1.01 to 1.2. Further, it is preferable for the inner diameter $\phi d_1$ of the right coronary artery 4 (Segment 2) to be set around 2 mm to 5 mm.

With respect to the inner diameter $\phi d_3$ of the minimum portion of the artificial lesioned portion 221, although it is not limited in particular, it is preferable for the $\phi d_3$ to be set such that the $(\phi d_1 - \phi d_3)/\phi d_1$ becomes 50% to 100%. By setting the inner diameter $\phi d_3$ of the artificial lesioned portion 221 within such a range, it is possible to implement a training suitable for the degree of stricture of the actual stricture region reliably and skill upgrade of an operator is attempted accurately.

Also, although it is not limited in particular, it is preferable for the length of the artificial lesioned portion 221 to be around 1 mm to 100 mm and more preferably to be around 5 mm to 50 mm. By setting the length of the artificial lesioned portion 221 within such a range, it is possible to implement a training more suitable for the size of the actual lesioned region (stricture region).

At both the end portions of the artificial lesioned portion 221, there are formed inclined surfaces (taper surfaces) 22 whose inner surfaces are inclined, that is, the inner diameters thereof are gradually increased from the inner portion sides toward the end portion sides respectively. Thus, in aforesaid process [3], when the balloon 64 is made to reach the artificial lesioned portion 221, it is possible to make the balloon catheter 63 go along the inclined surface 22 of the artificial lesioned portion 221 and therefore, it is possible to carry out the operation thereof easily and also reliably. It should be noted that although it is not limited in particular, it is preferable for the inclined surface 22 to be inclined by the angle of around 15° to 65° with respect to the center axis of the right coronary artery 4 and more preferably to be inclined by the angle of around 22° to 55°. Thus, it is possible to reliably implement a training more suitable for the shape of the actual stricture region.

Next, it will be explained in detail with respect to a state of aforesaid biological model for training 1 when carrying out the training of PTCA operation by using the biological model for training 1 (three-dimensional model).

Figure 27A:
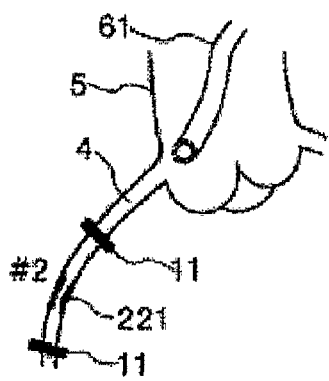
FIGS. 27A to 27D are diagrams showing procedures for carrying out a PTCA operation training with respect to a biological model for training which is arranged at a right coronary artery.
Figure 27B:
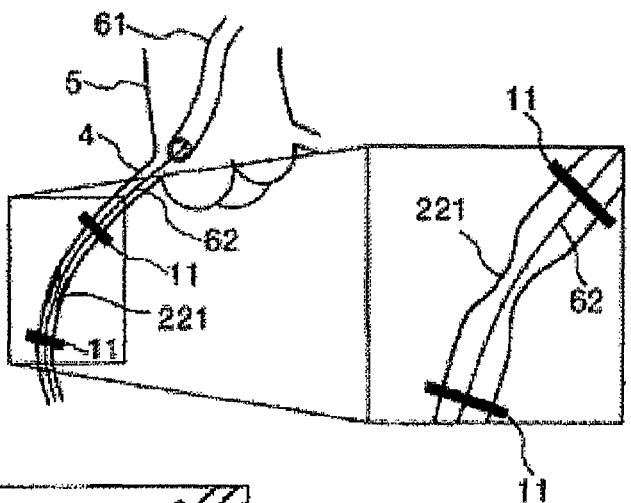
Figure 27C:
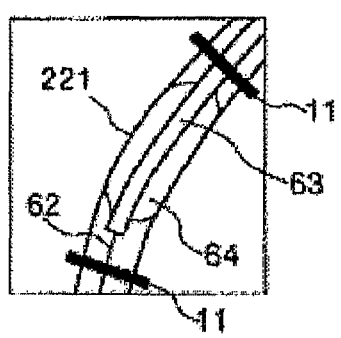

When carrying out the training of PTCA operation by using the biological model for training 1, in aforesaid process [3] shown in FIG. 27C, the artificial lesioned portion 221 is pressed toward the outside by the expanded balloon 64. Thus, the artificial lesioned portion 221 is expanded and deformed, and aforesaid artificial lesioned portion 221 disappears substantively.

Figure 27D:
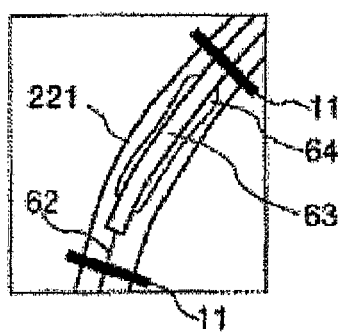

Then, in aforesaid process [4] shown in FIG. 27D, after removing the guide wire for balloon catheter 62 and the balloon catheter 63 from the artificial lesioned portion 221, the artificial lesioned portion 221 is a portion which is deformed plastically as mentioned above, so that it does not return to the shape before expansion, and it happens that it will maintain aforesaid expanded and deformed state, that is, the shape pushed and expanded by the balloon 64. This becomes approximately in an identical phenomenon in which the narrow portion becomes in an expanded state in case of applying the PTCA operation actually to a narrow portion which occurred in a human right coronary artery.

In this manner, by using the biological model for training 1, when carrying out a training targeting skill upgrade of an operator, the biological model for training 1 becomes a model approximated with the physical property of the actual lesioned portion, so that it is possible to carry out a training reliably in accordance with a practical procedure.

Also, the training can be implemented while observing the expansion of the balloon 64 in aforesaid process [3] and the degree of expansion of the artificial lesioned portion 221 caused thereby depending on a visual contact and an X-ray contrast image, so that it is possible, also from such a view point, to implement a higher-quality training.

It should be noted that it is possible to prevent re-narrow of the artificial lesioned portion 221 by indwelling a stent 81, as shown in FIG. 29, with respect to the artificial lesioned portion 221 after restoring blood flow depending on aforesaid process [4], that is, with respect to the artificial lesioned portion 221 after the PTCA operation is treated medically. It is possible to use the biological model for training 1 also for the training of treatment for indwelling such a stent 81, and if using the biological model for training 1 in such a training, it is possible to implement more reliably about the evaluation of whether or not re-narrow is prevented preferably more reliably.

It is possible for the biological model for training 1 having such a constitution mentioned above to be produced, for example, by forming the artificial lesioned portion 221 at the Segment 2 of the right coronary artery 4 as follows. Here, it will be explained with respect to a method of producing the biological model for training 1.

<First Production Method>

Figure 30A:
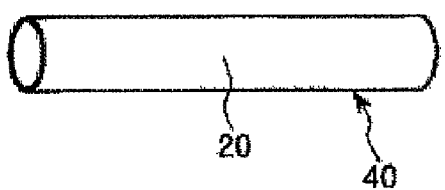
FIGS. 30A to 30B are diagrams for explaining a method of producing a biological model for training of the present invention.

First, as shown in FIG. 30A, there is prepared a tube shaped body 40 as a raw (base) material, which becomes the right coronary artery 4. This tube shaped body 40 is constituted by polyethylen as mentioned above and has thermal shrinkability.

Figure 30B:
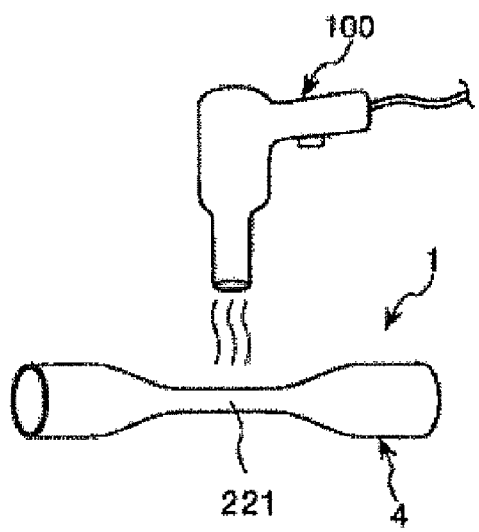

Next, as shown in FIG. 30B, by using a heat gun 100 such as, for example, a hair dryer or the like, hot blasts of, for example, 80 degrees to 120 degrees are applied with respect to the lesioned portion formation area 20 of the tube shaped body 40 (right coronary artery 4) and aforesaid lesioned portion formation area 20 is heated. Then, when the lesioned portion formation area 20 is diameter-reduced and the size thereof becomes a desired size, the heating is stopped. Thus, there is obtained a right coronary artery 4 in which the artificial lesioned portion 221 is formed.

It should be noted that it is possible, depending on time and temperature of the heating, to change the degree of narrow of the artificial lesioned portion 321 properly.

<Second Production Method>

Figure 31A:
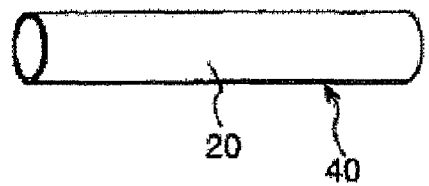
FIGS. 31A to 31B are diagrams for explaining a method of producing a biological model for training of the present invention.
Figure 31A:

First, as shown in FIG. 31A, there is prepared a tube shaped body 40.

Figure 31B:
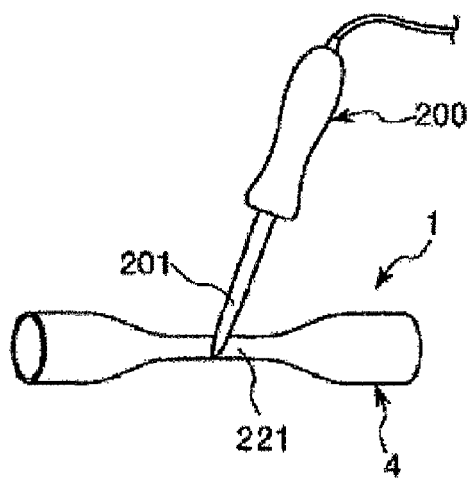

Next, as shown in FIG. 31B, by using, for example, a soldering iron 200 used for soldering, an iron tip 201 set to be, for example, in a temperature of 80 degrees to 120 degrees is applied with respect to the lesioned portion formation area 20 of the tube shaped body 40 and aforesaid lesioned portion formation area 20 is heated. Then, when the lesioned portion formation area 20 is diameter-reduced and the size thereof becomes a desired size, the iron tip 201 is spaced from the lesioned portion formation area 20. Thus, there is obtained a right coronary artery 4 in which the artificial lesioned portion 221 was formed.

<Third Production Method>

Figure 32A:
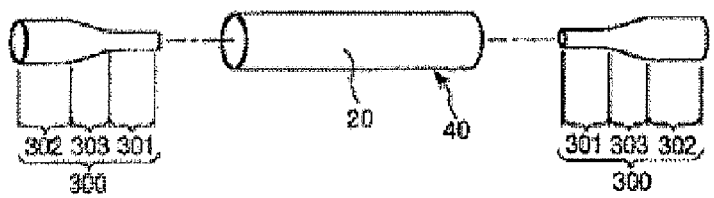
FIGS. 32A to 32E are diagrams for explaining a method of producing a biological model for training of the present invention.

As shown in FIG. 32A, there is prepared a tube shaped body 40.

Also, there are prepared a pair of restriction members 300 which is used by being passed through the tube shaped body 40. The respective restriction members 300 are members for restricting the degree of diameter-reduction of the lesioned portion formation area 20 (artificial lesioned portion 221) respectively. The pair of the restriction members 300 have identical constitutions, so that it will be explained representatively with respect to one of the restriction members 300.

The restriction member 300 is a member which forms a rod shape and which includes the three pieces of portions whose outer diameters are changed, that is, a small diameter portion 301, a large diameter portion 302 and a portion 303 whose outer diameter reduced gradually, which is positioned between the small diameter portion 301 and the large diameter portion 302. The small diameter portions 301 and the large diameter portions 302 are formed at both the end portions of the restriction member 300. The portion 303 whose outer diameter reduced gradually is a portion whose outer diameter is reduced gradually from the large diameter portion 302 toward the small diameter portion 301. The small diameter portion 301 plays a role of forming a portion which becomes the inner diameter $\phi d_3$ of the artificial lesioned portion 221, and the portion 303 whose outer diameter reduced gradually plays a role of forming a portion which becomes the inclined surface 22 of the artificial lesioned portion 221. Also, the large diameter portion 302 plays a role of forming a portion other than the artificial lesioned portion 221 of the right coronary artery 4.

Figure 32B:
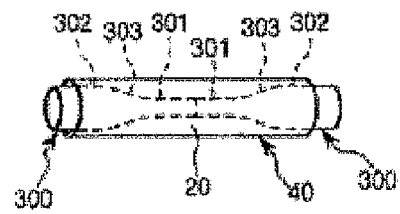

As shown in FIG. 32B, the respective restriction members 300 are inserted from the small diameter portion 301 sides into the tube shaped body 40 respectively and it is made to be in a state in which the end surfaces are abutted to each other. At that time, the respective small diameter portions 301 are positioned at the lesioned portion formation area 20 of the tube shaped body 40.

Figure 32C:
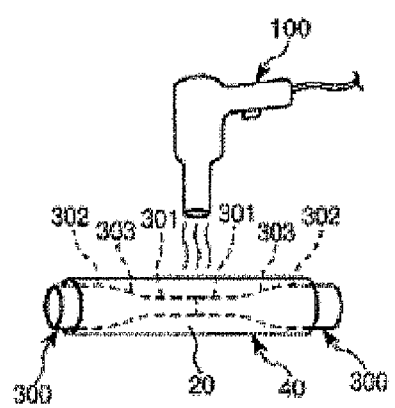

Next, as shown in FIG. 32C, by using a heat gun 100, hot blasts of, for example, 80 degrees to 120 degrees are applied with respect to the whole tube shaped body 40 and aforesaid tube shaped body 40 is heated.

Figure 32D:
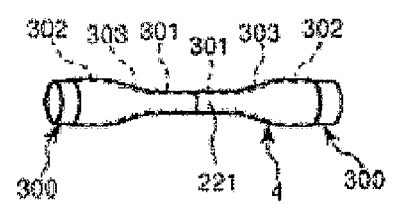

Then, as shown in FIG. 32D, when the whole tube shaped body 40 is diameter-reduced and the inner circumferential surface thereof are abutted onto the outer circumferential surface of the respective restriction members 300, the heating is stopped.

Figure 32E:
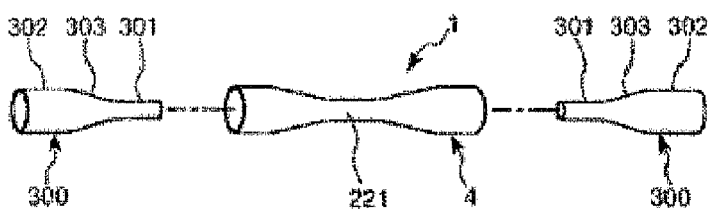

Next, as shown in FIG. 32E, the respective restriction members 300 are pulled out respectively. Thus, there is obtained a right coronary artery 4 in which the artificial lesioned portion 221 is formed. Also, since the restriction member 300 is used, the degree of diameter-reduction of the artificial lesioned portion 221 becomes constant and it is possible to mass-produce the uniform shaped right coronary artery 4.

<Fourth Production Method>

Figure 33A:
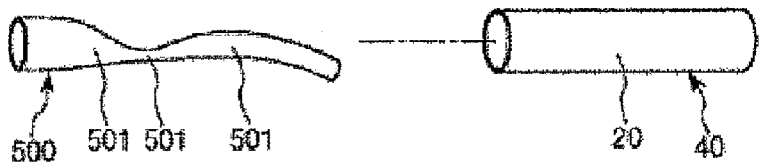
FIGS. 33A to 33D are diagrams for explaining a method of producing a biological model for training of the present invention.

As shown in FIG. 33A, there is prepared a tube shaped body 40.

Also, there is prepared a restriction member 500 which is used by being passed through the tube shaped body 40. The restriction member 500 is a member for restricting the degree of diameter-reduction of the lesioned portion formation area 20 (artificial lesioned portion 221). This restriction member 500 is a member obtained by a process in which the tomogram data at the vicinity of the narrow portion of an actual human right coronary artery is obtained by using an imaging diagnostic apparatus such as a CT scanner or an MRI scanner and thereafter, by being shaped depending on a three-dimensional printer based on these tomogram data. Therefore, for the restriction member 500, there are formed a plurality of outer diameter change portions 501 whose outer diameters are changed. Then, it is possible for the respective outer diameter change portions 501 to play a role of forming portions which become the artificial lesioned portions 221 respectively. Also, the restriction member 500 is constituted by a light curable resin, a plaster, a silicone rubber or the like.

Figure 33B:
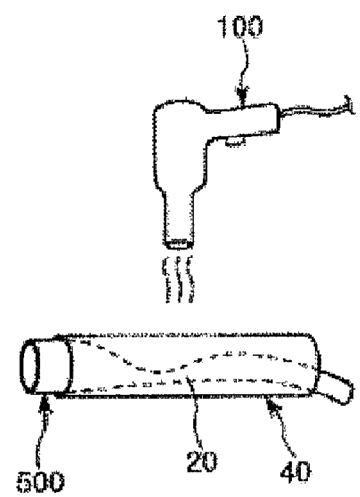

As shown in FIG. 33B, the restriction member 500 is inserted into the tube shaped body 40. At that time, the respective outer diameter change portions 501 are positioned at the lesioned portion formation area 20 of the tube shaped body 40. Then, by using the heat gun 100 in this state, hot blasts of, for example, 80 degrees to 120 degrees are applied with respect to the whole tube shaped body 40 and aforesaid tube shaped body 40 is heated.

Figure 33C:
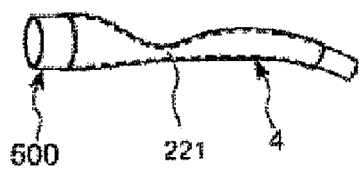

Then, as shown in FIG. 33C, when the whole tube shaped body 40 is diameter-reduced and the inner circumferential surface thereof are abutted onto the outer circumferential surface of the respective restriction members 500, the heating is stopped.

Figure 33D:
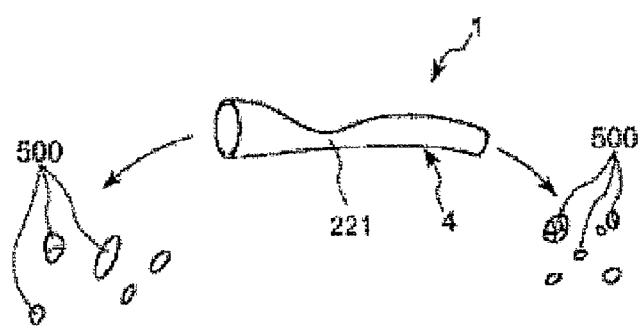

Next, as shown in FIG. 33D, the restriction member 500 is removed by being crushed into pieces, dissolved or extended. Thus, there is obtained a right coronary artery 4 having an artificial lesioned portion 221 in which the inner diameter is changed. Also, since the restriction member 500 is used, it is possible to mass-produce the uniform shaped right coronary artery 4.

<Fifth Production Method>

Figure 34A:
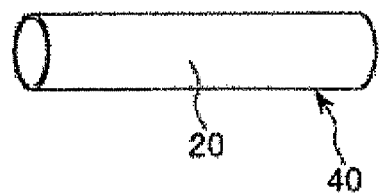
FIGS. 34A to 34C are diagrams for explaining a method of producing a biological model for training of the present invention.

First, as shown in FIG. 34A, there is prepared the tube shaped body 40. This tube shaped body 40 is constituted by polyethylen as mentioned above and is constituted by a body which is elongatable in the longitudinal direction thereof.

Figure 34B:
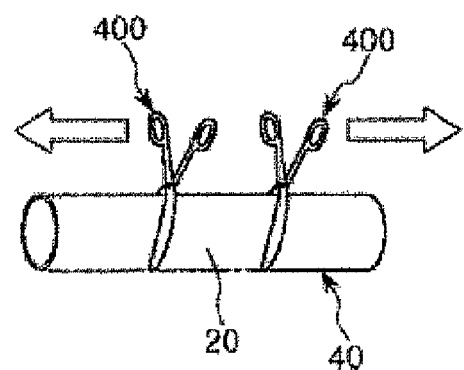

Next, as shown in FIG. 34B, forceps 400 are attached at both the end portions of the lesioned portion formation area 20 of the tube shaped body 40 (right coronary artery 4) respectively. Then, the respective forceps 400 are grasped respectively in this state and the tube shaped body 40 is pulled toward the opposite directions each other along the longitudinal direction thereof.

Figure 34C:
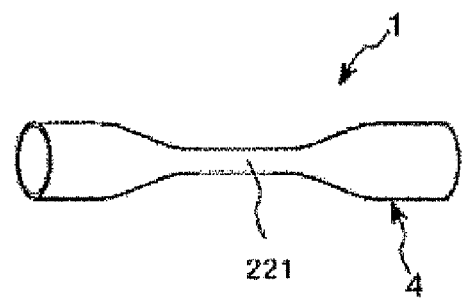

Then, as shown in FIG. 34C, the lesioned portion formation area 20 is diameter-reduced while being extended caused by this tension operation and when the size thereof becomes the desired size, aforesaid tension operation is stopped. Thereafter, the respective forceps 400 are removed respectively. Thus, there is obtained a right coronary artery 4 in which the artificial lesioned portion 221 was formed.

It should be noted that it is possible, depending on the extent of the extension thereof in the tension operation, to change the degree of narrow of the artificial lesioned portion 221 properly.

<Sixth Production Method>

Figure 35A:
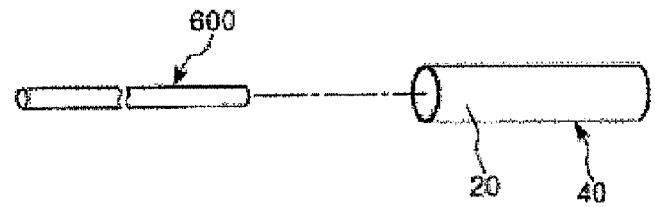
FIGS. 35A to 35D are diagrams for explaining a method of producing a biological model for training of the present invention.

As shown in FIG. 35A, there is prepared a tube shaped body 40.

Also, there is prepared a restriction member 600 which is used by being passed through the tube shaped body 40. The restriction member 600 is a member for restricting the degree of diameter-reduction of the lesioned portion formation area 20 (artificial lesioned portion 221). It is possible for this restriction member 600, whose outer diameter forms a constant rod shape in the longitudinal direction, to play a role of forming a portion which becomes the inner diameter $\phi d_3$ of the artificial lesioned portion 221.

Figure 35B:
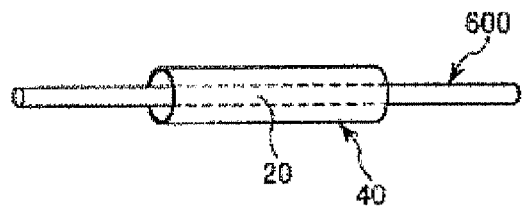

As shown in FIG. 35B, the restriction member 600 is inserted into the tube shaped body 40.

Figure 35C:
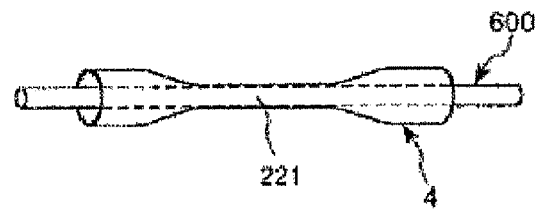

Next, as shown in FIG. 35C, by a method similar to aforesaid fifth production method, the lesioned portion formation area 20 of the tube shaped body 40 is pulled toward the opposite directions each other along the longitudinal direction thereof. Then, the lesioned portion formation area 20 is diameter-reduced while being extended and when the inner circumferential surface thereof (inner surface 214) is abutted onto the outer circumferential surface of the restriction member 600, the tension operation is stopped.

Figure 35D:
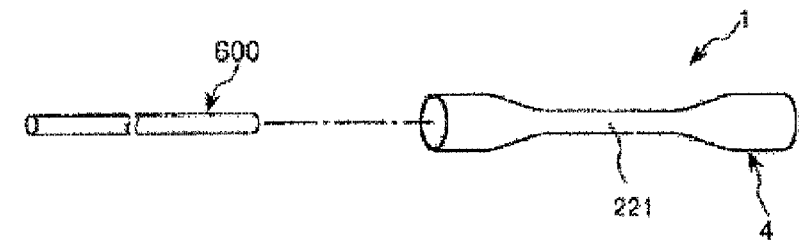

Next, as shown in FIG. 35D, the restriction member 600 is pulled out. Thus, there is obtained a right coronary artery 4 in which the artificial lesioned portion 221 is formed. Also, since the restriction member 600 is used, the degree of diameter-reduction of the artificial lesioned portion 221 becomes constant and it is possible to mass-produce the uniform shaped right coronary artery 4.

Next, it will be explained with respect to a preferred configuration of a connection portion 11 which can be used in this exemplified embodiment.

Figure 36A:
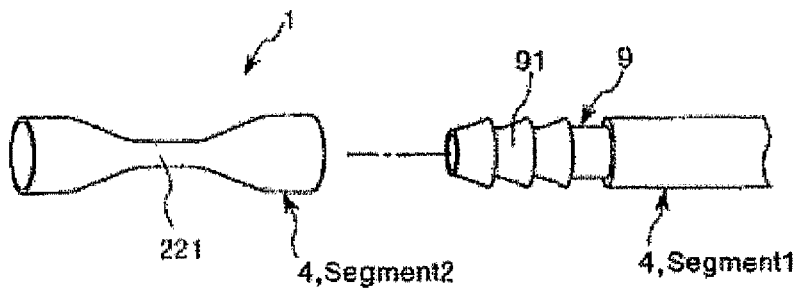
FIGS. 36A to 36C are diagrams for explaining a connection method with respect to a biological model for training of the present invention.

As shown in FIG. 36A, a barb fitting 9 is connected beforehand to the right coronary artery 4 on the Segment 1 side. The barb fitting 9 is a fitting in which outer diameter of a connection portion 91 thereof is changed in steps.

Figure 36B:
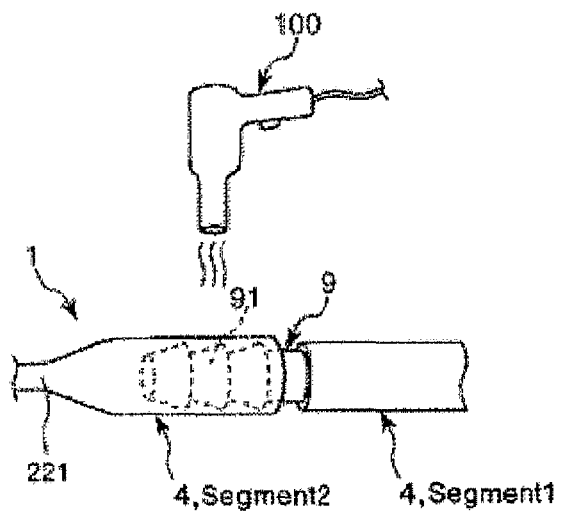
Figure 36C:
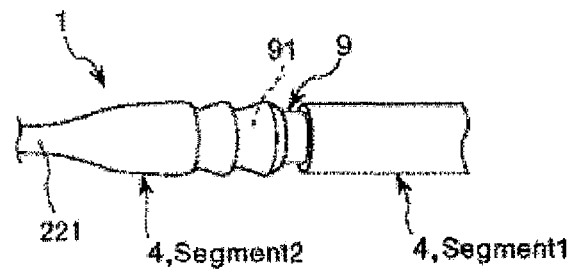

The connection portion 91 of the barb fitting 9 is inserted into the end portion of the right coronary artery 4 on the Segment 2 side and by using the heat gun 100 in this state, aforesaid end portion is heated by applying hot blasts of, for example, 80 degrees to 120 degrees (see FIG. 36B). Then, when this end portion is diameter-reduced and firmly attached to the connection portion 91, the heating is stopped (see FIG. 36C). Thus, it is possible to reliably connect the right coronary artery 4 on the Segment 1 side and the right coronary artery 4 on the Segment 2 side through the barb fitting 9.

Figure 37:
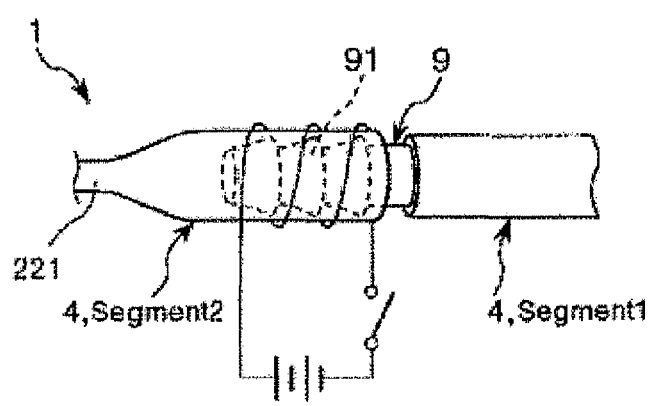
FIG. 37 is a diagram for explaining a connection method with respect to a biological model for training of the present invention.

Also, for a configuration of another connection portion 11, as shown in FIG. 37, it is constituted in a state in which the connection portion 91 of the barb fitting 9 is inserted into the end portion of the right coronary artery 4 on the Segment 2 side. Also, on the periphery portion of the end portion of the right coronary artery 4, there is wound around an electrically-heating wire 700 (for example, nichrome wire) which is connected to a power source. By power-energizing this electrically-heating wire 700, the end portion of the right coronary artery 4 is diameter-reduced. Then, when aforesaid end portion is firmly attached to the connection portion 91, the power-energization is stopped. Thus, it is possible to reliably connect the right coronary artery 4 on the Segment 1 side and the right coronary artery 4 on the Segment 2 side through the barb fitting 9.

Fifth Exemplified Embodiment

Here, it will be explained with respect to a fifth exemplified embodiment, but it will be explained centering around difference aspects with respect to the exemplified embodiments mentioned above and with respect to similar matters, the explanation thereof will be omitted.

As shown in FIG. 38A, with respect to the artificial lesioned portion 221, there are formed a plurality of grooves 26 at the center portion of the longitudinal direction of the periphery portion thereof. These grooves 26 are formed along the longitudinal direction of the artificial lesioned portion 221 and are arranged along the circumferential direction of the artificial lesioned portion 221 by being spaced with identical angular distances. Also, as shown in FIG. 39, it is preferable for the depths $t_1$ of the respective grooves 26 to be around 1/10 to 1/2 of the wall-thickness $t_2$ of the artificial lesioned portion 221 respectively and more preferably to be around 1/5 to 1/3 thereof. Specifically, it is possible to set the depth $t_1$ to be 20 μm to 100 μm.

By a fact that such grooves 26 are formed, as shown in FIG. 38B, when carrying out the expansion training, with respect to the respective grooves 26, the respective widths thereof are expanded and as a result thereof, it is possible for the whole artificial lesioned portion 221 to be expanded reliably. Thus, it is possible to carry out an expansion training approximated with the physical property of the actual lesioned portion and therefore, skill upgrade of an operator can be attempted.

It should be noted, for a forming method of the groove 26, that although it is not limited in particular, there can be cited, for example, a method depending on a cutlery (for example, cutter, Leutor), a method depending on a laser (for example, excimer laser, $CO_2$ laser) or the like.

Also, the groove 26 is not limited by a groove which is formed along the longitudinal direction of the artificial lesioned portion 221 and, for example, it is allowed to employ a groove which is formed along the circumferential direction of the artificial lesioned portion 221.

Also, it is allowed for the groove 26 to be extended until a portion other than the artificial lesioned portion 221 (until an end portion) of the right coronary artery 4.

Sixth Exemplified Embodiment

Here, it will be explained with respect to a sixth exemplified embodiment, but it will be explained centering around difference aspects with respect to the exemplified embodiments mentioned above and with respect to similar matters, the explanation thereof will be omitted.

As shown in FIG. 40, a plurality of grooves 26 are formed by being located eccentrically at a portion of the circumferential direction of the artificial lesioned portion 221 (portion on the upper side in the drawing). Also in such an artificial lesioned portion 221, when carrying out the expansion training, with respect to the respective grooves 26, the respective widths thereof are expanded and therefore, it is possible for the whole artificial lesioned portion 221 to be expanded reliably. Thus, it is possible to carry out an expansion training approximated with the physical property of the actual lesioned portion and therefore, skill upgrade of an operator can be attempted.

Seventh Exemplified Embodiment

Here, it will be explained with respect to a seventh exemplified embodiment, but it will be explained centering around difference aspects with respect to the exemplified embodiments mentioned above and with respect to similar matters, the explanation thereof will be omitted.

As shown in FIG. 41, a plurality of grooves 26 are formed by being intersected each other and by being located eccentrically at a portion of the circumferential direction of the artificial lesioned portion 221 (portion on the upper side in the drawing). Also in such an artificial lesioned portion 221, when carrying out the expansion training, with respect to the respective grooves 26, the respective widths thereof are expanded and therefore, it is possible for the whole artificial lesioned portion 221 to be expanded reliably. Thus, it is possible to carry out an expansion training approximated with the physical property of the actual lesioned portion and therefore, skill upgrade of an operator can be attempted.

Eighth Exemplified Embodiment

Here, it will be explained with respect to an eighth exemplified embodiment, but it will be explained centering around difference aspects with respect to the exemplified embodiments mentioned above and with respect to similar matters, the explanation thereof will be omitted.

As shown in FIG. 42, at the artificial lesioned portion 221, there is fixedly installed a stopper member 27 which is located eccentrically at a portion in the circumferential direction of the periphery portion (portion of the upper side in the drawing) thereof. This stopper member 27 is, when carrying out the expansion training, a member for blocking of expanding the portion at which the stopper member 27 of the artificial lesioned portion 221 is arranged (see FIGS. 43A to 43B). Such an artificial lesioned portion 221 becomes a portion simulating a calcified stricture portion in particular within the stricture portions which occur in an artery. When carrying out the expansion training with respect to this artificial lesioned portion 221, the artificial lesioned portion 221 becomes in a state shown in FIG. 43B from a state shown in FIG. 43A, and it happens that portions other than the portion at which the stopper member 27 is arranged will expand. Thus, it is possible to carry out an expansion training with respect to the calcified narrow portion.

For a material of the stopper member 27 of each constitution forming such a shape mentioned above, it is not limited in particular, but it is allowed to employ a bonding agent which has adhesiveness and which is solidified after being hardened and, for example, there can be cited an epoxy resin-based bonding agent, a rubber-based bonding agent, an urethane-based bonding agent or the like, and it is possible to use one kind within those or to use two kinds or more by combination.

It should be noted, with respect to the thickness of the stopper member 27, that although it is not limited in particular, for example, it is possible for the maximum thickness to be around 1 mm to 5 mm.

Also, the stopper member 27 is arranged at the periphery portion of the artificial lesioned portion 221 in the constitution shown in the drawing, but it is not limited by this constitution and it is allowed to arrange the member at the inner circumferential portion of the artificial lesioned portion 221.

Also, it is allowed for the stopper member 27 to be extended until a portion other than the artificial lesioned portion 221 (until an end portion) of the right coronary artery 4.

Also, it is possible for the stopper member 27 to be constituted also by an epoxy resin formed by mixing an epoxy resin and a lime, a plaster, various kinds of metallic materials or the like other than the bonding agent mentioned above.

Ninth Exemplified Embodiment

Here, it will be explained with respect to a ninth exemplified embodiment, but it will be explained centering around difference aspects with respect to the exemplified embodiments mentioned above and with respect to similar matters, the explanation thereof will be omitted. The ninth exemplified embodiment becomes a case in which the biological model for training 1 is applied to the left coronary artery 3 side.

As shown in FIG. 44, in this exemplified embodiment, the artificial lesioned portions 221 are provided at mid portions of Segment 6, Segment 7 and Segment 9 respectively so as to be able to be arranged at the branch portion 34. Thus, with respect to the connection portion 11, there is employed a constitution in which a portion of the Segment 6, the Segment 7 and the Segment 9 including the branch portion 34 is detachable from the left coronary artery 3.

Figure 45A:
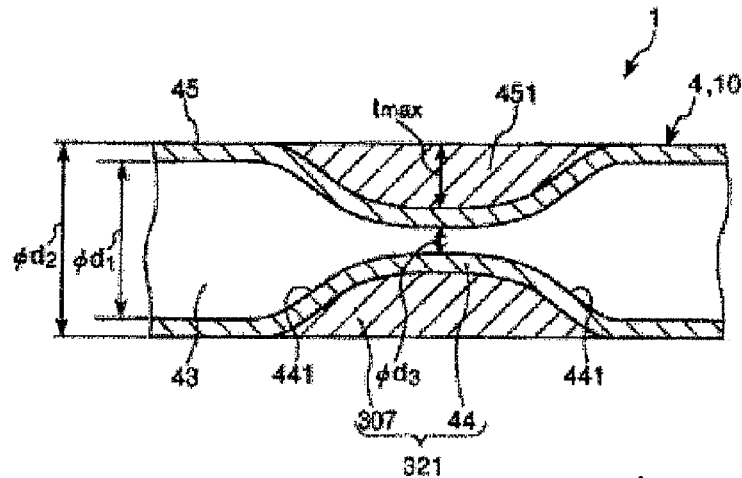
FIGS. 45A to 45C are vertical cross-section diagrams showing states in sequence when a PTCA operation training is carried out with respect to a biological model for training (tenth exemplified embodiment) of the present invention.
Figure 45B:
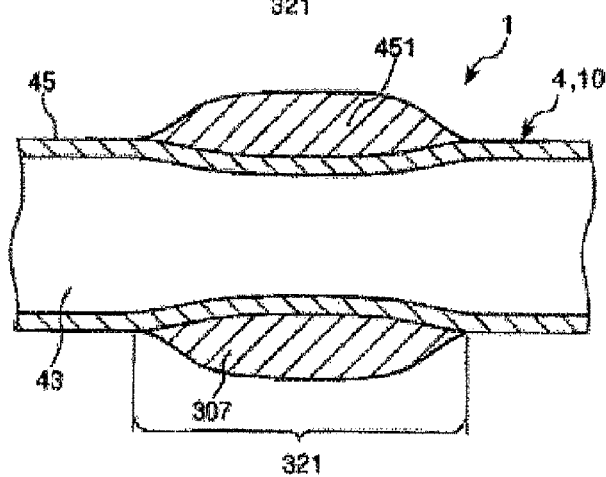
Figure 45C:
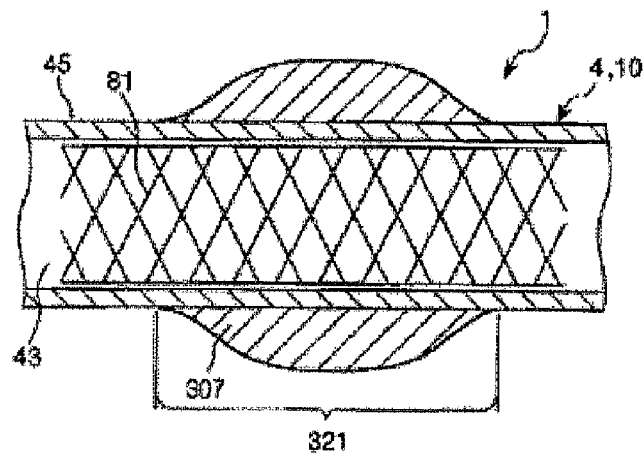
Figure 47A:
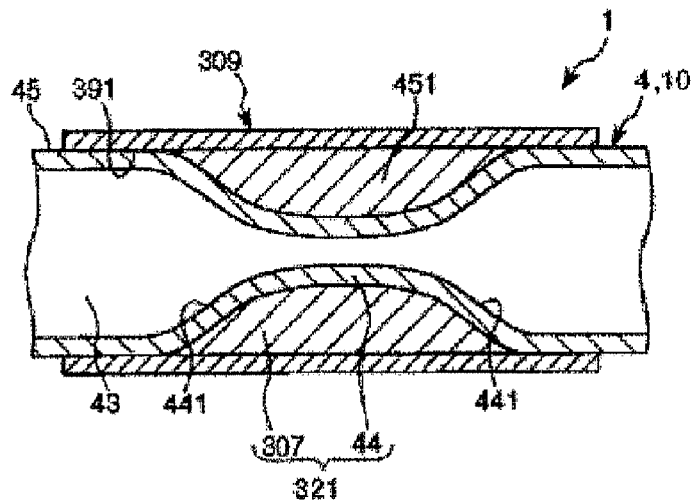
FIGS. 47A to 47C are vertical cross-section diagrams showing states in sequence when carrying out a PTCA operation training with respect to a biological model for training (eleventh exemplified embodiment) of the present invention.
Figure 47B:
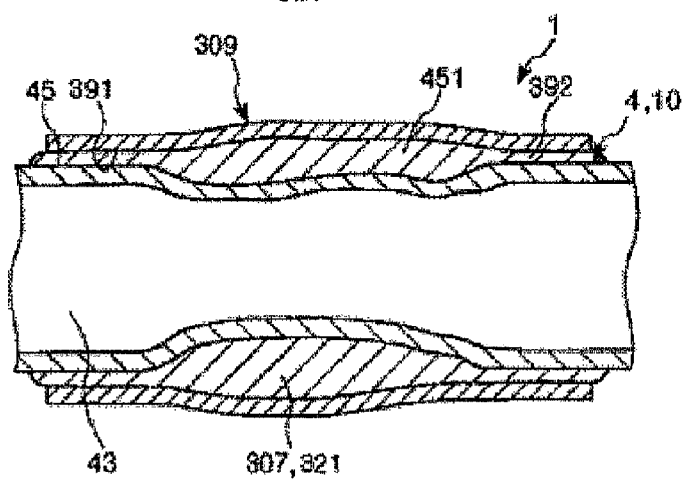
Figure 47C:
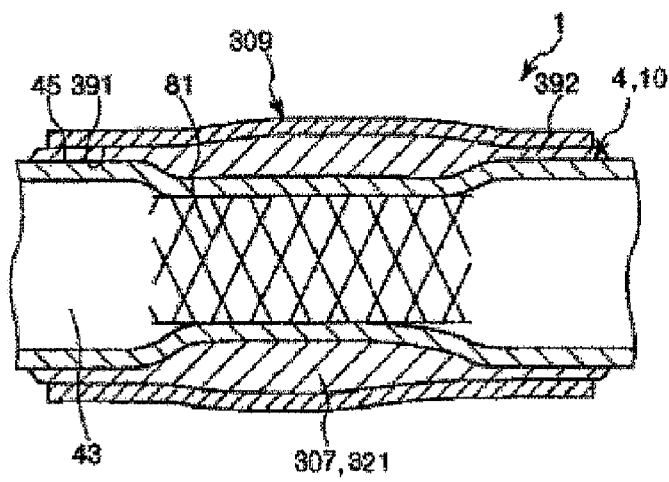
Figure 48:
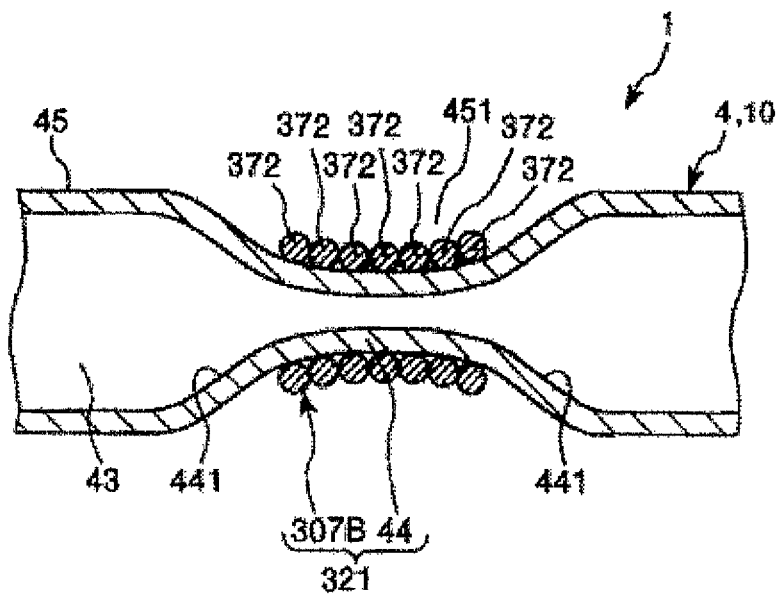
FIG. 48 is a vertical cross-section diagram showing a biological model for training (twelfth exemplified embodiment) of the present invention.
Figure 49:
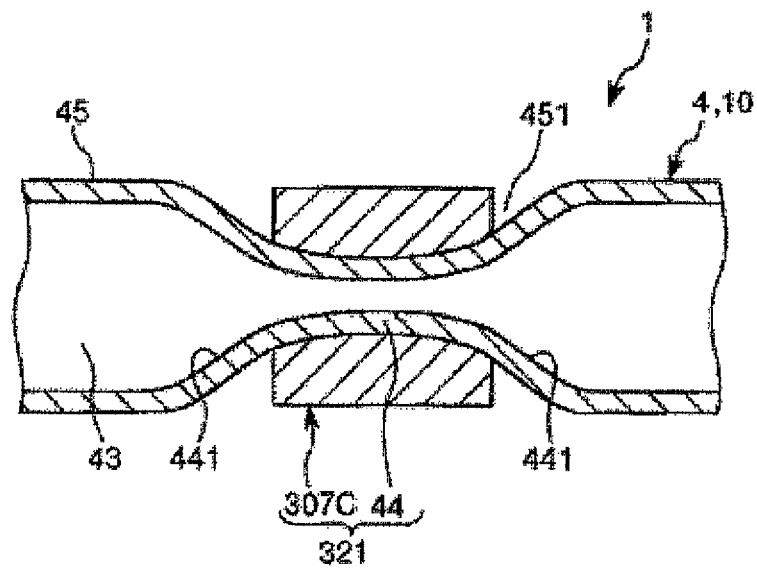
FIG. 49 is a vertical cross-section diagram showing a biological model for training (thirteenth exemplified embodiment) of the present invention.
Figure 50:
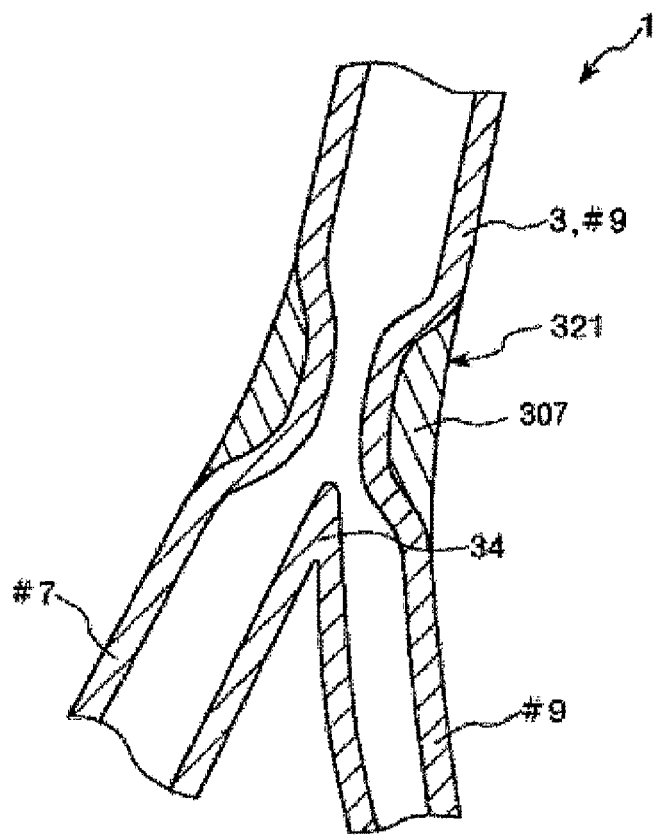
FIG. 50 is a vertical cross-section diagram showing a biological model for training (fourteenth exemplified embodiment) of the present invention.

FIGS. 45A to 45C are vertical cross-section diagrams showing states in sequence when a PTCA operation training is carried out with respect to a biological model for training (tenth exemplified embodiment) of the present invention; FIGS. 46A to 46D are diagrams for explaining a method of producing the biological model for training shown in FIGS. 45A to 45C; FIGS. 47A to 47C are vertical cross-section diagrams showing states in sequence when carrying out a PTCA operation training with respect to a biological model for training (eleventh exemplified embodiment) of the present invention; FIG. 48 is a vertical cross-section diagram showing a biological model for training (twelfth exemplified embodiment) of the present invention; FIG. 49 is a vertical cross-section diagram showing a biological model for training (thirteenth exemplified embodiment) of the present invention; and FIG. 50 is a vertical cross-section diagram showing a biological model for training (fourteenth exemplified embodiment) of the present invention.

Hereinafter, it will be explained with respect to another exemplified embodiment of a biological model for training and a production method of the biological model for training according to the present invention with reference to those drawings, but it will be explained centering around difference aspects with respect to the exemplified embodiments mentioned above and with respect to similar matters, the explanation thereof will be omitted.

Tenth Exemplified Embodiment

A biological model for training 1 of this exemplified embodiment shown in FIGS. 45A to 45C includes a right coronary artery 4 (Segment 2) of a coronary artery 10 and connection portions 11 provided at both the end portions of the right coronary artery 4 respectively. For the right coronary artery 4, end portions of the Segment 2 are connected to Segment 1 and Segment 3 through the respective connection portions 11 respectively. In this case, it is preferable that the connection portions 11 are constituted so as to be freely detachably with respect to Segment 1 and Segment 3 respectively.

As shown in FIG. 45A, the right coronary artery 4 is an artery constituted by a tube shaped body having a lumen portion 43. At a mid portion of the longitudinal direction of the right coronary artery 4, there is formed a diameter-reduction portion 44 whose inner diameter and outer diameter are diameter-reduced. Thus, at a periphery portion 45 of the right coronary artery 4, there is formed a concave portion 451. Then, in the concave portion 451, there is arranged (housed) a reinforcement member 307 for reinforcing the diameter-reduction portion 44. In the biological model for training 1, an artificial lesioned portion 321 is constituted by the diameter-reduction portion 44 of the right coronary artery 4 and the reinforcement member 307. Then, it is possible to carry out an expansion training (training of PTCA operation) with respect to the artificial lesioned portion 321.

Also, in the right coronary artery 4, with respect to the portion other than the portion at which the diameter-reduction portion 44 is formed, it is constituted such that the inner diameter $\phi d_1$ and the outer diameter $\phi d_2$ thereof are constant along the longitudinal direction respectively. It is preferable for such a right coronary artery 4 to be an artery which satisfies the relation in which the ratio $d_2/d_1$ becomes 1.01 to 2 and more preferably to be an artery which satisfies the relation in which the ratio $d_2/d_1$ becomes 1.01 to 1.2. Further, it is preferable that the inner diameter $\phi d_1$ of the right coronary artery 4 (Segment 2) is to be set around 0.5 mm to 10 mm and the outer diameter $\phi d_2$ is to be set around 0.51 mm to 12.0 mm.

With respect to the inner diameter $\phi d_3$ of the minimum portion of the diameter-reduction portion 44, although it is not limited in particular, it is preferable for the $\phi d_3$ to be set such that the $(\phi d_1 - \phi d_3)/\phi d_1$ becomes 50% to 100%. By setting the inner diameter $\phi d_3$ of the diameter-reduction portion 44 within such a range, it is possible to reliably implement a training suitable for the degree of narrow of the actual stricture region and skill upgrade of an operator is attempted accurately. Further, it is preferable for the inner diameter $\phi d_3$ to be set around 0.1 mm to 2.0 mm and more preferably to be set around 0.3 mm to 1.0 mm.

Also, with respect to the length of the diameter-reduction portion 44, although it is not limited in particular, it is preferable to be around 1 mm to 100 mm and more preferably to be around 5 mm to 50 mm. By setting the length of the diameter-reduction portion 44 within such a range, it is possible to implement a training suitable for the size of the actual lesioned region (stricture region).

At both the end portions of the diameter-reduction portion 44, there are formed inclined surfaces (taper surfaces (taper portions)) 441 whose inner surfaces are inclined, that is, whose inner diameters are increased gradually from the inner portion sides toward the end portion sides respectively. Thus, in aforesaid process [3], when the balloon 64 is made to reach the artificial lesioned portion 321, it is possible to make the balloon catheter 63 go along the inclined surface 441 of the diameter-reduction portion 44 (artificial lesioned portion 321) and therefore, it is possible to carry out the operation thereof easily and also reliably. It should be noted that although it is not limited in particular, it is preferable for the inclined surface 441 to be inclined by the angle of around 15° to 65° with respect to the center axis of the right coronary artery 4 and more preferably to be inclined by the angle of around 22° to 55°. Thus, it is possible to reliably implement a training more suitable for the shape of the actual stricture region. Also, the inclined surfaces 441 are formed on both the end sides of the diameter-reduction portion 44 in the constitution shown in FIGS. 45A to 45C, but it is not limited by this constitution and, for example, it is allowed to be formed only on one end side of the diameter-reduction portion 44. In a case in which the inclined surface 441 is formed only on one end side of the diameter-reduction portion 44, it is preferable for the inclined surface 441 thereof to be formed on the side (upper side in FIG. 3, FIGS. 4A to 4D) into which the balloon catheter 63 is inserted.

As shown in FIG. 45A, on the outer circumference side of the diameter-reduction portion 44 of the right coronary artery 4, there is arranged a reinforcement member 307. The reinforcement member 307 is a member which reinforces the diameter-reduction portion 44 and which exerts a characteristic (stiffness (force against radial force when the balloon 64 of the balloon catheter 63 is expanded)) in which the artificial lesioned portion 321 is approximated with the actual lesioned portion as a whole. For example, in a case in which the reinforcement member 307 is supposed to be omitted and the artificial lesioned portion 321 is constituted only by the diameter-reduction portion 44 and when the expansion training is carried out, there is a fear that the artificial lesioned portion 321 is easily expanded too much such an extent that the reinforcement member 307 is omitted. Consequently, the expansion training never becomes a training in which the actual expansion is approximated. However, in the biological model for training 1, the diameter-reduction portion 44 is reinforced by such an amount corresponding to the existence of the reinforcement member 307, so that the artificial lesioned portion 321 becomes a portion having a characteristic approximated with that of the actual lesioned portion and therefore, the expansion training becomes a training in which the actual expansion is approximated.

The shape of the reinforcement member 307 forms a ring shape along the circumferential direction of the diameter-reduction portion 44. Thus, it is possible to cover the whole diameter-reduction portion 44 from the outside thereof and therefore, the degree of reinforcement with respect to the diameter-reduction portion 44 becomes uniform along the circumferential direction. Also, it is possible to be expanded uniformly along the circumferential direction at the time of the balloon expansion and further, it is possible for the reinforcement member 307 to be prevented from being fallen off, so that there is such an advantage in which it is possible to implement a reliable expansion training.

It should be noted with respect to the reinforcement member 307 that it is preferable for the maximum thickness $t_{max}$ thereof to be 0.1 mm to 5 mm and more preferably to be 0.25 mm to 4 mm.

For such an artificial lesioned portion 321, at least one of the diameter-reduction portion 44 and the reinforcement member 307 which constitute aforesaid artificial lesioned portion 321 is constituted by a plastically deformable material. More specifically, with respect to the artificial lesioned portion 321, there can be employed a case in which the diameter-reduction portion 44 and the reinforcement member 307 are constituted by plastically deformable materials respectively (hereinafter, this case is referred to as "first constituent-material configuration"), a case in which the diameter-reduction portion 44 is constituted by a plastically deformable material and the reinforcement member 307 is constituted by an elastic material (hereinafter, this case is referred to as "second constituent-material configuration") and a case in which the reinforcement member 307 is constituted by a plastically deformable material and the diameter-reduction portion 44 is constituted by an elastic material (hereinafter, this case is referred to as "third constituent-material configuration"). Then, in any case of the first to the third constituent-material configurations, the artificial lesioned portion 321 becomes a portion which is deformed plastically.

<First Constituent-Material Configuration>

The whole of the right coronary artery 4 including the diameter-reduction portion 44 is constituted by a plastically deformable material and for the material thereof, it is not limited in particular, but there can be cited a thermoplastic resin such as polyethylen, polypropylene, ethylene-vinyl acetate copolymer, nylon elastomer, soft polyvinyl chloride or ethylene-propylene copolymer and the like, and it is possible to use one kind within those or to use two kinds or more by combination. Also, even within these thermoplastic resins, it is preferable, in particular, to use polyethylen. In this case, it is possible to use also a resin formed by mixing resins together in which densities, that is, degrees of crystallinity are different from each other such as low density polyethylen and high density polyethylen. It should be noted that the right coronary artery 4 is not limited by an artery in which the whole thereof is constituted by a plastically deformable material and, for example, it is allowed to be an artery in which the diameter-reduction portion 44 is constituted by a plastically deformable material and the portion other than the diameter-reduction portion 44 is constituted by an elastic material.

Also, with respect to the hardness of the right coronary artery 4 constituted by polyethylen, it is preferable for Shore A (defined in JIS K6253) to be 20 to 80 and more preferably to be 25 to 35. It is preferable for the breaking strength to be 5 MPa to 30 Mpa and more preferably to be 8 MPa to 12 MPa. It is preferable for the breaking elongation to be around 100% to 600% and more preferably to be around 100% to 200%.

By using such polyethylen, aforesaid right coronary artery 4 becomes a plastically deformable structure reliably. Thus, when carrying out an expansion training, correlatively with the reinforcement member 307, the diameter-reduction portion 44 and the reinforcement member 307 are deformed collectively and the deformation state (expansion state) thereof is maintained reliably (see FIG. 45B). Also, when producing the right coronary artery 4, it is possible for the tube shaped body (tube) 40 which becomes a raw material of the right coronary artery 4 to be molded by extrusion molding. Then, after molding the tube shaped body, it is possible, by applying a process (for example, process of heating, compression or the like) to aforesaid tube shaped body, to produce the diameter-reduction portion 44 of a desired size (see FIGS. 46A to 46D).

Also, it is possible for the plastically deformable material constituting the right coronary artery 4, that is, the thermoplastic resin to use a resin exhibiting the stress relaxation rate or the tensile elastic modulus such as mentioned above.

The reinforcement member 307 is constituted by a plastically deformable material and it is preferable for the material thereof to be a material which is different from the constituent material of the right coronary artery 4. Specifically, there can be cited a silicone clay, a rubber clay, a resin clay, an oil clay and the like such as mentioned above, and it is possible to use one kind within those or to use two kinds or more by combination.

Also, it is preferable for the compressive elastic modulus of the constituent material of the reinforcement member 307 to be around 0.001 MPa to 0.5 MPa and more preferably to be around 0.01 MPa to 0.3 MPa. By setting the physicality value of the reinforcement member 307 to be within such a range, the artificial lesioned portion 321 becomes a portion in which the plastic deformation thereof is carried out in a state of being more approximated with the actual lesioned region and it is possible to implement a higher-quality training.

By constituting the reinforcement member 307 by such a material, when the diameter-reduction portion 44 is deformed, it is possible for aforesaid reinforcement member 307 to be deformed so as to follow the deformation thereof (see FIG. 45B).

Also, the right coronary artery 4 and the reinforcement member 307 are the objects which are deformed respectively by the expansion training and with respect to difficulty in return after the deformation thereof, it becomes more difficult for the side of the reinforcement member 307 to return compared with the right coronary artery 4. Thus, the artificial lesioned portion 321 is, as the whole, the state thereof after deformation is maintained. More specifically, when the expansion training was carried out, the artificial lesioned portion 321 is deformed plastically to the extent such that it does not return to the shape before expansion by the expansion thereof. This is approximately an identical phenomenon in which the state thereof is maintained even after deformation of a narrow substance in case of applying the PTCA operation actually to a stricture portion which occurred in a human right coronary artery.

Therefore, it is possible for a training person to carry out a training close to the actual procedure.

It is possible for the biological model for training 1 having such a constitution mentioned above to be produced, for example, as follows. Here, it will be explained with respect to one example of a method for producing the biological model for training 1.

Figure 46A:
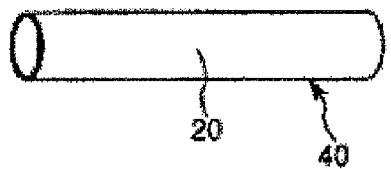
FIGS. 46A to 46D are diagrams for explaining a method of producing the biological model for training shown in FIG. 45.

First, as shown in FIG. 46A, there is prepared a tube shaped body 40 as a raw (base) material, which becomes the right coronary artery 4. This tube shaped body 40 is constituted by polyethylen and has thermal shrinkability.

Figure 46B:
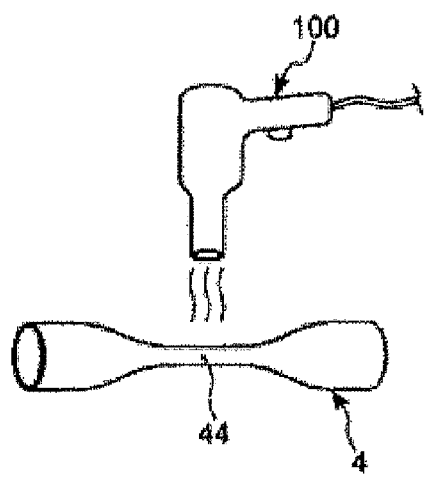

Next, as shown in FIG. 46B, by using a heat gun 100 such as, for example, a hair dryer or the like, hot blasts of, for example, 80 degrees to 120 degrees are applied with respect to the lesioned portion formation area 20 of the tube shaped body 40 (right coronary artery 4) and aforesaid lesioned portion formation area 20 is heated. Then, when the lesioned portion formation area 20 is diameter-reduced and the size thereof becomes a desired size, the heating is stopped. Thus, there is obtained a right coronary artery 4 in which the artificial lesioned portion 321 is formed. It should be noted that it is possible, depending on time and temperature of the heating, to change the degree of narrow of the artificial lesioned portion 321 properly.

Figure 46C:
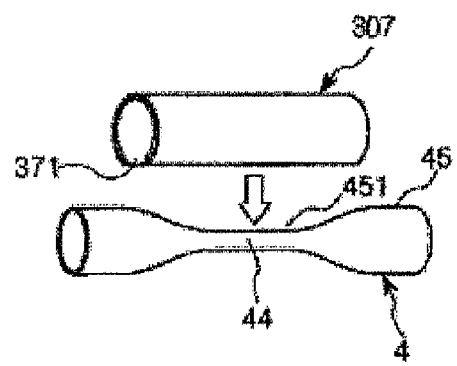
Figure 46D:
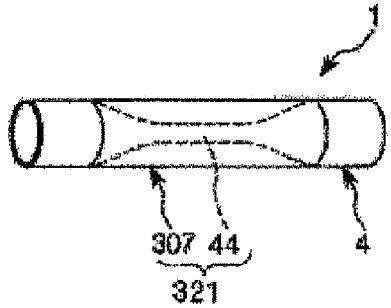

Next, as shown in FIG. 46C, there is prepared a reinforcement member 307 constituted by a clay. The reinforcement member 307 is a member whose cross-section shape is formed beforehand in a "C"-shape. The diameter-reduction portion 44 of the right coronary artery 4 is inserted into the reinforcement member 307 through a defective portion 371 of this reinforcement member 307.

Next, the reinforcement member 307 is deformed so as to fit along the concave portion 451 and is positioned at the concave portion 451. Also, by deforming the reinforcement member 307, the defective portion 371 is filled (made to disappear). Thus, there is obtained a biological model for training 1 of a state shown in FIG. 46D.

It should be noted, when forming the diameter-reduction portion 44, that it is possible to use a soldering iron instead of the heat gun 100.

Also, when forming the diameter-reduction portion 44, it is possible to use a method of pulling the tube shaped body 40 along the longitudinal direction thereof instead of the method of heating the tube shaped body 40.

Also, when forming the diameter-reduction portion 44, it is allowed to use a restriction member for restricting the degree of diameter-reduction thereof. For this restriction member, there can be cited, for example, a member which forms a rod shape and which can be used by being inserted into the tube shaped body 40.

<Second Constituent-Material Configuration>

In the second constituent-material configuration, the right coronary artery 4 (diameter-reduction portion 44) is constituted by a plastically deformable material (thermoplastic resin) such as mentioned above. On the other hand, the reinforcement member 307 is constituted by an elastic material.

For the elastic material constituting the reinforcement member 307, although it is not limited in particular, there can be cited, for example, a polymer composed of a mixture of one kind, two kinds or more of copolymers, which are selected from a group composed of a copolymer of polystyrene-poly(ethylene/propylene) block, a copolymer of poly-styrene-poly (ethylene/propylene) block-polystyrene, a copolymer of polystyrene-poly(ethylene/butylene) block-polystyrene and a copolymer of polystyrene-poly(ethylene-ethylene/propylene) block-polystyrene, and a material containing a softening agent for softening aforesaid polymers.

Also, for an illustrative embodiment of aforesaid copolymer, there can be cited, for example, SEPTON series (thermoplastic elastomer manufactured by Kuraray Plastics Co. Ltd), EPOREX SB series (manufactured by Sumitomo Chemical Co. Ltd) and the like.

For the softening agent, in particular, a process oil is used preferably and for the process oil, although it is not limited in particular, it is allowed to use any one within a paraffin-based oil, a naphthene-based oil and an aroma-based oil, and it is possible to use one kind within those or to use two kinds or more by combination. Also, for an illustrative embodiment of the process oil, there can be cited, for example, Diana process oil series (manufactured by Idemitsu Kosan Co. Ltd), JOMO process P (manufactured by Japan Energy Corp.) and the like.

It is preferable for the weight ratio of aforesaid copolymer and aforesaid softening agent to be around 1:3 to 1:10 and more preferably to be around 1:5 to 1:7.

Further, it is allowed for the elastically deforming reinforcement member 307, if required, to be added with another addition agent other than aforementioned constituent materials and for such an addition agent, there can be cited, for example, an antiaging agent (antioxidant) for preventing aging of the artificial lesioned portion 321 or the like.

For the antiaging agent, although it is not limited in particular, there can be cited, for example, an amine-based or phenol-based agent and for the amine-based antiaging agent, there can be cited an amine derivative such as N-isopropyl-N'-phenyl-p-phenylenediamine, N-(1,3-dimethylbutyl)-N'-phenyl-p-phenylenediamine or 6-ethoxy-2,2,4-trimethyl-1,2-dihydroquinoline, and for the phenol-based antiaging agent, there can be cited 2,6-di-tert-butyl-p-cresol, 2,5-di-tert-amyldihydroquinone, 2,5-di-tert-butyl-dihydroquinone, 4,4'-butylidene-bis(3-methyl-6-tert-butylphenol), 2,2'-methylene-bis(4-methyl-6-tert-butylphenol) or the like.

The artificial lesioned portion 321 constituted by such a constituent material is a portion whose state after the deformation is approximately maintained similarly as that in case of aforesaid first constituent-material configuration, but the degree of the maintenance thereof is reduced compared with that of aforesaid first constituent-material configuration, that is, it is a little bit easy to return to the shape before the expansion.

With respect to the artificial lesioned portion 321, by selecting the constituent material properly, it is possible to change the stiffness thereof. Thus, it is possible to obtain artificial lesioned portions 321 approximated with various narrow substances whose stiffnesses are different and it is possible to reliably carry out the expansion training corresponding to aforesaid artificial lesioned portion 321, that is, from a case in which the expansion force is comparatively small to a case in which the expansion force is comparatively large.

<Third Constituent-Material Configuration>

In the third constituent-material configuration, the reinforcement member 307 is constituted by a plastically deformable material (clay) such as mentioned above. On the other hand, the right coronary artery 4 (diameter-reduction portion 44) is constituted by an elastic material.

For the elastic material constituting the right coronary artery 4, although it is not limited in particular, there can be cited, for example, various kinds of rubber materials (in particular, vulcanized rubber materials) such as a natural rubber, an isoprene rubber, a butadiene rubber, a styrene-butadiene rubber, a nitrile rubber, a chloroprene rubber, a butyl rubber, an acryl rubber, an ethylene-propylene rubber, a hydrin rubber, an urethane rubber, a silicone rubber and a fluorine rubber, and various kinds of thermoplastic elastomers of styrene-based one, polyolefin-based one, polyvinyl chloride-based one, polyurethane-based one, polyester-based one, polyamide-based one, polybutadiene-based one, transpolyisoprene-based one, fluorine rubber-based one, chlorinated polyethylen-based one and the like, and it is possible to use one kind within those or to use two kinds or more by combination.

The artificial lesioned portion 321 constituted by such a constituent material is a portion whose state after the deformation is approximately maintained similarly as that in case of aforesaid first constituent-material configuration, but the degree of the maintenance thereof is reduced compared with that of aforesaid first constituent-material configuration.

Also in the third constituent-material configuration, by selecting the constituent material of the artificial lesioned portion 321 properly, it is possible to change the stiffness thereof. Thus, there are obtained artificial lesioned portions 321 approximated with various narrow substances whose stiffnesses are different.

Next, it will be explained in detail with respect to a state of aforesaid biological model for training 1 when carrying out the training of PTCA operation by using the biological model for training 1 (three-dimensional model).

When carrying out the training of PTCA operation by using the biological model for training 1, in aforesaid process [3] shown in FIG. 4C, the diameter-reduction portion 44 is pressed toward the outside by the expanded balloon 64. In addition, the reinforcement member 307 is also pressed toward the outside through the diameter-reduction portion 44. Thus, the diameter-reduction portion 44 and the reinforcement member 307 are expanded and deformed collectively.

Then, in aforesaid process [4] shown in FIG. 4D, after removing the guide wire for balloon catheter 62 and the balloon catheter 63 from the artificial lesioned portion 321, the artificial lesioned portion 321 is a portion which is deformed plastically as mentioned above, so that it does not return to the shape before expansion, and it happens that it will maintain aforesaid expanded and deformed state, that is, the shape pushed and expanded by the balloon 64. This becomes approximately in an identical phenomenon in which a right coronary artery and a narrow portion become in an expanded state in case of applying the PTCA operation actually to a narrow portion which occurred in a human right coronary artery.

In this manner, by using the biological model for training 1, when carrying out a training targeting skill upgrade of an operator, the biological model for training 1 becomes a model approximated with the physical property of the actual lesioned portion, so that it is possible to carry out a training reliably in accordance with a practical procedure.

Also, the training can be implemented while observing the expansion of the balloon 64 in aforesaid process [3] depending on a visual contact and an X-ray contrast image, and it is possible to confirm the degree of expansion of the artificial lesioned portion 321, so that it is possible, also from such a view point, to implement a higher-quality training.

It should be noted that it is possible to inhibit re-narrow of the artificial lesioned portion 321 more reliably by indwelling a stent 81, as shown in FIG. 45C, with respect to the artificial lesioned portion 321 after restoring blood flow depending on aforesaid process [4], that is, with respect to the artificial lesioned portion 321 after the PTCA operation is treated medically. It is possible to use the biological model for training 1 also for the training of treatment for indwelling such a stent 81 and if the biological model for training 1 is used in such a training, it is possible to implement more reliably about the evaluation of whether or not the re-narrow is inhibited preferably.

Eleventh Exemplified Embodiment

Here, it will be explained with respect to an eleventh exemplified embodiment, but it will be explained centering around difference aspects with respect to the exemplified embodiments mentioned above and with respect to similar matters, the explanation thereof will be omitted.

The biological model for training 1 shown in FIG. 47A becomes a model in which a restriction member 309 is installed further on the outer circumference side of the reinforcement member 307. The restriction member 309 is a member for regulating (restricting) the deformation thereof when the reinforcement member 307 is deformed by carrying out the expansion training. Also, the restriction member 309 is constituted by a band body and is a member in which aforesaid band body is wound around in a ring shape along the outer circumference of the reinforcement member 307. With respect to the restriction member 309, it is preferable for an inner circumferential portion 391 thereof not to be firmly fixed on the periphery portion 45 of the right coronary artery 4.

In the biological model for training 1 in which such a restriction member 309 is installed, when carrying out the expansion training, the reinforcement member 307 is pressed toward the outside through the diameter-reduction portion 44 and tends to be deformed, but the deformation toward the outside is restricted by the restriction member 309 (see FIG. 47B). As a result thereof, the degree of reinforcement with respect to the diameter-reduction portion 44 is increased and therefore, there is obtained an artificial lesioned portion 321 in which the artificial lesioned portion 321 is harder than the artificial lesioned portion 321 of aforesaid first exemplified embodiment. In addition, also this artificial lesioned portion 321 is a portion whose shape after the deformation is maintained, so that it is possible to reliably carry out the expansion training by the balloon catheter 63 in accordance with a practical procedure. In addition, it is possible to carry out also an indwelling training of a stent 81 as shown in FIG. 47C.

It should be noted that the restriction member 309 is pressed toward the outside through the reinforcement member 307 similarly as the reinforcement member 307, so that it is extended a little bit toward the circumferential direction. Thus, there can be formed a gap 392 between the inner circumferential portion 391 of the restriction member 309 and the periphery portion 45 of the right coronary artery 4, and it is possible for a portion of the reinforcement member 307 to enter into aforesaid gap 392 (see FIG. 47B).

Also, it is preferable for the restriction member 309 to be constituted by a plastically deformable material or an elastic material. For the plastically deformable material, it is not limited in particular and it is possible to use, for example, such a material cited as a constituent material of the right coronary artery 4 in aforesaid first constituent-material configuration. For the elastic material, it is not limited in particular and it is possible to use, for example, such a material cited as a constituent material of the reinforcement member 307 in aforesaid second constituent-material configuration or such a material cited as a constituent material of the right coronary artery 4 in aforesaid third constituent-material configuration. By using such a material, it is possible to restrict the deformation of the reinforcement member 307 reliably.

Twelfth Exemplified Embodiment

Here, it will be explained with respect to a twelfth exemplified embodiment, but it will be explained centering around difference aspects with respect to the exemplified embodiments mentioned above and with respect to similar matters, the explanation thereof will be omitted.

In the biological model for training 1 shown in FIG. 48, a reinforcement member 307B is constituted by a plurality of pieces (seven pieces in the constitution shown) of ring shaped rubbers (rubber bands) 372. Each ring shaped rubber 372 is a rubber whose inner diameter in a natural state of being applied with no external force is approximately identical with the outer diameter of diameter-reduction portion 44 or is a little bit smaller than that. It is possible for the reinforcement member 307B having such a constitution to adjust the degree of reinforcement with respect to the diameter-reduction portion 44 corresponding to the number of installations of the ring shaped rubbers 372.

Thirteenth Exemplified Embodiment

Here, it will be explained with respect to a thirteenth exemplified embodiment, but it will be explained centering around difference aspects with respect to the exemplified embodiments mentioned above and with respect to similar matters, the explanation thereof will be omitted.

In the biological model for training 1 shown in FIG. 49, a reinforcement member 307C is constituted by a foaming elastic body (sponge). This reinforcement member 307C is a member which is formed in a cylindrical shape and whose inner diameter in a natural state is approximately identical with the outer diameter of the diameter-reduction portion 44 or is a little bit smaller than that. In the reinforcement member 307C having such a constitution, aforesaid reinforcement member 307C is a comparatively soft member, so that it is possible for the degree of reinforcement with respect to the diameter-reduction portion 44 to be restricted.

Fourteenth Exemplified Embodiment

Here, it will be explained with respect to a fourteenth exemplified embodiment, but it will be explained centering around difference aspects with respect to the exemplified embodiments mentioned above and with respect to similar matters, the explanation thereof will be omitted. The fourteenth exemplified embodiment becomes a case in which the biological model for training 1 is applied to the left coronary artery 3 side.

As shown in FIG. 50, in this exemplified embodiment, the artificial lesioned portion 321 and the reinforcement member 307 are provided at mid portions of Segment 6, Segment 7 and Segment 9 respectively so as to be able to be arranged at the branch portion 34. Thus, with respect to the connection portions 11, there is employed a constitution in which a portion of the Segment 6, the Segment 7 and the Segment 9 including the branch portions 34 is detachable from the left coronary artery 3.

As described above, the biological models for training and the production methods of the biological model for training of the present invention were explained with respect to the exemplified embodiments shown in the drawings, but the present invention is not to be limited by those and it is possible for the respective portions constituting the biological models for training to be replaced by those having arbitrary constitutions which can exert similar functions. Also, it is allowed to add any arbitrary constituent substance therein.

Also, it is allowed for the biological model for training of the present invention to be a model formed by combining arbitrary two or more constitutions (characteristics) together within aforesaid respective exemplified embodiments.

Also, in the first exemplified embodiment and the second exemplified embodiment, it was explained with respect to a case in which the training is implemented by arranging the artificial lesion member of the present invention on the tube which is artificially produced by duplicating the blood vessel (coronary artery), but it is not limited by such a case and it is also allowed to implement the training by arranging the artificial lesion member on a tube which an animal living body except a human possess or on a tube which a human dead body possesses, that is, on a tube except a tube which a human living body possesses.

Also, with respect to the artificial tube shaped tissue, it was explained by using a tissue simulating the coronary artery (blood vessel) representatively, but it is not limited by this and it is allowed to employ a tissue which simulates, for example, an esophagus, a large intestine, a small intestine, a pancreatic duct, a bile duct, a ureter, an oviduct, a trachea, a bronchi or the like.

Also, the artificial tube shaped tissue is not limited by a single layer tissue and it is allowed to employ a tissue in which a plurality of layers are laminated (laminated body).

In addition, it is also allowed for the shape of the artificial tube shaped tissue to be formed in a straight line shape or to be curved for a portion thereof or the whole thereof.

Also, in the fourth exemplified embodiment to the ninth exemplified embodiment, it is designed for the artificial tube shaped tissues in aforesaid exemplified embodiments such that the wall-thicknesses thereof are identical each other with respect to the portion at which the artificial lesioned portion thereof is formed and other portions than that, but it is not limited by this and, for example, it is allowed for the wall-thicknesses to be different each other.

Also, in the fourth exemplified embodiment to the ninth exemplified embodiment, there was employed, for the forming method of the artificial lesioned portion, a method in which heating or tension is applied for aforesaid exemplified embodiments, but there can be cited, other than those, a method of illuminating light (ultraviolet ray, infrared ray), illumination of high frequency, illumination of micro wave, illumination of supersonic wave or the like depending on the constituent material of the artificial lesioned portion (artificial tube shaped tissue).

Also, in the tenth exemplified embodiment to the fourteenth exemplified embodiment, it is designed for the artificial tube shaped tissues in aforesaid exemplified embodiments such that the wall-thicknesses thereof are identical each other with respect to the portion at which the diameter-reduction portion thereof is formed and other portions than, but it is not limited by this and, for example, it is allowed for the wall-thicknesses to be different each other.

INDUSTRIAL APPLICABILITY

The biological model for training of the present invention is formed in a narrowing or closing shape at a mid portion of a tube shaped body having a lumen portion and includes an artificial lesion member simulating a lesioned portion which occurs at a tube shaped tissue, in which aforesaid artificial lesion member is constituted at least for a portion thereof by a plastically deformable material and is used for an expansion training in which an expansion is carried out. Therefore, when carrying out a training which is targeting skill upgrade of an operator by using a biological model for training, it is possible to carry out a training by approximating the biological model for training with the physical property of the actual lesioned portion. Therefore, the biological model for training of the present invention has industrial applicability.

The invention claimed is:
1. A biological model for training, being formed in a narrowing or closing shape at a mid portion of a tube shaped body having a lumen portion and comprising an artificial lesion member simulating a lesioned portion which occurs at a tube shaped tissue, wherein
the artificial lesion member is constituted at least for a portion thereof by a plastically deformable clay material and is used for an expansion training in which an expansion is carried out.

2. A biological model for training, being arranged at a lumen portion in a tube having the lumen portion and comprising an artificial lesion member being formed in a shape for narrowing or closing the lumen portion when being arranged at the lumen portion, wherein the artificial lesion member is constituted by a plastically deformable clay material, and when arranging the artificial lesion member at the lumen portion and carrying out a training for an expansion in order to secure a flow path, the artificial lesion member is plastically deformed by the expansion to the extent such that it does not return to the shape before the expansion.

3. The biological model for training according to claim 2, wherein the artificial lesion member includes a through-hole axially passing through, and when being arranged at the lumen portion, the lumen portion is narrowed by the periphery portion of the through-hole.

4. The biological model for training according to claim 2, wherein the artificial lesion member includes a notch or a hole which is continuous axially, and when being arranged at the lumen portion, the lumen portion is closed caused by a fact that the inner surfaces of the notch or the hole are firmly attached each other.

5. The biological model for training according to claim 2, wherein the artificial lesion member and the lumen portion are configured such that insertion of the artificial lesion member into the lumen portion can be carried out only in a state of being compressed.

6. A biological model for training, comprising:

an artificial tube shaped tissue which is constituted by a tube shaped body having a lumen portion and which simulates a tube shaped tissue; and an artificial lesion member which is arranged at the lumen portion of the artificial tube shaped tissue, which forms a shape of narrowing or closing the lumen portion and which simulates a lesioned portion occurring at a tube shaped tissue, wherein the artificial tube shaped tissue and the artificial lesion member are respectively objects which are constituted by plastically deformable clay materials and which are deformed plastically, when carrying out an expansion training with respect to the artificial lesion member in order to secure a flow path in the artificial tube shaped tissue, caused by the expansion thereof to the extent so as not to return to the shape before the expansion.

7. The biological model for training according to claim 6, wherein the artificial lesion member is more easily deformable than the artificial tube shaped tissue.

8. The biological model for training according to claim 6, wherein the artificial lesion member, with respect to the shape after the expansion thereof, is less easily returnable to the shape before the expansion than the artificial tube shaped tissue.

9. The biological model for training according to according to claim 6, wherein tensile elastic modulus of the artificial tube shaped tissue is identical to or larger than compressive elastic modulus of the artificial lesion member.

10. The biological model for training according to claim 6, wherein the artificial tube shaped tissue has a branch portion in which a mid portion thereof is branched.

11. A biological model for training, being constituted by a tube shaped body having a lumen portion and comprising an artificial tube shaped tissue simulating a tube shaped tissue, wherein the artificial tube shaped tissue is constituted by a plastically deformable clay material and formed with a diameter-reduction portion caused by a fact that a mid portion of the longitudinal direction thereof is diameter-reduced and deformed plastically, and it is used in an expansion training in which an expansion is carried out with respect to the narrow portion by assuming the diameter-reduction portion as a narrow portion occurring at a tube shaped tissue.

12. The biological model for training according to claim 11, wherein the artificial tube shaped tissue has thermal shrinkability, and the diameter-reduction portion is a portion formed by heating the artificial tube shaped tissue.

13. The biological model for training according to claim 11, wherein the artificial tube shaped tissue is elongatable in the longitudinal direction thereof, and the diameter-reduction portion is a portion formed depending on a fact that the artificial tube shaped tissue is pulled along the longitudinal direction thereof to the opposite directions each other.

14. The biological model for training according to claim 11, wherein the diameter-reduction portion is installed with a stopper member for blocking a phenomenon, when carrying out the expansion training, that a portion thereof will expand.

15. A biological model for training, comprising:

an artificial tube shaped tissue which is constituted by a tube shaped body, which includes a diameter-reduction portion whose mid portion in the longitudinal direction thereof is diameter-reduced and which simulates a tube shaped tissue; and a reinforcement member provided on the outer circumference side of the diameter-reduction portion for reinforcing the diameter-reduction portion, wherein an artificial narrow portion is constituted by the diameter-reduction portion and the reinforcement member, which simulates a narrow portion occurring at a tube shaped tissue, and the artificial narrow portion is used in an expansion training for carrying out expansion with respect to the narrow portion.

16. The biological model for training according to claim 15, wherein at least one of the diameter-reduction portion and the reinforcement member is constituted by a plastically deformable material.

17. The biological model for training according to claim 15, wherein the diameter-reduction portion is formed, at one end portion or at both the end portions thereof, with a taper portion in which the inner diameter of the diameter-reduction portion increases gradually from the inner portion side toward the end portion side thereof.

18. The biological model for training according to claim 15, wherein the reinforcement member is a member forming a ring shape, for the shape thereof, along the circumferential direction of the diameter-reduction portion.

19. The biological model for training according to claim 15, wherein there is further provided with a restriction member which is installed on the outer circumference side of the reinforcement member and which restricts the deformation thereof when the reinforcement member is deformed.

20. The biological model for training according to claim 19, wherein the restriction member is a band body forming a ring shape, which is constituted by a plastically deformable material or an elastic material.

* * * * *